US012648504B2

(12) United States Patent
Rice et al.

(10) Patent No.: US 12,648,504 B2
(45) Date of Patent: Jun. 9, 2026

(54) SECURE AND VERIFIABLE TRACKING OF AGRICULTURAL PRODUCTS

(71) Applicant: AMVAC Chemical Corporation, Newport Beach, CA (US)

(72) Inventors: Richard L. Rice, Collierville, TN (US); Ulrich G. Trogele, Newport Beach, CA (US); Kent W. James, Springfield, IL (US)

(73) Assignee: AMVAC Chemical Corporation, Newport Beach, CA (US)

( * ) Notice: Subject to any disclaimer, the term of this patent is extended or adjusted under 35 U.S.C. 154(b) by 871 days.

(21) Appl. No.: 17/727,482

(22) Filed: Apr. 22, 2022

(65) Prior Publication Data

US 2022/0240434 A1     Aug. 4, 2022

Related U.S. Application Data

(63) Continuation-in-part of application No. 17/580,601, filed on Jan. 20, 2022, now Pat. No. 11,793,102,
(Continued)

(51) Int. Cl.
*A01B 79/00* (2006.01)
*A01C 7/06* (2006.01)
(Continued)

(52) U.S. Cl.
CPC .............. *A01B 79/005* (2013.01); *A01C 7/10* (2013.01); *A01C 21/005* (2013.01);
(Continued)

(58) Field of Classification Search
CPC ....... A01B 79/005; A01C 7/10; A01C 21/005; A01C 7/06; A01C 23/007; A01M 7/0092;
(Continued)

(56) References Cited

U.S. PATENT DOCUMENTS 4,563,739 A  *  1/1986  Gerpheide ........... G06Q 10/087
                                                            705/28
6,198,986 B1 *  3/2001  McQuinn ................. A01C 7/06
                                                            700/242
(Continued)

FOREIGN PATENT DOCUMENTS

AR           111815 A1    8/2019
AU      2003210490 A1    7/2003
(Continued)

OTHER PUBLICATIONS

Extended European Search Report mailed Dec. 21, 2022, in European patent application No. 22199274.6, 10 pages.
(Continued)

*Primary Examiner* — Michael Jared Walker
(74) *Attorney, Agent, or Firm* — Blueshift IP; Robert Plotkin

(57) ABSTRACT

A computer-implemented system and method to collect and store data related to product stored in a container. In response to filling the container with the product, the following data are stored in at least one first record in an external database (such as a distributed ledger, e.g., blockchain): a product type of the first product; an amount of the first product filled into the first container; a unique identity of the first container; and a unique identity of a first user of the first container at the time of filling the first container with the first product. Data representing a unique identity of a container data module on the container are stored in the container data module. As the container moves, dispenses product, and undergoes changes in possession and ownership, data representing such events are stored in the distributed ledger and/or the container data module. As a result, a verifiable application/consumption record of the product within the container is generated.

31 Claims, 34 Drawing Sheets

Related U.S. Application Data which is a continuation of application No. 17/316,273, filed on May 10, 2021, now Pat. No. 11,229,155, which is a continuation of application No. 16/872,932, filed on May 12, 2020, now Pat. No. 11,330,756, which is a continuation of application No. 15/981,289, filed on May 16, 2018, now Pat. No. 10,694,655, which is a continuation-in-part of application No. 15/614,547, filed on Jun. 5, 2017, now Pat. No. 10,517,206.

(60) Provisional application No. 63/245,184, filed on Sep. 16, 2021, provisional application No. 62/508,145, filed on May 18, 2017, provisional application No. 62/346,377, filed on Jun. 6, 2016.

(51) Int. Cl.

| | |
|---|---|
| *A01C 7/10* | (2006.01) |
| *A01C 21/00* | (2006.01) |
| *A01C 23/00* | (2006.01) |
| *A01M 7/00* | (2006.01) |
| *A01M 9/00* | (2006.01) |
| *B65G 65/00* | (2006.01) |
| *G06K 7/10* | (2006.01) |
| *G06Q 10/087* | (2023.01) |
| *G06Q 30/04* | (2012.01) |
| *G06Q 50/02* | (2024.01) |

(52) U.S. Cl.
CPC ........ *A01M 7/0092* (2013.01); *A01M 9/0092* (2013.01); *B65G 65/00* (2013.01); *G06K 7/10386* (2013.01); *G06Q 10/087* (2013.01); *G06Q 30/04* (2013.01); *G06Q 50/02* (2013.01); *A01C 7/06* (2013.01); *A01C 23/007* (2013.01); *B01J 2219/00567* (2013.01); *B65G 2203/046* (2013.01)

(58) Field of Classification Search
CPC ... A01M 9/0092; A01M 7/0089; B65G 65/00; B65G 2203/046; G06K 7/10386; G06Q 10/087; G06Q 30/04; G06Q 50/02; B01J 2219/00567
See application file for complete search history.

(56) References Cited

U.S. PATENT DOCUMENTS

| | | | | | |
|---|---|---|---|---|---|
| 6,671,698 | B2 | 12/2003 | Pickett | | |
| 6,796,504 | B2 * | 9/2004 | Robinson | ............. | B65G 65/005 |
| | | | | | 426/87 |
| 6,938,564 | B2 * | 9/2005 | Conrad | ................... | A01C 7/06 |
| | | | | | 111/170 |
| 6,963,881 | B2 * | 11/2005 | Pickett | ................... | G06Q 10/06 |
| | | | | | 705/37 |
| 7,113,125 | B2 * | 9/2006 | Le Sesne | ............ | G01F 23/2845 |
| | | | | | 342/124 |
| 7,142,124 | B2 * | 11/2006 | Chi | .......................... | H01Q 1/22 |
| | | | | | 340/572.1 |
| 7,225,167 | B2 * | 5/2007 | Hind | ................... | G06Q 20/382 |
| | | | | | 705/64 |
| 7,270,065 | B2 * | 9/2007 | Conrad | ................... | A01C 7/06 |
| | | | | | 111/900 |
| 7,654,421 | B2 * | 2/2010 | Chan | ....................... | D06F 33/37 |
| | | | | | 340/572.1 |
| 7,716,063 | B2 * | 5/2010 | Zimmerman | ......... | G06Q 10/04 |
| | | | | | 705/317 |
| 7,761,334 | B2 * | 7/2010 | Pickett | ................. | A01B 79/005 |
| | | | | | 706/904 |
| 7,900,819 | B2 * | 3/2011 | Silverbrook | ......... | G06Q 30/018 |
| | | | | | 235/383 |
| 7,916,022 | B2 * | 3/2011 | Wilcox | .................. | G06Q 10/08 |
| | | | | | 340/568.1 |
| 7,950,578 | B2 * | 5/2011 | Majer | .................... | G07F 9/002 |
| | | | | | 235/381 |
| 7,974,853 | B1 * | 7/2011 | Zimmerman | .......... | G06Q 10/04 |
| | | | | | 705/7.11 |
| 8,140,397 | B2 * | 3/2012 | Robinson | ............... | A01D 91/00 |
| | | | | | 705/25 |
| 8,284,056 | B2 | 10/2012 | McTigue | | |
| 8,432,257 | B2 | 4/2013 | Hind et al. | | |
| 8,504,234 | B2 * | 8/2013 | Anderson | ................ | A01G 7/06 |
| | | | | | 701/24 |
| 8,505,488 | B2 * | 8/2013 | Pratt | ........................ | H04B 7/26 |
| | | | | | 119/174 |
| 8,800,867 | B2 | 8/2014 | Majer | | |
| 8,976,029 | B1 * | 3/2015 | McTigue | ............ | G06Q 10/087 |
| | | | | | 235/382 |
| 9,051,163 | B2 * | 6/2015 | Mehus | .................. | B67D 7/303 |
| 9,052,228 | B2 * | 6/2015 | Sollazzo Lee | ....... | G01G 13/026 |
| 9,412,086 | B2 * | 8/2016 | Morse | .................. | G06K 7/1417 |
| 9,514,323 | B2 * | 12/2016 | Mehring | ................ | G06F 21/10 |
| 9,550,662 | B1 * | 1/2017 | Brown | .................. | B67D 7/348 |
| 9,569,748 | B2 * | 2/2017 | Peters, Jr. | .............. | G07F 9/002 |
| 9,648,446 | B2 * | 5/2017 | Neves | .................... | H04L 67/12 |
| 9,691,114 | B2 * | 6/2017 | Ashrafzadeh | .......... | G16H 20/13 |
| 9,704,122 | B2 * | 7/2017 | Jung | ............... | G06Q 10/06313 |
| 9,851,240 | B2 * | 12/2017 | Sollazzo Lee | ....... | G01G 19/306 |
| 10,664,796 | B2 * | 5/2020 | Aji | ...................... | G06Q 30/0251 |
| 10,694,655 | B2 | 6/2020 | Wintemute et al. | | |
| 10,963,825 | B2 * | 3/2021 | Tatge | .................. | G06F 13/4282 |
| 11,229,155 | B2 | 1/2022 | Wintemute et al. | | |
| 11,330,756 | B2 | 5/2022 | Wintemute et al. | | |
| 11,793,102 | B2 | 10/2023 | Wintemute | | |
| 2004/0124988 | A1 * | 7/2004 | Leonard | ............. | B05B 11/0054 |
| | | | | | 340/612 |
| 2004/0128045 | A1 * | 7/2004 | Benneweis | .......... | A01C 21/005 |
| | | | | | 239/69 |
| 2005/0075899 | A1 * | 4/2005 | Corcoran | .......... | G06Q 10/0831 |
| | | | | | 705/331 |
| 2005/0114270 | A1 | 5/2005 | Hind | | |
| 2006/0004484 | A1 * | 1/2006 | Hornbaker | ........... | G06Q 10/087 |
| | | | | | 700/225 |
| 2006/0124752 | A1 * | 6/2006 | Posamentier | ...... | G06K 19/0723 |
| | | | | | 235/375 |
| 2006/0271555 | A1 | 11/2006 | Beck et al. | | |
| 2006/0280181 | A1 * | 12/2006 | Brailas | .................... | H04W 4/80 |
| | | | | | 340/572.1 |
| 2007/0000989 | A1 * | 1/2007 | Kadaba | ................... | B07C 3/008 |
| | | | | | 235/375 |
| 2007/0219916 | A1 * | 9/2007 | Lucas | .................... | G06Q 10/08 |
| | | | | | 705/58 |
| 2008/0001746 | A1 * | 1/2008 | Childress | ............... | G06Q 10/08 |
| | | | | | 705/28 |
| 2008/0010172 | A1 * | 1/2008 | Magill | ................. | G06Q 10/087 |
| | | | | | 705/28 |
| 2008/0029432 | A1 * | 2/2008 | Elliott | .................. | C10G 11/187 |
| | | | | | 340/572.1 |
| 2008/0050286 | A1 * | 2/2008 | Elliott | ..................... | B01J 8/003 |
| | | | | | 422/232 |
| 2008/0157918 | A1 * | 7/2008 | Black | ............... | H01M 8/04313 |
| | | | | | 340/5.8 |
| 2008/0157967 | A1 * | 7/2008 | Jones | ..................... | G01G 19/42 |
| | | | | | 340/572.1 |
| 2008/0177605 | A1 * | 7/2008 | Zimmerman | .......... | G06Q 10/06 |
| | | | | | 705/7.37 |
| 2009/0009194 | A1 * | 1/2009 | Seguine | .................. | G01D 5/24 |
| | | | | | 324/684 |
| 2009/0120697 | A1 * | 5/2009 | Wilner | ................. | G01D 5/2405 |
| | | | | | 178/18.06 |
| 2009/0125350 | A1 * | 5/2009 | Lessing | .................. | G06Q 10/08 |
| | | | | | 705/7.12 |
| 2009/0187424 | A1 * | 7/2009 | Grabowski | ............ | G16H 40/63 |
| | | | | | 705/2 |
| 2009/0276338 | A1 * | 11/2009 | Masermann | ......... | G06Q 10/087 |
| | | | | | 235/487 |
| 2010/0007464 | A1 * | 1/2010 | McTigue | ............ | G06Q 10/087 |
| | | | | | 340/10.1 |

(56)　　　　References Cited

U.S. PATENT DOCUMENTS

| | | | |
|---|---|---|---|
| 2010/0102930 A1* | 4/2010 | Mccoy ................ | G07F 17/0092 |
| | | | 340/5.92 |
| 2010/0146587 A1* | 6/2010 | Sholes ................... | B67D 7/348 |
| | | | 726/2 |
| 2010/0252626 A1* | 10/2010 | Elizondo .............. | G06Q 10/087 |
| | | | 340/10.51 |
| 2011/0035055 A1* | 2/2011 | Applegate ............. | A01C 21/00 |
| | | | 700/265 |
| 2011/0047042 A1* | 2/2011 | Blickhan ................ | G06Q 10/06 |
| | | | 705/26.25 |
| 2011/0197550 A1* | 8/2011 | Carlson ................ | B31D 5/0047 |
| | | | 53/115 |
| 2012/0055815 A1* | 3/2012 | Truex ..................... | A62B 27/00 |
| | | | 206/205 |
| 2012/0059513 A1* | 3/2012 | Perkins ................ | B67D 1/0829 |
| | | | 222/23 |
| 2012/0089304 A1* | 4/2012 | Hamilton .............. | G06Q 99/00 |
| | | | 701/50 |
| 2013/0110357 A1* | 5/2013 | Peterson ................ | A01C 21/00 |
| | | | 701/50 |
| 2013/0297066 A1* | 11/2013 | Alvern ................... | G07F 9/002 |
| | | | 700/232 |
| 2013/0314244 A1* | 11/2013 | Hershberger .......... | H04W 4/80 |
| | | | 340/870.02 |
| 2014/0067129 A1* | 3/2014 | Motavalli ......... | G06Q 10/0631 |
| | | | 700/266 |
| 2014/0149265 A1* | 5/2014 | Kundra .................. | G06Q 50/12 |
| | | | 705/28 |
| 2014/0277710 A1 | 9/2014 | Akdogan et al. | |
| 2014/0278508 A1* | 9/2014 | Akdogan .............. | A61J 7/0481 |
| | | | 705/2 |
| 2014/0339301 A1* | 11/2014 | Angus .................... | G06Q 40/04 |
| | | | 235/379 |
| 2014/0368318 A1* | 12/2014 | Paris, Jr. ............. | G06Q 10/087 |
| | | | 340/10.1 |
| 2015/0059626 A1* | 3/2015 | Conrad .............. | A01M 7/0092 |
| | | | 111/120 |
| 2015/0109143 A1 | 4/2015 | Hershberger et al. | |
| 2015/0134129 A1* | 5/2015 | Kidder ................. | A01C 23/007 |
| | | | 700/284 |
| 2015/0160660 A1* | 6/2015 | Winkler .............. | G05D 7/0635 |
| | | | 137/565.16 |
| 2015/0186196 A1* | 7/2015 | Elfstrom ................. | G06F 11/00 |
| | | | 222/64 |
| 2015/0235170 A1* | 8/2015 | Mallers .............. | G06Q 10/0832 |
| | | | 705/332 |
| 2015/0235232 A1* | 8/2015 | Meyer ................... | G06Q 50/02 |
| | | | 705/317 |
| 2015/0375984 A1* | 12/2015 | Arcand ................ | G07F 13/065 |
| | | | 141/94 |
| 2016/0019494 A1* | 1/2016 | Millett ................ | G06Q 10/087 |
| | | | 235/385 |
| 2016/0147962 A1 | 5/2016 | Vollmar | |
| 2016/0264394 A1* | 9/2016 | Hershberger ........ | B67D 1/0888 |
| 2016/0308954 A1* | 10/2016 | Wilbur ................... | H04L 67/52 |
| 2017/0000022 A1* | 1/2017 | Conrad ................ | A01C 23/047 |
| 2017/0116654 A1* | 4/2017 | Atwood ................ | G06Q 10/30 |
| 2017/0265374 A1* | 9/2017 | Wintemute ......... | A01M 7/0092 |
| 2017/0337535 A1* | 11/2017 | Jones ................ | G06Q 10/0833 |
| 2018/0014456 A1* | 1/2018 | Conrad ................... | A01C 7/102 |
| 2018/0092296 A1 | 4/2018 | Conrad et al. | |
| 2018/0255696 A1* | 9/2018 | Wintemute .......... | A01B 79/005 |
| 2020/0267889 A1 | 8/2020 | Wintemute et al. | |
| 2021/0019429 A1 | 1/2021 | Cooner | |
| 2021/0264550 A1* | 8/2021 | Coast ..................... | G01G 17/00 |
| 2021/0282311 A1* | 9/2021 | Wintemute .............. | A01C 7/10 |
| 2022/0142037 A1 | 5/2022 | Wintemute et al. | |
| 2023/0018607 A1* | 1/2023 | Klavins ................ | G06Q 30/018 |
| 2023/0247929 A1 | 8/2023 | Wintemute | |
| 2023/0247930 A1* | 8/2023 | Wintemute .......... | G06Q 10/087 |
| | | | 705/28 |
| 2024/0099178 A1 | 3/2024 | Wintemute | |
| 2025/0026696 A1* | 1/2025 | Meyer ...................... | C05G 5/10 |

FOREIGN PATENT DOCUMENTS

| | | |
|---|---|---|
| AU | 2021202605 B2 | 9/2021 |
| AU | 2021266364 B2 | 9/2022 |
| CA | 3062442 C | 12/2021 |
| CN | 1639706 A | 7/2005 |
| CN | 1788277 A | 6/2006 |
| CN | 101002217 | 7/2007 |
| CN | 101030274 A | 9/2007 |
| CN | 102576083 | 7/2012 |
| CN | 105593881 A | 5/2016 |
| CN | 110800017 A | 2/2020 |
| CN | 110800017 B | 8/2023 |
| EP | 3625754 A1 | 3/2020 |
| EP | 4131133 A1 | 2/2023 |
| EP | 3625754 B1 | 3/2023 |
| EP | 4145380 A1 | 3/2023 |
| EP | 4152232 A1 | 3/2023 |
| GB | 2417116 A | 2/2006 |
| JP | 2003223581 A | 8/2003 |
| JP | 2003267555 | 9/2003 |
| JP | 2004199332 A | 7/2004 |
| JP | 2005160423 A | 6/2005 |
| JP | 2009029015 A | 2/2009 |
| JP | 2009133769 | 6/2009 |
| JP | 2011045292 A | 3/2011 |
| JP | 2013225696 A | 10/2013 |
| JP | 2013230871 A | 11/2013 |
| JP | 2013235460 | 11/2013 |
| JP | 2014035700 A | 2/2014 |
| JP | 2016066293 A | 4/2016 |
| JP | 2020520003 A | 7/2020 |
| JP | 6871421 B2 | 5/2021 |
| JP | 202177098 | 5/2021 |
| JP | 2021119485 A | 8/2021 |
| JP | 2023025155 A | 2/2023 |
| JP | 7263430 B2 | 4/2023 |
| JP | 7519422 | 7/2024 |
| JP | 7588175 | 11/2024 |
| KR | 20080036031 A | 4/2008 |
| KR | 102410751 B1 | 6/2022 |
| KR | 102601820 | 11/2023 |
| MX | 408204 | 11/2023 |
| MY | 201839 A | 3/2024 |
| TH | 1901007186 A | 5/2024 |
| TW | M377654 U | 4/2010 |
| TW | M522426 U | 5/2016 |
| TW | 202316355 A | 4/2023 |
| TW | I848364 | 7/2024 |
| WO | 2013063558 | 5/2013 |
| WO | 2013063558 A1 | 5/2013 |
| WO | 2015061570 A1 | 4/2015 |
| WO | 2016147521 A | 9/2016 |
| WO | 2016147521 A1 | 9/2016 |
| WO | 2018213428 A1 | 11/2018 |
| WO | 2020252013 A1 | 12/2020 |
| WO | 2021090221 A1 | 5/2021 |
| WO | 2023043497 A1 | 3/2023 |

OTHER PUBLICATIONS

Allowance Notice mailed Mar. 16, 2021, in Japanese patent application No. 2019-561181, 5 pages. (including English Translation).

Examination Report mailed Apr. 28, 2022, in Australian application No. 2021266364, 5 pages.

Examination Report mailed Jan. 25, 2022, in Australian application No. 2021266364, 8 pages.

Examiner's Requisition mailed Mar. 1, 2021, in Canadian patent application No. 3,062,442, 3 pages.

Extended European Search Report mailed Jun. 18, 2020, in European patent application No. 18802729.6, 8 pages.

Final Office Action mailed Oct. 15, 2021, by the Korean Patent Office in patent application No. 10-2019-7037373, 7 pages (including English Translation).

First Examination Report mailed Aug. 11, 2020 in Canadian patent application No. 3,062,442, 6 pages.

First Examination Report mailed Jun. 22, 2020 in Austalian patent application No. 2018271112, 7 pages.

(56) References Cited

OTHER PUBLICATIONS

First Examination Report mailed Aug. 5, 2021, by the Indian Patent Office in application No. 201927051825, 7 pages.
First Examination Report mailed Feb. 3, 2021, in European patent application No. 18802729.6, 5 pages.
First Examination Report mailed Jan. 12, 2021 in Taiwan patent application No. 107116755, 12 pages. (English translation included).
First Examination Report mailed May 11, 2021, in Australian patent application No. 2021202605, 7 pages.
First Office Action mailed Jan. 29, 2021, in Eurasian patent application No. 201992678, 4 pages. (English translation included).
First Office Action mailed Mar. 11, 2021, by the Korean Patent Office in patent application No. 10-2019-7037373, 20 pages (including English Translation).
First Substantive Requirement mailed Mar. 27, 2022, in Dominican patent application No. P2019-0286, 6 pages.
International Preliminary Report on Patentability issued Sep. 18, 2019 in international patent application No. PCT/US2018/032941, 7 pages.
International Search Report and Written Opinion mailed Sep. 17, 2018, in connection with corresponding PCT Application No. PCT/US2018/032941 filed on May 16, 2018.
Non-Final Office Action mailed Sep. 9, 2021, in U.S. Appl. No. 17/316,273 of Eric G. Wintemute, filed May 10, 2021, 30 pages.
Notice of Acceptance mailed Aug. 19, 2021, in South African patent application No. 2019/07309, 2 pages.
Notice of Acceptance mailed Aug. 25, 2022, in Australian application No. 2021266364, 4 pages.
Notice of Acceptance mailed Aug. 27, 2021, in Australian patent application No. 2021202605, 11 pages.
Notice of Allowance mailed Feb. 13, 2020 for U.S. Appl. No. 15/981,289 of Eric G. Wintemute, filed May 16, 2018, 33 pages.
Notice of Allowance mailed Feb. 17, 2022, for U.S. Appl. No. 16/872,932 of Eric G. Wintemute, filed May 12, 2020, 45 pages.
Notice of Allowance mailed Jul. 26, 2021, in Canadian patent application No. 3,062,442, 1 page.
Notice of Allowance mailed Oct. 19, 2021, in U.S. Appl. No. 17/316,273 of Eric G. Wintemute, filed May 10, 2021, 8 pages.
Notice of Decision of Granting mailed Jan. 20, 2022, in Eurasian patent application No. 201992678, 9 pages. (including English Translation).
Notice of Decision to Grant mailed Mar. 23, 2022, by the Korean Patent Office in patent application No. 10-2019-7037373, 3 pages (including English Translation).
Notification of Reasons for Refusal mailed Jul. 5, 2022, in Japanese patent application No. 2021-068285, 7 pages.
Office Action mailed Feb. 25, 2022, in Argentina patent application No. P180101331, 6 pages.
Second Examination Report mailed Apr. 14, 2021 in Austalian patent application No. 2018271112, 6 pages.
Second Examination Report mailed Jul. 7, 2021, in Australian patent application No. 2021202605, 6 pages.
Second Office Action mailed Aug. 27, 2021, in Eurasian patent application No. 201992678, 12 pages.
Summons to Oral Proceedings mailed Sep. 8, 2021, in European patent application No. 18802729.6, 9 pages.
Technical Report mailed Dec. 7, 2021, in Bolivian patent application No. SP-00119-2018, 11 pages (English translation included).
Australian Examination Report No. 1 issued in App. No. AU2022348386, dated Nov. 20, 2024, 5 pages.
Australian Examination Report No. 2 issued in App. No. AU2022348386 dated Feb. 24, 2025, 7 pages.
Certificate of Patent for Invention issued in App. No. JP2023-064595, dated Nov. 13, 2024, 4 pages.
Korean Office Action (including English translation) issued in App. No. KR20237038591, dated Nov. 12, 2024, 25 pages.
Certificate of Patent for Invention issued in App. No. CN201880035157, dated Aug. 8, 2023, 4 pages.
Korean Notice of Allowance (including English translation) issued in App. No. KR10-2022-7019788, dated Aug. 11, 2023, 4 pages.

Office Action (Notice of Allowance and Fees Due (PTOL-85)) dated Aug. 29, 2023 for U.S. Appl. No. 17/580,601 (pp. 1-8).
"NMG—Screw Flow Meter," short information sheet published by NATEC Sensors GmbH of Garching, Germany, online, date unknown, 1 page. Available online at <<https://assets-global.website-files.com/5dee704ab85924558800c9b2/5ed7bce25da1a49524c037eb_nme-nmg-screw-flow-meter-overview-eng.pdf>>.
Notice of Allowance mailed Mar. 14, 2023, in Japanese patent application No. 2021-068285, 3 pages. (English Translation).
Office Action mailed Mar. 20, 2023, in Eurasian patent application No. 202290900, 9 pages.
Australian Examination Report issued in App. No. AU2022256161, dated Oct. 11, 2023, 5 pages.
Hearing Notice issued in App. No. IN201927051825, dated Nov. 14, 2023, 2 pages.
Office Action issued in App. No. TW111134247, dated Oct. 11, 2023, 22 pages.
Examination Report mailed May 4, 2023, in European patent application No. 22199274.6, 6 pages.
Non-Final Office Action mailed May 25, 2023, in U.S. Appl. No. 18/120,184 of Eric G. Wintemute, filed Mar. 10, 2023, 27 pages.
Non-Final Office Action mailed May 25, 2023, in U.S. Appl. No. 18/120,198 of Eric G. Wintemute, filed Mar. 10, 2023, 28 pages.
Office Action mailed Apr. 28, 2023, in European patent application No. 22173107.8, 8 pages.
Office Action issued (including English translation) in App. No. UY37737, dated Dec. 15, 2023, 5 pages.
Brazilian Search Report issued in App. No. BR112019024021-7, dated Jan. 20, 2024, 4 pages.
International Preliminary Report on Patentability issued in App. No. PCT/US2022/026024, mailing date Mar. 28, 2024, 10 pages.
Japanese Office Action issued in App. No. JP2023-064595, dated Mar. 19, 2024, 4 pages.
Response to Australian Examination Report in App. No. AU2022256161, dated Mar. 27, 2024, 22 pages.
Submission of Written Arguments in Support of Oral Arguments Made During the Hearing issued in App. No. IN201927051825, dated Feb. 16, 2024, 26 pages.
Australian Examination Report No. 5 issued in App. No. AU2022256161, dated Sep. 18, 2024, 5 pages.
English translation of EA Office Action issued in App. No. EA202490344, dated Oct. 2, 2024, 2 pages.
Notice of Acceptance issued in App. No. ZA202402819, dated Oct. 16, 2024, 2 pages.
Examiner's Report mailed Dec. 22, 2022 in Canadian patent application No. 3,138,651, 5 pages.
Extended European Search Report mailed Feb. 3, 2023, in European patent application No. 22203127.0, 8 pages.
First Office Action mailed Jan. 11, 2023, in Chinese patent application No. 201880035157.4, 11 pages.
Office Action mailed Feb. 21, 2023, in Korean patent application No. 10-2022-7019788, 10 pages.
Australian Examination Report No. 2 issued in App. No. AU2022256161, dated Dec. 5, 2023, 5 pages.
Communication pursuant to Article 94(3) issued in App. No. EP22173107, dated Dec. 18, 2023, 9 pages.
Malaysian Office Action issued in Application No. PI2019006671, mailed May 29, 2023, 4 pages.
Mexican Office Action (including English translation) issued in App. No. MX/a/2019/013637, dated Jun. 7, 2023, 7 pages.
Notice of Allowance dated Jul. 17, 2023 for U.S. Appl. No. 18/120,198 (pp. 1-9).
Notice of Allowance dated Jul. 18, 2023 for U.S. Appl. No. 18/120,184 (pp. 1-9).
Office Action (Ex Parte Quayle Action) dated Aug. 1, 2023 for U.S. Appl. No. 17/580,601 (pp. 1-7).
Response to EP Communication dated Jul. 27, 2023, in EP Application No. EP22203127.0, 26 pages.
International Search Report and Written Opinion mailed Aug. 3, 2022, in international patent application No. PCT/US2022/026024, 12 pages.
Search Report mailed Aug. 17, 2022, in Eurasian patent application No. 202290900, 8 pages.

(56)                References Cited

OTHER PUBLICATIONS

Communication under Rule 71(3) EPC mailed Oct. 21, 2022, in European patent application No. 18802729.6, 9 pages.
Extended European Search Report mailed Oct. 25, 2022, in European patent application No. 22173107.8, 8 pages.
First Examination Report mailed Oct. 28, 2022, in Ukrainian patent application No. a201911906, 10 pages.
Second Substantive Requirement mailed Oct. 11, 2022, in Dominican patent application No. P2019-0286, 3 pages.
Australian Examination Report No. 4 issued in App. No. AU2022256161, dated Apr. 29, 2024, 6 pages.
Office Action issued in App. No. PH1-2019-502584, dated Jun. 25, 2024, 4 pages.
Response to EP Communication dated Mar. 22, 2024, in App. No. EP22173107, 5 pages.
Response to Substantive Examination Report issued in App. No. PH1-2019-502584, dated Jun. 18, 2024, 128 pages.
Substantive Examination Report issued in App. No. PH1-2019-502584, dated Apr. 12, 2024, 7 pages.
Japanese Office Action (including English translation) issued in App. No. JP2024-516887 dated Oct. 29, 2025 (pp. 1-9).
PwC Arata LLC edition (May 10, 2021), Blockchain in Business: Creating New Ventures and Governance& Related Systems, Chuokeizai-Sha Holdings, Inc., 1st Edition, 1st Printing, pp. 28-50 (Well-knownArt).
Examination Report issued in App. No. IN202427029265, dated Jul. 28, 2025, 7 pages.
L. John Junod et al., "S1000D Issue 4.0.1 Tagging and Authoring Guidelinesfor Standard NAVSEA Integrated PublishingProcess", United States Navy, Dec. 2014, 142 pages.
Traceability solutions for supply chains in 2023; Traceability solutions for supply chains, with examples; up-to-date guide to help you stay ahead . (pp. 1-39).
Mexican Office Action (including English translation) issued in App. No. MX/a/2023/013628, dated Nov. 24, 2025, 8 pages.
Mexican Office Action (including English translation) issued in App. No. MX/a/2023/013629, dated Nov. 24, 2025, 8 pages.
Ukrainian Office Action (including English translation) issued in App No. a201911906 dated Dec. 30, 2025, 12 pages.

* cited by examiner

Export to External Database: Identify unique id for Tagged Container A, unique identity of Possessor, Product, batch, lot, quantity of Product consumed, date, time, location of action 351

From FIG. 3F

To FIG. 3N

SECURE AND VERIFIABLE TRACKING OF AGRICULTURAL PRODUCTS

BACKGROUND

As societal and governmental concerns about climate change increase in prominence, there is an increasing demand to reduce the carbon footprint resulting from the release of Greenhouse Gases (GHG) associated with production of commercially grown food and fiber crops, where the best management practices (BMPs) associated with such practices reflect a balance between reducing the carbon footprint that results from producing the crop and agricultural productivity.

Nitrogen is an essential component of life, required for building proteins and DNA, and despite being abundant in the atmosphere, only limited reserves of inorganic soil nitrogen are available to plants in useable form, those being primarily nitrate ($NO_3^-$) and/or ammonium ($NH_4^+$). Thus, agricultural yields are often limited by nitrogen availability unless supplemental forms of nitrogen are applied. At the beginning of the 20th century, German chemists, Fritz Haber and Carl Bosch, invented and developed an industrial scale process for the conversion of atmospheric nitrogen into ammonium, one of the forms of nitrogen which is readily available and useable by plants. The use of synthetic or manufactured nitrogen fertilizer was the primary contributor to drastically increased crop production during the Green Revolution, especially in developing countries. According to the Association of American Plant Food Control Officials, any fertilizer manufactured from one or more synthetic materials containing no animal parts, animal byproducts, manures, or renderings shall be considered as "synthetic" fertilizer, so all nitrogen fertilizer that is manufactured using an adaptation of the Haber-Bosch process is considered to be synthetic fertilizer.

The subsistence of nearly half of the world population is currently dependent on the use of such synthetic fertilizers, but the process to convert atmospheric nitrogen into useable crop fertilizer requires vast amounts of energy, estimated to be between 1 and 2% of total global energy consumption. For example, about one ton of natural gas is required to produce one ton of manufactured nitrogen fertilizer. While one ton of fertilizer might be sufficient to supply the nitrogen requirements of 4 to 5 acres of high-yielding corn, a similar quantity of petroleum energy, as measured in British Thermal Units (BTU's) in the form of gasoline will power an automobile that gets an average of just 20 miles per gallon, a distance of more than 8,000 miles.

While nitrogen fertilizer is a key factor in the high crop yields produced by modern agriculture, it also represents the largest single source of global agriculture GHG emissions. Manufactured nitrogen fertilizer use results in significant emissions of nitrous oxide ($N_2O$), a GHG with approximately 300 times the global warming potential of carbon dioxide ($CO_2$). In the U.S. alone, $N_2O$ emissions from cropland soils were approximately 195 million metric tons of $CO_2$-equivalent, according to the U.S. Environmental Protection Agency's 2014 National Greenhouse Gas Inventory. This amount is comparable to the emissions of approximately 41 million passenger vehicles annually.

Ammonium nitrate (AN) is the most commonly used source of nitrogen in European agriculture. UAN (urea ammonium nitrate) consists of urea, ammonia, and nitric acid. The average carbon footprint from AN fertilizer use is approximately 5.6 kg $CO_2$-eqv per kg applied nitrogen. Said another way, approximately 5.6 tons of GHG are released into the atmosphere for each ton of applied nitrogen fertilizer.

American Carbon Registry (ACR) is a leading US-based carbon offset program that has been recognized for strong environmental integrity standards. Founded in 1996 as the first private voluntary offset program in the world, ACR developed rigorous, science-based carbon offset standards and methodologies, and has operational experience in carbon offset project registration, verification oversight and offset issuance. ACR is also an approved Carbon Offset Project Registry and Early Action Carbon Offset Program for the California Cap-and-Trade program, the first economy-wide Cap-and-Trade program in the U.S. As an accrediting organization, ACR oversees the registration and verification of carbon offset projects following approved carbon accounting methodologies or protocols and issues offsets on a transparent registry system. Each offset represents the reduction or removal from the atmosphere equivalent to one metric ton of carbon dioxide.

An organization known as The Delta Institute launched a USDA/NRCS-supported nitrogen Credit Program that provided eligible Corn Belt farmers a financial incentive for the carbon credits that were credited to their accounts for having voluntarily reduced nitrous oxide ($N_2O$) emissions as a consequence of using less nitrogen-based fertilizer to produce their corn crop. Participating farmers were compensated for the GHG emissions reductions they achieved by selling their carbon credits to The Climate Trust, a non-profit formed in 1997 that manages carbon offset acquisition programs and projects for organizations seeking to reduce their carbon footprint.

GHG emissions reductions for farmers who participated in the program were quantified and verified via an ACR-approved methodology that was developed by Michigan State University (MSU) and the Electric Power Research Institute (EPRI). The MSU-EPRI methodology represents 3 years of scientific research by MSU scientists conducted at the National Science Foundation's Kellogg Biological Station Long-term Ecological Research site and on commercial farms in Michigan.

These field trials demonstrated that the applied rate of nitrogen fertilizer per treated area (acre, hectare, etc.) is the best predictor of $N_2O$ emissions in US corn production. Programs like this are evidence that farmers can reap financial rewards, primarily in the form of saleable carbon credits, for reducing $N_2O$ emissions. However, several challenges must be addressed to enable widespread adoption of similar practices on a global scale.

For example, one issue that must be addressed is how to reduce the use of nitrogen fertilizer without a corresponding decrease in crop yields. All plants require nitrogen in order to grow and live. Nitrogen is a major component of chlorophyll, the compound by which plants use sunlight energy to produce sugars from water and carbon dioxide (i.e., photosynthesis). It is also a major component of amino acids, the building blocks of proteins. Without proteins, plants wither and die.

Corn plants use large quantities of nitrogen to grow and to produce economically viable yields. Corn removes approximately 1 pound of nitrogen from the soil for every bushel of grain produced, so a 250 bushel per acre yield goal will remove approximately 250 pounds of nitrogen from the soil. Because even the most productive soils do not naturally contain that much nitrogen, supplemental, manufactured nitrogen fertilizer that is produced using various adaptations of the previously described Haber-Bosch method is added to the soil by farmers in order to achieve the high yields that are necessary to satisfy global demand at commercially acceptable profit levels for farmers. While corn is repeatedly referenced throughout this document as an example crop, all commercially grown non-leguminous crops require supplemental nitrogen in order to produce economically viable crop yields, and corresponding reduction in GHG emissions will also occur in response to reduced use of manufactured nitrogen fertilizer in those crops.

Unlike corn and other non-leguminous crops, legume crops, such as soybeans, peanuts, peas, vetches, clovers, and others, grow in a symbiotic relationship with soil-dwelling nitrogen-fixing rhizobia bacteria that take or "fix" gaseous nitrogen from the air in the soil and feed this nitrogen to the legumes. In exchange for the nitrogen received from these soil-borne bacteria, leguminous plants provide necessary carbohydrates to the bacteria. The ability of legumes to receive essentially all of their nitrogen requirements from atmospheric nitrogen is based primarily on their ability to produce root nodules in which the nitrogen-fixing bacteria reside and reproduce. Nitrogen fixation by legumes can be in the range of 25-75 pounds of nitrogen per acre per year in a natural ecosystem, and several hundred pounds per acre per year in a cropping system. Consequently, in most commercial crop production schemes, leguminous crops do not normally require or receive supplemental nitrogen fertilizer treatments. Some legume crops are inoculated with rhizobia bacteria-based products to enhance the early development of the root nodules that enable legumes to fix nitrogen from the atmosphere.

Scientific studies have demonstrated that non-leguminous plants like corn, sugar beets, potatoes, wheat, and others can also benefit from a symbiotic relationship with nitrogen-fixing bacteria, but unfortunately, non-leguminous crops do not form or produce the root nodules that are necessary for rhizobia bacteria to thrive and reproduce. Multiple agricultural universities and agricultural input companies are conducting research regarding the use of soil inoculants that consist of a consortium of non-native microbes that will infect non-leguminous plants for the purpose of enabling those plants to fix or obtain a portion of their nitrogen requirements from atmospheric nitrogen in an manner that is consistent with that used by legumes, even though the non-leguminous plant still will not produce the root nodules that previously were believed to be essential for plant nitrogen fixation. Essential to understanding this process is the fact that, unlike legumes that normally completely satisfy all of their nitrogen requirements from the atmospheric supply, non-leguminous plants that utilize N-fixing microbes will only be able to satisfy a portion of their total nitrogen requirement as a consequence of being inoculated with these non-native soil microbes. However, because there are significant environmental and societal benefits from even relatively small reductions in the use of nitrogen fertilizer, due in part from the significant reduction in GHG emissions associated with such reductions, the potential to substitute even a portion of manufactured nitrogen fertilizer with N-fixing inoculants for use on non-leguminous plants such as corn and others, is attractive. The opportunity for farmers to earn and receive financial incentives in the form of carbon credits for having reduced GHG emissions in conjunction with the combined practices of using N-fixing inoculants to enable a corresponding reduction of manufactured nitrogen fertilizer increases the likelihood of timely and rapid adoption of these practices on a global scale.

One example of an N-fixing bacterial product that can be used to replace a portion of manufactured nitrogen fertilizer is Envita™ from Azotic North America. Azotic-published results from well-managed on-farm trials reveal that Envita-inoculated non-leguminous crops that were produced using approximately 25% less manufactured nitrogen than was used in the control comparison, produced yields that were comparable to the comparison control crops which were produced while using a full-rate of manufactured nitrogen fertilizer. Unlike the rhizobia bacteria that legumes use to fix nitrogen, whose presence is limited to roots and root nodules, Envita-based microbes are present throughout the plant, including the leaves, and the nitrogen that is fixed by these microbes is used by the plant to produce chlorophyll. Envita is only one product of a number of nitrogen-producing microbial products that are currently available or in development, with the purpose of enabling non-leguminous plants to satisfy a portion of their nitrogen requirements from fixed atmospheric nitrogen. An additional example of an N-fixing product is PROVEN™, from Pivot Bio. According to statements from Pivot Bio, "PROVEN takes nitrogen out of the air, and through the use of bacteria, it makes ammonia. That bacteria lives on the roots of corn and it feeds that ammonia to the corn plant. This process provides a constant source of nitrogen for the plant during the growing season, no matter the weather."

Scientific advances in the development and production of N-fixing microbial products such as Envita, PROVEN, and others demonstrate that the potential for significant reductions in nitrogen fertilizer-related GHG emissions is real, but wide-scale adoption will only occur if farmers have a financial incentive to replace the known performance of applying manufactured nitrogen fertilizer at 100% of historical rates, with the yet-to-be-proven consistency of applying fertilizer at, for example, 75% of historical rates in combination with an N-fixing microbial product like Envita. Some N-fixing products have demonstrated that it is possible to maintain historic average yield production while reducing applied nitrogen fertilizer rates by as much or more than 50%, when such fertilizer reduction is combined with the use of N-fixing microbial products.

Although the description above has focused on agricultural crops and the land area or fields that are used in the production of those crops, it should be understood that large areas of grassland are used for the purpose of hay production, for use as livestock food, or for livestock grazing, where rather than being harvested by machine and stored, livestock, via the process of grazing, consumes as food, the living plant material from the area in which they graze. Much grassland, whether used for hay production or for livestock grazing is also fertilized with synthetic nitrogen fertilizer, so the objective of reducing fertilizer use on grassland in order to reduce the GHG emissions associated with grassland fertilization, and the practices for doing so, fall within the definition of reducing agricultural use of synthetic nitrogen fertilizer.

As described above, organizations such as The Climate Trust are willing to pay farmers for carbon credits that are validated by an accrediting organization such as American Carbon Registry. Once an accrediting agency such as American Carbon Registry validates that a farmer indeed reduced the use of manufactured nitrogen fertilizer by a specific quantity, versus the quantity of fertilizer that would normally be applied using Best Management Practices for that specific crop in that particular locale, using the 5.6 to 1 ratio for GHG emissions per ton of manufactured AN fertilizer, it is a simple arithmetic problem to calculate the reduction of GHG emissions associated with the reduced quantity of fertilizer applied per acre. 32% UAN fertilizer is a mixture of Ammonium Nitrate and water that contains 32% nitrogen, so one ton of manufactured UAN fertilizer contains 640 pounds of nitrogen. Using the previously cited example of 250 bushel-per-acre corn requiring 250 pounds of nitrogen, a 25% reduction in this amount is 62.5 pounds. Using the 5.6-to-1 ratio described previously, reveals that a 62.5 pound per acre reduction in manufactured nitrogen fertilizer will result in a corresponding GHG emission reduction of 350 pounds per acre. Carbon Credits are normally calculated and paid in the USA on the basis of how many tons of GHG emission reductions were produced. Since 350 pounds represents 17.5% of one 2,000 pound ton, each acre on which it can be confirmed that the applied nitrogen fertilizer application rate was reduced by 62.5 pounds versus the rate that normally would have been required and applied to produce the target yield, should be eligible to earn a carbon credit that is equal to the going per-ton credit value at the time. A February 2020 report from S&P Global, one of the world's leading agriculture consulting firms reported the following: "Carbon prices have already been implemented in 40 countries and 20 cities and regions. According to a 2019 World Bank report on trends in carbon pricing, a carbon price range of US$40-80 per ton is necessary by 2020 to reach the goals set by the 2015 Paris Agreement." Using the midpoint number of $60 per ton for this exercise, 17.5% of $60 yields a per-acre carbon credit value of $10.50 for the farmer in this example who reduced his manufactured nitrogen fertilizer use by 62.5 pounds per acre.

Confirmation or validation of the quantity of manufactured nitrogen that is actually applied to a field is challenging. While strict production-practice protocols were imposed and monitored in the cooperating farmer's fields that participated in the previously described ACR/Delta Institute nitrogen Credit Program, it is not feasible for Carbon Credit Accrediting Agencies and/or Carbon Credit Marketers to provide human oversight to the millions of fields which will be required in order for there to be wide-scale implementation of carbon credit payments to farmers in return for reduced GHG emissions stemming from the combined practice of reduced use of manufactured nitrogen fertilizer in combination with the application of N-fixing microbial products. A method or system of validating the total quantity of manufactured nitrogen fertilizer that is applied to each of many fields is not feasible to implement manually, nor is the process of validating that an N-fixing microbial product was applied to each of many fields in order to supplement the crop's nitrogen requirements in the presence of less applied manufactured nitrogen fertilizer. Validation of where and at what rate N-fixing and other soil health and regenerative agricultural crop inputs are applied is also important with regard to farmer-earned carbon credits, because in addition to being able to earn carbon credits for reducing the GHG emissions associated with producing a crop, farmers can also earn carbon credits for INCREASING the quantity of carbon that is stored or sequestered in field soils where commercially produced crops are grown.

SUMMARY

A computer-implemented system and method to collect and store data related to product stored in a container. In response to filling the container with the product, the following data are stored in at least one first record in an external database (such as a distributed ledger, e.g., blockchain): a product type of the first product; an amount of the first product filled into the first container; a unique identity of the first container; and a unique identity of a first user of the first container at the time of filling the first container with the first product. Data representing a unique identity of a container data module on the container are stored in the container data module. As the container moves, dispenses product, and undergoes changes in possession and ownership, data representing such events are stored in the distributed ledger and/or the container data module. As a result, a verifiable application/consumption record of the product within the container is generated.

DETAILED DESCRIPTION

Figure 1:
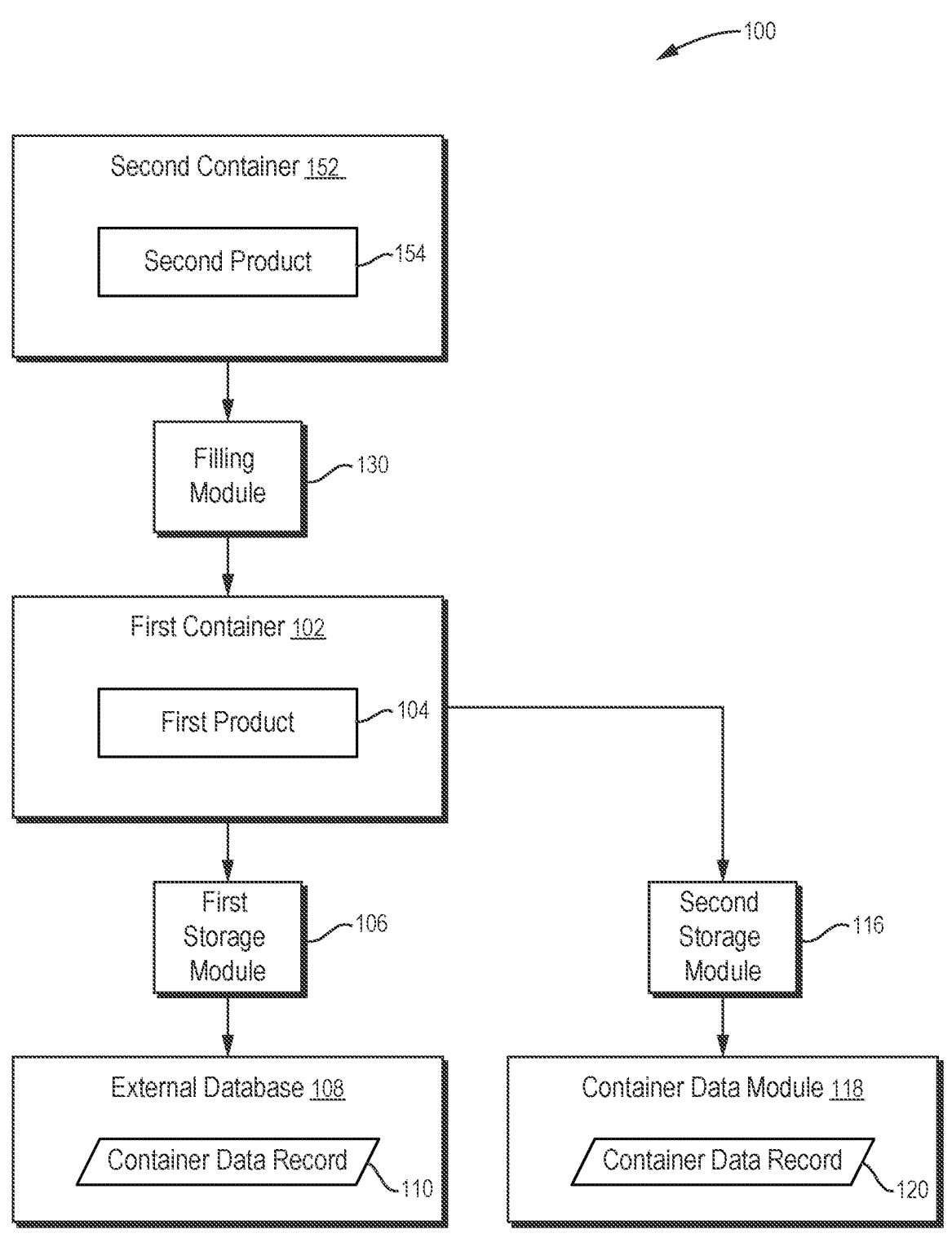
FIG. 1 is a diagram of a system for tracking product in a container according to one embodiment of the present invention.

Embodiments of the present invention are directed to computer-implemented methods and systems for recording, in an external database (such as a distributed ledger, e.g., a blockchain), information about agricultural products in containers. The following description discloses a variety of embodiments of such methods and systems.

Embodiments of the present invention may be used, for example, to verify that certain carbon credit-eligible activities were conducted in conformity with the requirements associated with earning a carbon credit or credits. For example, embodiments of the present invention may track a product at the point of manufacture, where the product is transferred to a tagged container that can communicate with product transfer equipment and product application equipment. In embodiments in which product information is stored on a container tag, that product information may include, for example, the type of product, the amount of product filled in the container, the location of the container at the time of filling, the date and time of filling, and the manufacturer, owner, and possessor of the product in the container and/or of the container itself. This establishes the provenance or forensic validity of the product that may be tracked, such as for the purpose of earning a carbon credit.

Embodiments of the present invention may also be used to verify that a reduction in product usage has been achieved, compared to some baseline. Such reduction in product usage may be beneficial for a variety of reasons, such as to reduce greenhouse gas emissions from synthetically manufactured nitrogen fertilizer, to reduce pesticide and nutrient environmental loading, to reduce effluent runoff in environmentally sensitive areas such as the Gulf of Mexico, Chesapeake Bay, and the Great Lakes, and/or in forest preserves, wetlands, and endangered species breeding areas. A key benefit of embodiments of the present invention is that they provide, in a way that is difficult or impossible to circumvent via fraud or human error, the ability to verify that such reductions have, or perhaps more importantly, have not, been achieved in compliance with environmental laws and regulations and corporate policies.

Embodiments of the present invention may also be used to verify that a particular product (e.g., pesticide or fertilizer) was used, or was not used (e.g., applied, dispensed, transferred, planted, or consumed), in a particular location or area (e.g., a specific latitude and longitude or set of latitudes and longitudes), or that no less or no more than a particular amount of a particular product was used (e.g., applied, dispensed, transferred, planted, or consumed) in a particular location or area. For example, embodiments of the present invention may use the records created and stored in an external database (e.g., a distributed ledger) to certify that an organic farm did not use non-organic chemicals. Such a process, in which records are created in a way that cannot be falsified, represents a significant improvement over existing techniques, which rely on the veracity and accuracy of human self-reporters, who can, whether intentionally or unintentionally, inaccurately record and/or report the use or non-use of particular chemical and/or chemicals in a particular location or area.

Certain embodiments disclosed herein use distributed ledgers to store information. A distributed ledger gives control of all its information and transactions to users of the ledger and promotes transparency. Distributed ledger technology minimizes transaction time and facilitates increased efficiency and automation. Greater security and customer confidence is frequently associated with distributed ledger accounting versus non-distributed ledger central database accounting, due to its decentralized nature and transaction record immutability.

Blockchain is one type of distributed ledger. Blockchain technology provides a way to securely and efficiently create a tamper-proof log of transaction activity. Blockchain technology is frequently used to provide forensic quality transaction accounting for a wide range of products, including international money transfers, non-fungible token (NFT) or crypto-currency transactions, shareholder records, and even agricultural produce, to name just a few. Distributed ledger accounting processes are fast and provide users a more secure, digital alternative to clearinghouse processes that are often time-consuming, paper-intensive, and expensive.

Data that is written to a distributed ledger is immutably etched on the network. With a series of transactions over time, an accurate and immutable audit trail is created. For audit and/or forensic purposes, this is very useful, as all data is stored in a place where no single entity owns or controls it, and no one can change what is already written. This provides benefits that are similar to double-entry bookkeeping, but with fewer chances of errors or fraud.

Transactional data stored in a central database that does not utilize distributed ledger technology can be as accurate as data that is stored in a distributed ledger, and embodiments disclosed herein may use distributed ledger technology and/or central databases to store data. While both types of systems can be 100% accurate and verifiable, distributed ledger technology facilitates the audit process and is generally perceived to be more trustworthy due to the immutability of the transactional records, since, as previously stated, all data is stored in a place where no single entity owns or controls it, and no one can change what has already been recorded. The ability to employ distributed ledger technology for the purpose of verifying time-stamped, geo-tagged application/consumption records of agricultural inputs and fuel can greatly increase the confidence associated with those records. This level of audit capability is useful for forensic accounting purposes, in the event of disputes that require legal adjudication. Forensic accountants analyze, interpret, and summarize complex financial and business matters, and may be employed by insurance companies, banks, police forces, government agencies, etc. Forensic accountants investigate and compile financial evidence that can be presented as evidence in court. One significant objective of certain embodiments disclosed herein is to facilitate the creation and capture of audit data that is suitable for use as forensic evidence.

Once embodiments of the present invention have been used to store data in a verifiable record (such as a distributed ledger), such a record may be used, for example, to impose penalties (e.g., taxes or other fines) on one or more parties based on the data in that record. For example, if the verifiable record indicates that a party has taken one or more actions which violate and/or fail to comply with a requirement (such as a law, regulation, and/or production protocol established by, for example, a private entity or government legislature or regulatory agency), then embodiments of the present invention may determine that a penalty should be imposed on that party, and may select the penalty based on the data in the record and/or the requirement. As a particular example, if a buyer refuses to issue a premium payment for produce from a field in which a protocol was not followed, then embodiments of the present invention may determine that a subsidy should not be issued for that field and/or that a tax or penalty should be imposed on the buyer. Alternatively, the records may be used to provide incentives or rewards, for example, carbon credits, to entities whose records show compliance with the requirements associated with earning such incentives.

As another example, embodiments of the present invention may use the verifiable record to establish the provenance of harvested product that needs to be tracked with its identity preserved following harvest of the product. For example, most seed is produced using some means of identity preservation. Without such identity preservation, it would not be practical to sell seed as a distinct variety or hybrid. When seed is harvested from a seed production field, that seed is harvested separately from all other products, and the equipment that is used to harvest the seed from the production field is cleaned thoroughly before harvest to ensure that the equipment is not contaminated with other varieties of seed or other products. After harvesting the seed, the seed is transported, stored, and cleaned separately from all other seed in order to maintain the integrity of the seed. This process, however, does not always preserve the identity of the seed perfectly, primarily due to human error. As a result, a bag of seed that is marketed as containing solely Variety A of seed may also contain some amount of Variety B of seed. Embodiments of the present invention may be used to track each variety of seed from the time of its harvest, through all subsequent handling of the seed, through and including the sale of the seed to the end customer. The resulting verifiable record of the seed from harvest to ultimate sale may be used to confirm that the identity of the seed has been preserved throughout that entire process.

Embodiments of the present invention may also be used to track and identify agricultural products to which a food product has been exposed. For example, if a particular food product is exposed to a particular agricultural product (e.g., pesticide or fertilizer) in the field, information about that agricultural product may be stored in one or more container data records in a container data module that is associated with the particular food product. Such a container data module may, for example, be affixed to the food product itself (such as by using a sticker) or to a container that contains the food product. In the case that the container data module is associated with (e.g., affixed to) the food product itself, the container data module may not be associated with a "container," as that term is used herein. The container data records stored on such a container may contain any of a variety of information, such as information identifying the food product, the applied agricultural product, and the date, time, and location of application of the agricultural product to the food product. At a later time, data may be read from the container data record(s) on the container data module to identify the agricultural product that was applied to the food product. For example, a consumer may read such data at or before the point of sale of the food product in order to identify the agricultural product(s) that were applied to the food product.

Embodiments of the present invention may also be used to produce a verifiable record of the path that the contents of a particular container have traveled, from the time the container was originally filled with the contents, through each of a plurality of movements of the container (including, for example, a record of a plurality of locations and corresponding times at which the container was located at those locations), to and including a time and/or times and location and/or locations at which the contents of the container were consumed.

Embodiments of the present invention may also be used to produce a verifiable record of the transfer of product from one container to another over time (which may be in addition to tracking the location(s) of those containers over time). For example, one example of a product that may be tracked by embodiments of the present invention is nitrogen fertilizer. The initial container into which the nitrogen fertilizer is placed after manufacture is typically a large tank or even a bulk warehouse that is only segregated by bins or divider walls within the warehouse. Nitrogen fertilizer is often sold by the ton, so it is frequently transported by rail car or ocean container. Embodiments of the present invention may be used to tag and track the filling and dispensing of fertilizer and other products from such bulk containers, such as for the purpose of creating a verifiable chain of custody and application record for purposes of carbon credit validation.

Solely to aid in understanding certain embodiments of the present invention, and not to limit the scope of the claims herein, the following definitions of underlined terms are provided.

Amount: An amount of material may be the unit quantity, weight, mass, or volume of any one or more of the following: In the case of a dry material (e.g., granular, prilled, or powdered products for application to soil or plants, fertilizer, seed, etc.), the amount of the dry material may, for example, be an amount of the dry material itself, such as the dry material's mass or volume. In the case of material that has been diluted, thereby producing a mixture of the material and the dilutant liquid, the amount of the mixture may be either:

(1) an amount of the material that was mixed with the liquid; or (2) an amount of the mixture. In the case of material that has been sprayed onto granules (e.g., clay, fertilizer, or other dry materials), the amount of the material may be the amount (e.g., mass or volume) of the material that was sprayed onto the granules, rather than the amount (e.g., mass or volume) of the granules with the material sprayed onto them, or it may include both the amount (e.g., mass or volume) of the dry material and the amount (e.g., mass or volume) of liquid material that was sprayed onto the dry material. An example of a product where the recorded weight of the material includes both the weight of the dry material and the weight of the liquid that is sprayed onto the dry material is Force 10G, where 50 pounds of dry material includes the weight of the clay granules onto which a liquid formulation of tefluthrin insecticide is impregnated onto the granules, where 10% of the recorded weight will be represented by the tefluthrin active ingredient that was sprayed onto and impregnated into the dry clay granules.

Apply: A product is applied from a container when the product is dispensed from the container and put onto soil or plants in a field or other area, such as by using a sprayer or other application equipment. As a result, applying is an example of dispensing.

Area: a geographical location that is greater in size than a set of latitude and longitude coordinates. For example, an area may include a plurality of coordinates. An area is an example of a location.

Central database: an external database that has a centralized administrator. A central database may be located, stored, and maintained in a single location. For example, a central database may be maintained by a single computer. As another example, a central database may be stored on a single computer-readable storage device. A central database may, for example, store its data in a single database file. A central database may, for example, make its data accessible only via a direct cable connection or via a local area network. Although a central database may be distributed across more than one computer and/or storage device, a central database is not a distributed ledger, and a distributed ledger is not a central database, as those terms are used herein, although a central database and a distributed ledger are both examples of external databases, as those terms are used herein.

Consume: A product is consumed when it is removed from a container without transferring the removed product to another container. Applying a product is an example of consuming the product. Burning fuel is an example of consuming a product without applying the product. Spilling or disposing of a product from a container are also examples of consuming the product. Consumption of a product (e.g., by a human, animal, fungus, or bacteria) from a container is also an example of consuming the product. Applying a medicine to a human or animal (e.g., by injection or ingestion) from a container is also an example of consuming the product. Destroying a product, while the product is in a container or after dispensing the product from a container, is also an example of consuming the product.

Container: any device that is capable of storing a product. Examples include a closed delivery container, a vehicle (e.g., a truck, automobile, marine vessel, or airplane), a trailer, a rail car, a seed hopper on a planter, the tank or hopper on application equipment), a tank trailer, a stationary or mobile bulk tank, a bulk warehouse, loading equipment (e.g., the hopper on a front-end loader), an auger tube, a pipe or pipeline, or any type of smaller package types such as but not limited to a drum, a mini-bulk, a tote, a 1 or 2.5 gallon jug, bottle, can, or even smaller sized containers. Other examples include any type or size of reservoir used to store or contain fuel (in any phase(s), e.g., solid, liquid, or gas), including fuel tanks, fuel lines, and/or any fuel-containing vessel or apparatus in which fuel is held or confined. A container may contain one or more other containers. For example, a tagged container may contain one or more other tagged containers. A compartment or other portion of a container may be a container.

Container Data Module (CDM): a physical object that contains one or more container data records associated with one or more containers, and which does not store those container data records in an external database. A single CDM may contain one or more container data records for only a single corresponding container or for a plurality of containers. A container's CDM may, for example, be on, integrated into, coupled (e.g., affixed) to, or otherwise be associated with the container. A CDM may be electronic (e.g., a CDM may be or include a static or dynamic RFID tag) or non-electronic (e.g., a CDM may be or include a bar code or QR code, which may be printed on paper or other non-electronic medium). A CDM may be static or dynamic. A CDM may include a component (e.g., an RFID tag) for transmitting and/or receiving signals, such as signals representing data stored within the CDM or intended to be stored within the CDM. A CDM may be or include any kind of electronic memory (such as a non-transitory computer-readable medium), which may store any of the kinds of data disclosed herein. A CDM may include one or more Automatic Identification and Data Capture (AIDC) components, such as a "smart card" or other device which can be updated via magnetic fields, optical radiation, or other wireless transmissions.

Container Data Module (CDM) Identifier: data that uniquely identifies a particular container data module (CDM). As this implies, a plurality of container data modules may each be identified by a corresponding distinct CDM identifier. A CDM ID may be contained within a container data record. As this implies, a CDM ID may be stored on a CDM, such as an electronic or non-electronic CDM.

Container Data Record (CDR): a data record that includes data associated with a container, which may or may not relate to one or more transactions associated with the container. A CDR may, for example, include any one or more of the following, in any combination: a container identifier of the container; a CDM ID of a CDM associated with the container; a unique identifier of a product contained in the container; data representing an amount of a product contained in the container; and one or more transaction data records. A container data record may include, in addition to or instead of the data described above, aggregate data derived from a plurality of container data records, such as the aggregate amount of a particular product that has been consumed from a container in a particular location or during a particular time period (such as the lifetime of the container, or since the container was filled with the consumed product). Data from a plurality of container data records associated with a particular container may be used to identify the amount of a particular product that is in that container at any particular time. For example, when a particular product is first filled into a container, information about the type and amount of product filled may be stored in a container data record associated with the container. As product of the same type is filled into the container and/or dispensed from the container, one or more additional container data records may be generated and stored to representing such filling and dispensing. Such container data records may be used to identify the amount of product stored in the container at any particular time. A container data record may be, be contained within, or contain, one or more non-fungible tokens (NFTs).

Container History Data: the set of one or more container data records associated with a particular container. For example, the container history data for a particular Container A may include a first container data record containing data about first product with which Container A was filled by a manufacturer, and a second container data record containing data about second product with which Container A was filled or refilled by an entity other than the original filler. A container's container history data may constitute or include a verifiable record of the contents of the container over time and space. A container's container history data may be stored in one or more container data modules. A specific example is that a container's container history data may be stored in an external database or a distributed ledger (e.g., a blockchain). Each of a plurality of containers may have its own corresponding container history data.

Container identifier (ID): data that uniquely represents a particular container. As this implies the container IDs of different containers may differ from each other. A container ID may be contained within a container data record.

Coordinates: data representing a location at a specific point, such as may be represented by GPS geographical coordinates, which can include both horizontal coordinates for latitude and longitude, and vertical coordinates which correspond with horizontal coordinates, for the purpose of establishing altitude or height above sea level or ground level.

Data Profiles: data stored in a CDM may be tagged as public or private. Public data stored in a CDM may be read by any entity without restriction. Private data stored in a CDM may be readable only by entities satisfying specified criteria. For example, private data stored in a CDM may be readable only by a manufacturer, owner, possessor, or user of the CDM.

Dispense: removing product from a container, whether to transfer the product to another container or not. Examples of dispensing product that is not transferred to another container include when product is dispensed (i.e., applied) from a container onto a field, and when petroleum-based fuel is metered from a fuel container or fuel system into an engine. When product is dispensed without being transferred into another container, it is consumed.

Distributed ledger: a database that is consensually shared and synchronized across multiple sites, institutions, or geographies, accessible by multiple people. A distributed ledger allows transactions to have public witnesses. The participant at each node of the network can access the recordings shared across that network and can own an identical copy of it. Any changes or additions made to a distributed ledger typically are reflected and copied to all participants quickly, such as within a few seconds or minutes. A blockchain is an example of a distributed ledger. A distributed ledger is not a central database, as those terms are used herein.

Electronic Memory Device (EMD): a specific example of a CDM, which includes any kind of electronic memory (such as one or more non-transitory computer-readable media) for storing any of the kinds of data disclosed herein as being capable of being stored in a CDM.

Entity: a natural person or legal entity (e.g., corporation). An entity may, for example, be a manufacturer of a product, an owner or possessor of a container, the user of a product or container, or an individual or legal entity who is responsible for the use of the container or product. An entity may be an actor in a transaction (e.g., the entity who caused or executed the transaction).

Entity identifier (ID): a unique identifier of an entity, such as a manufacturer, possessor, owner or user of a container. Specific terms, such as "Manufacturer ID," are examples of entity IDs.

External database: a data store that stores container history data on media that is not a CDM. An external database may be or include a central database or a distributed ledger.

Examples of external databases are inventory management systems, shipping management systems, and databases stored on application equipment. Any techniques disclosed herein for storing data into and/or reading data from a distributed ledger or a CDM should be understood to be applicable, additionally or alternatively, to storing such data into and/or reading such data from an external database, unless otherwise stated herein. Data stored in an external database might have been previously stored on a CDM before subsequently being stored on an external database, and data previously stored on an external database might subsequently be stored on a CDM.

Filling: putting product into a container. If the product was received directly from another container, then this is an example of transferring the product from one container to another. This includes when material from multiple potentially non-traceable products are mixed/processed/amalgamated/formulated/synthesized together for the purpose of creating a product that will be added (e.g., for the first time) to a container which will be identifiable via container history data.

Geolocation Service: any device and/or software that includes means for automatically identifying a location, such as a location of a container. A geolocation service may, for example, use Global Positioning System (GPS) and/or other satellite-based technologies, Internet Protocol (IP), RADAR, SONAR, LIDAR, real-time kinetic (RTK), signal in space (SIS), and/or image analysis technologies to identify a location. As another example, a geolocation service may identify a location as a known (current or past) location of an entity (e.g., the owner or possessor of a container), such as by looking up that location in a container data module or external database (e.g., distributed ledger).

Location: a generic term that includes both coordinates and areas

Material: one of a possible plurality of constituent components of a product. As this implies, a product may include one or a plurality of materials.

Operation: the act of filling product into a container or dispensing product from a container Owner: the entity that is the legal owner of a particular container and/or product at a particular time, whether or not that entity is the possessor of that container at that time. The owner of a container may or may not be the same as the owner of a product contained in the container. The owner of a container at a particular time may or may not be the same entity as the possessor of that container at that particular time.

Possessor: the entity that is in possession of a particular container at a particular time, whether or not that entity is the owner of that container and/or the product in that container, at that time Product: a material that can be contained within a container, or the admixture that results when multiple materials are contained within a container. A product may be of any of a variety of product types.

Product amount data: data representing an amount of product, such as: the amount of product contained within a particular container that contains only one type of product; the amount of a particular differentiated product contained within a particular container that contains multiple types of products and/or single types of products that are differentiated from one another by, for example, manufacturing batch or lot number, date of manufacture, etc.; the amount of product or products filled into a container during a filling operation; or the amount of product dispensed from a container during a dispensing operation. A container data record may include product amount data representing an amount of product stored in the container associated with the container data record.

Product application equipment: equipment that is capable of applying product from a container.

Product consumption equipment: equipment that is capable of consuming product (i.e., dispensing the product without applying it).

Product type: data that identifies a class to which a particular material belongs. A product type may, for example, include an entity ID identifying the manufacturer of the product, and product name. Examples of product types include: soil-applied inputs and/or plant-applied inputs, such as fertilizer/plant nutritional products (e.g., nitrogen fertilizer), pesticides, soil health additives, plant health additives, nitrogen-fixing microbes; soil-applied inputs, such as seed; unrefined and/or refined petroleum products, such as oil, gasoline, kerosene, jet fuel, diesel fuel, and/or mixtures of one or more petroleum fuels with ethanol and/or other combustive fuels or additives; and food/beverage products. These are merely examples of product types; embodiments of the present invention are not limited to use with any particular product type. A product type may specify a product type at any level of generality, such as at a very high level (e.g., "fertilizer" or "pesticide"). In addition to or instead of such high-level product types, a product type may include information such as any one or more of the following in any combination: manufacturer, brand name, variety, batch number, lot number, chemical makeup, formulation, expiration date, and bulk density, etc.

Provenance: The place of origin or earliest known history of a thing, and/or the records or documents authenticating an object's history. Data in an external database and/or CDM (such as container history data) may be used to establish the provenance of the product that is stored in the corresponding container. An example of the provenance of a product is the location at which the product was first filled into a container, e.g., by the manufacturer of the product and/or container. Another example of the provenance of a product is the owner of the product when the product was first filled into a container, or the owner of the container at that time. Container Data Records (CDRs) from any combination of CDM and/or external database may be used to authenticate the history of individual containers and/or the history of individual container:product combinations.

RFID Tag: a type of CDM which includes an RFID transmitter/receiver module. An RFID tag may store static and/or dynamic data.

Tag: a synonym for Container Data Module (CDM). A tag may be, but is not necessarily, an RFID tag.

Tagged container: a container having an associated CDM, whether or not that CDM is or includes an EMD. A tagged container's CDM may, for example, be integrated into, affixed to, coupled to, contained within, and/or in electronic communication with the tagged container. A tagged container may have one or more associated CDMs.

Transaction: a recordable event involving a particular container. Data about a transaction involving a particular container may be recorded in: (1) a container data module associated with the particular container or (2) a data store other than a container data module, based on data stored in a container data module. Examples of transactions include moving the container to a new location; transferring possession, ownership, or use of the container; filling a container with product; dispensing product from a container; and the satisfaction of a condition by the container (such as achieving the dispensing of at least some amount or percentage of a product in the container or the passage of at least some particular amount of time).

Transaction data record: data representing a transaction. A transaction data record representing a particular transaction may include any one or more of the following in any combination: the product type; the product amount; an entity ID of a manufacturer of the product; an entity ID of an owner of the container at the time of the operation; an entity ID of a possessor of the container at the time of the operation; an entity ID of a user of application equipment that is used to perform the operation; a rate at which the product is filled or dispensed as part of the operation; date and/or time of the operation; or a location of the operation.

Transferring: removing a product from one container and storing that product in another container. Transferring may, but need not, be performed in a tamper-proof or tamper-evident manner.

User: an entity that performs a transaction on a container and/or product, such as filling the container with the product or dispensing the product from the container. The user of a container, may, but need not be, the owner of the container.

Verifiable record: a store of container history data whose authenticity is verifiable. For example, if container history data indicates that product was dispensed at a particular time and location, techniques disclosed herein may be used to verify the product was dispensed at that particular time and location. A distributed ledger (e.g., blockchain) is an example of a verifiable record.

Certain descriptions herein that refer to an EMD are equally applicable to a CDM that is not electronic. Similarly, any reference herein to a "tagged container" should be understood to refer to a container having an associated CDM of any type, whether or not that CDM includes an RFID tag. Any reference herein to data that is stored in, on, or otherwise in association with a container should be understood to disclose storing such information in one or more CDMs associated with that container.

As disclosed herein, some embodiments of the present invention may store one or more CDRs in an external database that is a distributed ledger. At any time after performing such storing, such embodiments may store some or all of the CDRs in an external database that is not a distributed ledger (such as by copying the contents of the CDRs from the external database that is not a distributed ledger into one or more CDRs in the external database that is a distributed ledger).

Similarly, as disclosed herein, some embodiments of the present invention may store one or more CDRs in an external database that is not a distributed ledger. At any time after performing such storing, such embodiments may store some or all of the CDRs in an external database that is a distributed ledger (such as by copying the contents of the CDRs from the external database that is a distributed ledger into one or more CDRs in the external database that is not a distributed ledger).

Figure 2:
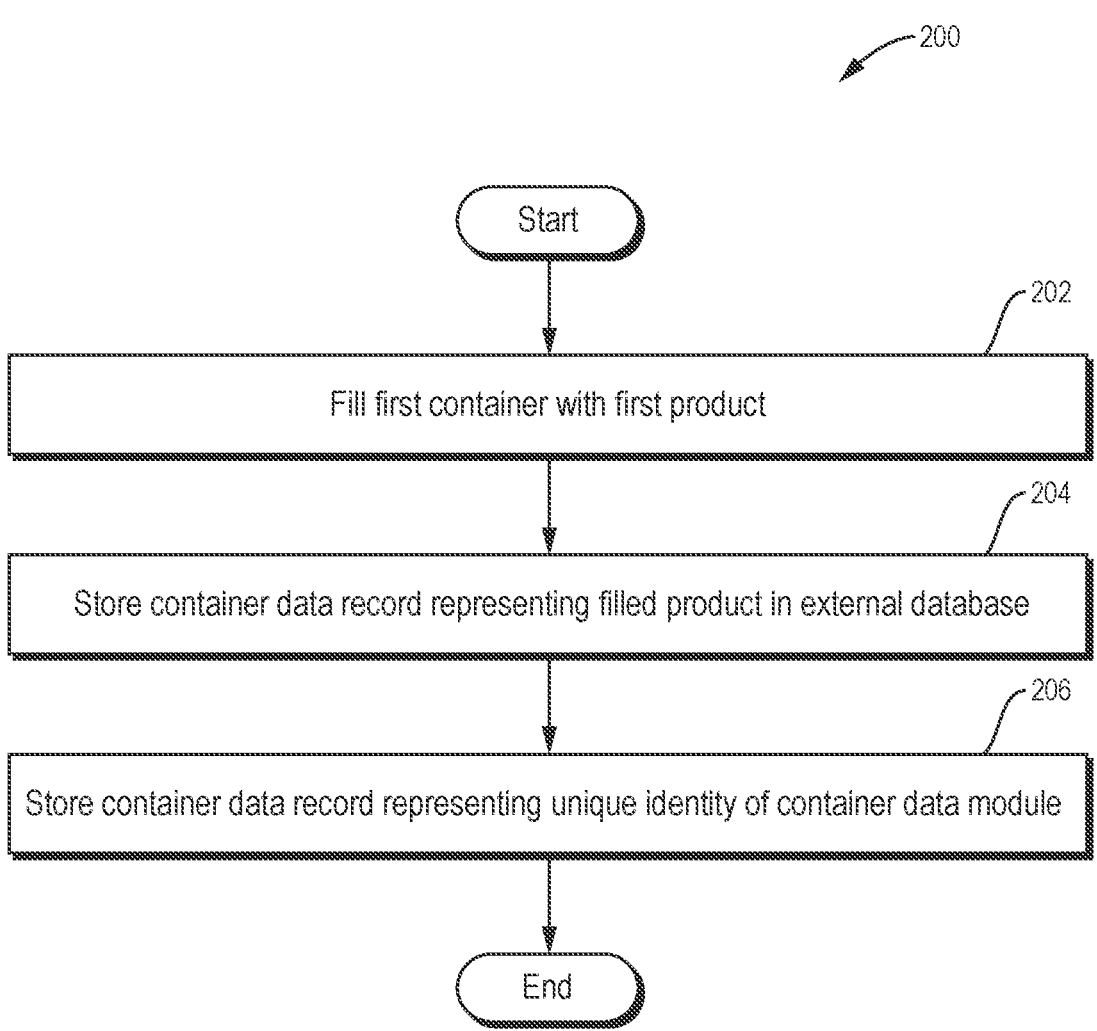
FIG. 2 is a flowchart of a method performed by one embodiment of the system of FIG. 1.

Referring to FIG. 1, a diagram is shown of a system 100 for implementing one embodiment of the present invention. Referring to FIG. 2, a flowchart is shown of a method 200 performed by the system 100 of FIG. 1 according to one embodiment of the present invention. Although not shown in FIG. 1, the system 100 may include at least one computer processor executing computer program instructions stored on at least one first non-transitory computer-readable medium to perform the method 200 of FIG. 2.

The system 100 includes a first container 102. The first container 102 includes a first product 104. The first container 102 may have come to include the first product 104 in any of a variety of ways. For example, the system 100 may include a second container 152 (also referred to herein as a "source container"), which may include a second product 154 (also referred to herein as a "source product"). The system 100 may also include a filling module 130, which may fill the first container 102 with the first product 104 (FIG. 2, operation 202), such as by transferring some or all of the second product 154 from the second container 152 to the first container 102. As this description implies, the first product 104 and the second product 154 may be of the same product type. Before transferring the second product 154 from the second container 152 into the first container 102, the first container 102 may have been empty, or may otherwise not have contained any of the first product 104. As a result, the amount of second product 154 that was transferred from the second container 152 to the first container 102 may be equal to (exactly or within some tolerance) the amount of the first product 104 that is in the first container 102 after the filling (e.g., transfer) operation performed by the filling module 130.

The system 100 may include a first storage module 106 and an external database 108 (which may, for example, be a central database or a distributed ledger). In response to, or after, filling the first container 102 with the first product 104, the first storage module 106 may store, in at least one container data record 110 in the external database 108, data representing the filling operation performed by the filling module 130 to fill the first product 104 into the first container 102 (FIG. 2, operation 204). The collection of container data records 110 are an example of "container history data," as that term is used herein.

The first storage module 106 may, for example, store, in the container data records 110 in the external database 108, any one or more of the following, in any combination:

one or more dates and/or times (e.g., timestamps) related to the filling operation and/or the first product 104, such as the date and/or time at which the filling operation occurred and/or the date and time of the first product 104 was manufactured;

a location of the first container 102, e.g., at the time of the filling operation;

a unique identity of the first container 102;

a product type of the first product 104;

an amount of the first product 104 that the filling module 130 filled into the first container 102 in the filling operation;

the amount of the first product 104 that is in the first container 102 as a result of the filling operation (which may be greater than the amount of the first product 104 that was filled into the first container in the filling operation, if the first container 102 contained product of the same type as the first product 104 before the first filling operation);

an owner ID of an owner of the first container 102, e.g., at the time of the filling operation;

a possessor ID of a possessor of the first container 102, e.g., at the time of the filling operation;

a manufacturer ID of a manufacturer of the first product 104; and a user ID of a user of the first container 102, e.g., at the time of the filling operation.

The system 100 may include a second storage module 116 and a container data module 118. Although the container data module 118 is shown as distinct from the first container 102 in FIG. 1, the container data module 118 may be integrated into, affixed to, attached to, coupled to, or otherwise on the first container 102.

In addition to, or instead of, the first storage module 106 storing the container data record 110 in the external database 108 (FIG. 2, operation 204), the second storage module 116 may, for example, store, in one or more container data records 120 in the container data module 118: (1) any one or more of the types of data disclosed above in connection with operation 204, and/or (2) a CDM ID of the CDM 118 (FIG. 2, operation 206). If both operations 204 and 206 are performed, such operations may, but need not, store the same data in the external database 108 and the container data module 118. For example, the first storage module 106 may store some data (e.g., user ID) in the external database 108 that the second storage module 116 does not store in the container data module 118. Conversely, the second storage module 116 may store some data (e.g., manufacturer ID) that the first storage module 106 does not store in the external database 108. These are merely examples and do not constitute limitations of the present invention, and are merely provided to illustrate that the first storage module 106 and the second storage module 116 may or may not store the same data as each other.

The filling operation 202 may, for example, be performed at the point of origin of the first container 102, e.g., after the first container 102 has been manufactured and is filled for the first time with product (e.g., the first product 104) by the manufacturer of the first product 104 and/or the manufacturer of the first container 102, or after the first container 102 has been emptied and cleaned and is then filled with product (e.g., the first product 104). The first product 104 may, for example, be a liquid or dry product. The system 100 and method 200 may measure the amount of the first product 104 that has been filled into the first container 102 and store that measured amount in the external database 108 and/or the container data record(s) 120 in the container data module 118. The measured amount that is stored may, for example, be represented as a volume, weight, volumetric, or other unit of measure. Such a measured amount is one of the characteristics related to the first container 102's Certificate of Origination that may be captured and stored in the container data module 118. As described in more detail elsewhere herein, when some or all of the first product 104 is dispensed from the first container 102, the quantity of the first product 104 remaining in the first container 102 may be stored in the external database 108 and/or the container data module 118.

The amount of product filled into a container and/or dispensed from a container may be measured in any of a variety of ways. For example, if the mechanism that dispenses the product (such as in the process of transferring the product from one container to another) uses auger meters, then the system 100 may calculate the quantity of product dispensed by the meter as a function of the number of times the auger rotates and/or the number of times and the duration of time at which the meter is operated. The system 100 may, for example, count the revolutions, strokes, openings, impulses, flow rate, and/or cycle-time of a dispensing meter and calculate the quantity of product dispensed from the dispensing container with each measured cycle or operational unit.

The data stored in the CDR 118 in operation 206 may, for example, include data (referred to herein as "lookup data"), such as a container ID of the first container 102 and/or a CDM ID of the CDM 118, which may be used by the external database 108 or other external computer system (not shown in FIG. 1) to identify data associated with the first container 102 and/or the first product 104, such as some or all of the data stored in the external database 108's CDR 110 in operation 204. That external computer system, which may include the external database 108, may use the data stored in the CDR 120 to look up such data associated with the first container 102 and/or the first product 104. As a particular example, a CDM ID of the CDM 118 may be stored in the CDR 120 in operation 206. The external computer system may read the CDM ID of the CDM 118 from the CDM 118 (or otherwise receive that CDM ID) and use that CDM to look up (e.g., as an index, key, or query), in an external database (e.g., the external database 108), data associated with the first container 102 and/or the first product 104, such as data associated with the filling operation 202, such as some or all of the data stored in the external database 108's CDR 110 (e.g., any one or more of the container ID of the first container 102, the type of the first product 104, the amount of the first product 104 filled into the first container 102, and the time and location of the filling operation 202). The CDM 118's CDR 120 may, for example, include such lookup data and not include any of the data stored in the external database 108's CDR 110. In this way, the CDM 118's CDR 120 may make efficient use of storage space, and the system 100 may rely instead on the more extensive storage space of the external computer system to store the details of the filling operation 202.

As a particular example, the CDM 118 may include the CDR 120, which may only include lookup data, and may not include any of the data stored in the external database 108's CDR 110. For example, the CDM 118 may be static and include a printed code (such as a bar code or QR code), which may represent a container ID of the first container 102 and/or a CDM ID of the CDM 118, and may not include any data representing product contained in the first container 102, data representing entities associated with the first container 102, or operations (e.g., filling or dispensing operations) associated with the first container 102. As a particular example of this, the CDM 118 may include such a printed code and nothing else.

The first container 102 may be filled with the first product 104 (in operation 202) in a tamper-evident manner. The first container 102 may be filled with the first product 104 in a tamper-evident and/or tamper-proof manner. For example, the techniques disclosed herein for storing data in the external database 108 may provide tamper evidence. For example, assume that the first container 102 is empty and then is filled with $X_1$ pounds of a product Y, and this filling is recorded in the external database 108 when in possession of a first possessor of the first container 102 using any of the techniques disclosed herein, and possession of the first container 102 is then transferred to a second possessor, and techniques disclosed herein are used to record, on the external database 108, that the first container 102 contains $X_2$ pounds of a product Y (where $X_1 \neq X_2$). Embodiments of the present invention may determine whether the external database 108 contains any records, other than the records just described, indicating that the first container 102 has been filled with product Y. If it is determined that the external database 108 does not contain any such records, then embodiments of the present invention may conclude that the records of the first container 102 on the external database 108 are evidence that the first container 102 has been tampered with, because those records fail to account for an amount of the first product 104 that is in the first container 102.

The external database 108 may, for example, be a distributed ledger, such as a blockchain. The CDR 110 (and any other CDRs disclosed herein as being stored in the external database 108) may include one or more blocks in the blockchain.

As implied by the definition of a container data module, the CDM 118 may, for example, be electronic (e.g., contain an electronic memory) or non-electronic. For example, the CDM 118 may include an RFID tag, and operation 206 may include wirelessly receiving, using the RFID tag, any of the data stored by the second storage module 116 in the CDM 118. The CDM 118 may use any form of wireless communication. As merely two examples, the CDM 118 may communicate by transmitting and/or receiving Ultra High Frequency (UHF) signals and/or light waves. As other examples, the CDM 118 may communicate by transmitting and/or receiving low frequency, medium frequency, or high frequency signals.

Operations 202, 204, and 206 may, but need not, be performed in the sequence shown in FIG. 2. As merely some examples:

Operations 202, 204, and 206 may be performed in the sequence shown in FIG. 2. In such embodiments, operation 206 may be performed in response to filling the first container with the first product.

Operation 206 may be performed before operation 202 and/or before operation 204. For example, the CDM 118 may be a non-electronic (e.g., paper) CDM and the CDR 120 may be a non-electronic CDR (e.g., a printed bar code or QR code), and operation 206 may include storing, on the non-electronic CDM, before operation 202 and/or before operation 204, the non-electronic CDR.

In embodiments in which operation 204 includes storing data representing a first possessor of the first container 102 in the CDR 110 in the external database 108, the first storage module 106 may also, at some time after the first container 102 comes into possession of a second possessor (which differs from the first possessor), the first storage module 106 may store, in at least one second record in the external database 108, data representing the second possessor of the first container 102.

In embodiments in which operation 206 includes storing data representing a first possessor of the first container 102 in the CDR 120 in the CDM 118, the second storage module 116 may also, at some time after the first container 102 comes into possession of a second possessor (which differs from the first possessor), the second storage module 116 may store, in the container data record 120 or another container data record in the CDM 118, data representing the second possessor of the first container 102.

In embodiments in which operation 204 includes storing data representing a first location of the first container 102 in the CDR 110 in the external database 108, the first storage module 106 may also, at some time after the first container 102 moves to a second location (which differs from the first location), the first storage module 106 may store, in at least one second record in the external database 108, data representing the second location of the first container 102.

In embodiments in which operation 206 includes storing data representing a first location of the first container 102 in the CDR 120 in the CDM 118, the second storage module 116 may also, at some time after the first container 102 moves to a second location (which differs from the first location), the second storage module 116 may store, in the container data record 120 or another container data record in the CDM 118, data representing the second location of the first container 102.

Some or all of the first product 104 may be dispensed from the first container 102. In response to, or at any time after, such dispensing:

the first storage module 106 may store, in at least one second CDR in the external database 108, data representing the dispensing; and/or the second storage module 116 may store, in at least one second CDR in the CDM 118, data representing the dispensing.

Such data representing the dispensing (whether stored in the external database 108 and/or the CDM 118) may include data representing any one or more of the following:

an amount of the first product 104 dispensed from the first container 102;

an amount of the first product 104 remaining in the first container 102 after the dispensing;

a type of the first product 104 dispensed from the first container 102;

a unique identity of a possessor of the first container 102 at the time of the dispensing;

a unique identity of an owner of the first container 102 at the time of the dispensing;

a unique identity of applicator equipment that is used to dispense the first product 104 from the first container 102;

a unique identity of an operator of the applicator equipment that is used to dispense the first product 104 from the first container 102;

a unique identity of an owner of the applicator equipment that is used to dispense the first product from the first container 102;

a second location of the first container 102 at the time of the dispensing, wherein the second location differs from the location of the first container 102 at the time of the filling in operation 202;

a time of the dispensing;

a rate at which the first product 104 was dispensed from the first container 102 (e.g., applied to a field); and for each of a plurality of locations L at which the first product 104 is dispensed from the first container 102, any one or more of the following: (1) data representing an amount of the first product dispensed from the first container at location L; (2) data representing the location L; (3) data representing a time at which the first product was dispensed from the first container at location L; and/or (4) data representing a rate at which the product was dispensed from the container at location L.

At any time after the first container 102 is filled with the first product 104 in operation 202, at least some of the first product 104 may be transferred to a third container (not shown). After such a transfer, the system 100 may perform either or both of the following:

the first storage module 106 may store, in the CDR 110 and/or another CDR in the external database 108, data representing the transfer; and the second storage module 116 may store, in the CDR 120 and/or another CDR in the CDM 118, data representing the transfer.

Furthermore, after such a transfer, the system 100 may store, in a CDM (not shown) associated with the third container, data representing the transfer.

The data that is stored about a transfer (in any of the locations described above) may include, for example, any of the data disclosed herein that may be stored about the operation 202 of filling of the first container 102. For example, the data that is stored about a transfer may include, without being limited to, any one or more of the following, in any combination: a product type of the product that was transferred; an amount of the product that was transferred; a unique identity of the first container 102 and/or a unique identity of the third container; a unique identity of a possessor of the first container 102 and/or a unique identity of a possessor of the third container at the time of the transfer; a unique identity of an owner of the first container 102 and/or a unique identity of an owner of the third container at the time of the transfer; a date of the transfer; a time of the transfer; a location (e.g., latitude and longitude or GPS coordinates) of the transfer; and a unique identity of an entity responsible for causing the transfer.

When recording data about a transfer from the first container 102 to the third container, embodiments of the present invention may read data about the transfer from the first container 102's CDM 118 and store some or all of the read data about the transfer in the third container's CDM. For example, embodiments of the present invention may read, from the first container 102's CDM 118, information about the type and amount of product transferred from the first container 102, and store, in the third container's CDM, the information about the type and amount of product transferred from the first container and into the third container.

Such transferring from the first container 102 to a third container may be repeated for any number of containers. For example, after transferring at least some of the first product from the first container 102 to the third container, at least some of the first product may be transferred from the third container to a fourth container (not shown), and so on. At or after the time of each such transfer, embodiments of the present invention may perform any of the functions disclosed herein in connection with transferring material from the first container to the third container, such as storing, in the external database 108 and/or a CDM associated with (e.g., coupled to) the receiving container, data representing the transfer in any of the ways disclosed herein. Any such container into which material is transferred may be a closed delivery container that is suitable for being part of a mobile product dispensing apparatus, from which the product may be dispensed onto a field or other area.

Any of the techniques disclosed herein in connection with transferring product from the first container 102 to a third container may be application to the transfer of the second product 154 from the second container 152 to the first container 102.

Because the system 100 and method 200 may store records of transfers of a product from one container to another, embodiments of the present invention may be used to determine automatically that the product dispensed from a particular container was originally stored in a different container. For example, Container A may be filled with some amount of Product A, and any of the techniques disclosed herein may be used to store a first record of that filling (e.g., in an external database and/or Container A's CDM). Some or all of Product A may be transferred from Container A to Container B, and any of the techniques disclosed herein may be used to store a second record of that transfer (e.g., in the external database, Container A's CDM, and/or Container B's CDM). Some or all of Product A may be dispensed from Container B, and any of the techniques disclosed herein may be used to store a third record of that dispensing (e.g., in the external database and/or Container B's CDM). Embodiments of the present invention may determine (e.g., based on the first, second, and/or third records) that the Product A that was dispensed from Container B was originally contained in Container A. This is merely one example of a way in which embodiments of the present invention provide traceability of products from container to container over time, and to identify the provenance of a product based on records stored in a verifiable ledger/accounting system. Furthermore, if the first, second, and third records are stored in a distributed ledger, then this traceability is verifiable and tamper-proof, or at least tamper-evident. The method 200 of FIG. 2 may include establishing the provenance of the first product 104, based on data stored in the CDR 110 in the external database 108 and/or the data stored in the CDR 120 in the CDM 118.

More generally, embodiments of the present invention may use data stored in a plurality of container data records to trace a particular product over time and space, and to identify, based on the plurality of container data records, any one or more of the following states of the product at a previous point in time (such as the time when the product was first filled into a container, e.g., by the entity who manufactured the product in the container and/or who filled the container with product):

the location of the product at that point in time;

the container that contained the product at that point in time (such as may be identified by that container's container ID, which may be stored in the container's CDM);

the amount of product that was contained in the container at that point in time;

the type of the product that was contained in the container at that point in time;

one or more entities associated with the product at that point in time (e.g., manufacturer, owner, possessor, and/or user, such as the user who filled the container);

one or more entities associated with the container at that point in time (e.g., manufacturer, owner, possessor, and/or user, such as the user who filled the container).

Such tracing may be performed in a manner that is verifiable and tamper-proof, or at least tamper-evident if, for example, the container data records are stored in a distributed ledger. Such tracing may involve, for example:

identifying a current container data record associated with the product (e.g., a container data record containing data representing the amount of the product that is currently stored in a particular container);

identifying one or more container data records containing data associated with previous states of the product (e.g., previous locations of the product, previous containers that contained the product, and/or previous owners, possessors, and/or users of the product);

identifying, based on the current container data record and the one or more previous container data records, a chain involving the product, such as a chain of amounts, locations, containers, owners, possessors, and/or users;

tracing the product backwards through the identified chain (e.g., backwards through a chain of amounts, locations, containers, owners, possessors, and/or users) to identify any of the states of the product at a previous point in time; and/or determining whether any link in the chain is broken or missing, such as by determining whether a link between amounts, locations, containers, and/or entities (e.g., owners, possessors, or users) associated with the product is broken or missing.

Examples of broken or missing links in such a chain include two or more container data records (e.g., two or more consecutive data records) in such a chain which:

do not indicate that ownership of the product was transferred from one entity to another, but which indicate different owners of the product;

do not indicate that possession of the product was transferred from one entity to another, but which indicate different possessors of the product;

do not indicate that any of the product was dispensed from the container, but which indicate that the container contains different amounts of the product;

do not indicate that any of the product was filled into the container, but which indicate that the container contains different amounts of the product.

Embodiments of the present invention may perform carbon credit validation based on one or more container data records (such as one or more container data records stored in a distributed ledger and/or one or more container data modules). In general, performing such carbon credit validation may include, for example:

receiving a plurality of container data records (e.g., from a distributed ledger and/or one or more container data modules);

determining, based on the plurality of container data records, whether a criterion for a carbon credit has been satisfied; and generating and providing output indicating whether the criterion for the carbon credit has been satisfied.

Such output may, for example, indicate that the criterion for the carbon credit has been satisfied or that the criterion for the carbon credit has not been satisfied, depending on the outcome of the determination. As with any of the other methods disclosed herein, such methods of carbon credit validation may be performed (e.g., automatically) by one or more computer processors executing computer program instructions stored on one or more non-transitory computer-readable media.

One way in which the determination whether the criterion for the carbon credit has been satisfied is to determine whether the plurality of container data records indicate that a product inside a tagged container has been applied to specific geocoordinates. The plurality of container data records may, for example, include data representing an as-applied map which represents a plurality of geocoordinates at which the product has been applied. Embodiments of the present invention may determine whether the plurality of geocoordinates in the as-applied map include specific geocoordinates, such as specific geocoordinates required for a carbon credit. The plurality of container data records may, for example, be stored in an external database, such as an external database that is (or contains, or is contained within) a distributed ledger or an external database that is not (or does not contain, or is not contained within) a distributed ledger. The determination of whether the as-applied map indicates that the product was applied within the specific geocoordinates may provide evidence or proof of such application for the purpose of satisfying the carbon credit criterion. Embodiments of the present invention may, however, verify that the product was applied within the specific geocoordinates for purposes other than carbon credit validation. Embodiments of the present invention may similarly be used to determine whether a plurality of container data records indicate that a product inside a tagged container has not been applied to specific geocoordinates.

Any of the data stored by the first storage module 106 (e.g., any of the data stored in the external database 108, the container data record 110, the container data module 118, and/or the container data record 120) and/or the second storage module 116 may be stored in an encrypted form. The same is true of any data disclosed herein.

The system 100 may update the container data records 110 and/or the container data records 120 at any of a variety of times and in response to any of a variety of events. For example, the system 100 may update the container data records 110 and/or the container data records 120:

in response to satisfaction of a time-related criterion, such as at a predetermined time (e.g., a predetermined time of day) or times (e.g., periodically, such as every second, minute, hour, day, week, or month), upon the lapse of a timer (e.g., a timer that lapses after at least a second, a minute, an hour, a day, a week, or a month has elapsed), or after a predetermined amount of time has elapsed since the last update (e.g., a second, a minute, an hour, a day, a week, or a month);

in response to filling or dispensing any product (e.g., some or all of the first product 104) from the container 102;

in response to satisfaction of a movement-based criterion, such as in response to any movement of the container 102, in response to movement of the container 102 by more than a predetermined distance, in response to movement of the container 102 from a predetermined location, or in response to arrival of the container 102 at a predetermined location;

in response to a change in owner, possessor, or user of the container 102.

Any such update of the container data records 110 and/or the container data records 120 may update any of a variety of data in the container data records 110 and/or the container data records 120, such as by updating data representing (e.g., changing, adding to, or deleting) any one or more of the following:

the type of product stored in the container 102;

an amount-related quantity, such as an amount of product 104 filled into the container 102 in a filling operation, the amount of product 104 dispensed from the container 102 in a dispensing operation, the total amount of product 104 contained in the container 102, or the amount of space remaining in the container 102;

a location-related quantity, such as a current location of the container 102, a location of the container 102 when a particular operation (e.g., filling, dispensing, or change in owner/possessor/user) was performed, or a location of the container 102 at a particular time;

an identity of an owner, possessor, or user of the container 102, such as an identity of a current, former, and/or new owner, possessor, or user of the container 102.

The system 100 may, for example, store any such updated data by adding the updated data to the container data records 110 and/or the container data records 120. In some embodiments of the present invention, the system 100 generates and stores, at least in the external database 108, container data records representing all filling and dispensing operations performed on the container 102. The system 100 may also generate and store, at least in the distributed ledger, container data records representing all changes in possession of the container 102. In this way, the system may record, in a verifiable ledger, records of all important changes to the container 102 over time, such as a verifiable chain of custody of the product 154 and/or the product 104. As a result, the CDR 110 and/or 120 may be used to verifiably trace back any applied product (e.g., any of the product 104 that was applied from the container 102) to its original point of manufacture (e.g., back to the second product 154 in the second container 152), thereby protecting against human error and fraud, and enabling carbon credit validation.

The system 100 may perform any number of such updates. For example, the container 102 may undergo many filling and dispensing operations, many changes in location, and many changes in owner/possessor/user. The system 100 may record each such event by updating the container data record 110 and/or the container data record 120. The result may be container history data that contains a large number (e.g., 10, 100, 500, or more) of container data records for the container 102.

The system 100 may timestamp and geotag each of the container data records 110 and/or container data records 120, such as by storing, in each of the container data records 110 and/or container data records 120, one or both of the following:

data representing a time associated with that container data record (e.g., a time of creation or modification of the container data record, or a time of an event represented by the container data record, such as a time of filling or dispensing product from the container 102, a time of movement of the container 102, or a time of change in owner/possessor/user of the container 102); and data representing a location associated with that container data record (e.g., a current location of the container 102, or a location of the container 102 at the time of an event represented by the container data record, such as filling or dispensing product from the container 102, moving the container 102, or changing the owner/possessor/user of the container 102).

Any data representing a time that is stored in the external database 108 and/or the CDM 118 (e.g., data representing a time of the filling operation 202) may be represented in any of a variety of ways, such as by a combination of date (e.g., a combination of year, month, and day) and time of day, or by a timestamp that uniquely represents a point in time.

Any data representing a location that is stored in the external database 108 and/or the CDM 118 (e.g., data representing a location of the filling operation 202) may be represented in any of a variety of ways, such as by coordinates obtained using Global Positioning System (GPS) technology or by a combination of latitude and longitude. One means of establishing the geocoordinates associated with the filling process may be to associate the IP address of the filling operation with latitude/longitude information provided by a separate and independent Global Navigation System such as Google Maps.

Any of the updates to the CDRs 110 and/or 120 may be performed automatically or semi-automatically. For example, when some or all of the first product 104 is dispensed from the first container 102, the system 100 may automatically detect that such dispensing is occurring or has occurred, automatically identify the type and amount of the first product 104 that has been dispensed from the first container 102 (such as by reading the type and amount of the first product 104 from the CDR 110 and/or 120), and automatically store (in the CDR 110 and/or 120) information about the dispensing, such as the type and amount of the dispensed product 104; the rate at which the product 104 was dispensed from the container 102; the location, date, and/or time of the dispensing; and the owner, possessor, and/or user of the container 102 at the time of dispensing. The same applies to filling the first container 102 and other actions such as moving the first container 102 (in which case the new location of the container may automatically be detected and stored in the CDR 110 and/or 120).

Unless otherwise stated herein, any information disclosed herein as being stored in the external database 108 and/or the CDM 118 may be stored in any of the following: (1) only the external database 108; (2) only the CDM 118; or (3) both the external database 108 and the CDM 118. As this implies, some or all of the information disclosed herein may be stored in the external database 108 but not in the CDM 118.

The possessor of the first container 102 at any particular time (e.g., the time of filling the first container 102 with the first product) may or may not be the same as the owner of the first container 102 at that particular time. For example, the owner of the first container 102 at that particular time may have legal ownership of the first container 102 at that particularly time, but not be in possession of the first container 102 at that particular time, in which case a party other than the owner may be in possession of the first container 102 at that particular time. Likewise, it is possible for the owner or possessor of the container 102 at a particular time to be different from the owner of the product 104 that is in the container 102 at that particular time. For example, one entity might own a container ship, while a different entity may operate the container ship and may be considered to be in possession of the container without owning it, while yet another entity or individual might own the product in the container that is owned by the first entity while in the possession of a second entity.

Ownership of the first container 102 may change without physical movement of the first container 102, and the first container 102 may physically move without a change in ownership or possession of the first container 102. Embodiments of the present invention may track, and record on the container's CDM 118 and/or within the external database 108, values of one or more of the following attributes, in any combination, as they may change over time and location: container ownership, container possession, and container location. For example, embodiments of the present invention may track and store, in the container's CDM 118 and/or the external database 108, any one or more of the following, in any combination: (1) a first owner of the first container 102 at a first time and a second owner of the first container 102 at a second time, where the first owner differs from the second owner; (2) a first possessor of the first container 102 at a first time and a second possessor of the first container 102 at a second time, where the first possessor differs from the second possessor; and (3) a first location of the first container 102 at a first time and a second location of the first container 102 at a second time, where the first location differs from the second location. In all such cases, the first time may differ from the second time (e.g., the second time may be later than the first time).

When the first container 102 is loaded into application equipment for dispensing some or all of the first product 104 from the first container 102 (e.g., onto a field or other area), the system 100 may read information from the container data record 120 in the container data module 118 and store at least some of that information in a non-transitory computer-readable medium on the application equipment (where that non-transitory computer-readable medium may itself be an example of a container data module). One benefit of reading such information from the container 102's CDM 118 is that doing so eliminates operator error and operator fraud when generating records of the container 102's contents and the amount of product filled into and dispensed from the container 102. Furthermore, the application equipment may be configured to determine whether all necessary information has been read from the container 102's CDM 118. Such confirmation may be performed automatically or manually (e.g., by receiving input from an operator of the application equipment indicating whether all necessary information has been read from the container 102's CDM 118). The application equipment may be configured to dispense product 104 from the container 102 only if it has been determined that all necessary information has been read from the container 102's CDM 118.

By automatically recording the type and amount of product (including the first product 104 and possibly also other products) that has been stored into and dispensed from each of a plurality of containers (such as the first container 102 and the second container 152), the locations of such storing and dispensing, and the movement and transfers of ownership/possession/usership of such containers over space and time, embodiments of the present invention may be used to enable entities that assign carbon credits to farmers who apply less fertilizer than would have been applied using historical Best Management Practices (BMPs) to be confident that the information recorded (e.g., on the CDM 118 and/or in the external database 108) is accurate. Furthermore, entities that purchase carbon credits from the farmer can be confident that they are receiving what they have paid for, because the creation of a verifiable and tamper-proof (or at least tamper-evident) record of carbon credit-related activity can serve as evidence that a reduction in greenhouse gas emissions actually occurred. This reduces the liability associated with buying carbon credits from someone, only to learn later that the credits that were purchased to offset one's own carbon footprint were not valid.

Embodiments of the present invention may be used when a container has been orphaned, i.e., when the current owner/possessor of the container is not known, to determine who the likely current or most recent owner/possessor of the container is. For example, in such a case, the container's unique container ID may be read from the container's CDM. Embodiments of the present invention may correlate that unique container ID with the same unique container ID stored in a data store that is external to the CDM, e.g., an external database (such as an external database that is a distributed ledger or an external database that is not a distributed ledger) or a distributed ledger intermediary. Once that correlation has been performed, the external data store may be searched, using the unique container ID, for information about the current or most recent owner/possessor of the container, and any resulting information that is found in the external data store may be used to identify the current or most recent owner/possessor of the container. Alternatively, for example, if the container's CDM contains data representing the current or most recent owner/possessor of the container, then that owner/possessor data may be read directly from the container's CDM to identify the current or most recent owner/possessor of the container.

Embodiments of the present invention may track the quantity of multiple products within a single container. For example, following the dispensing of some portion of the first product from a container, the container may be filled with one or more additional products to replace some portion or all of the removed quantity of the first product. When this occurs, the blended quantity of the mixed ingredients may be tracked on the container's CDM and/or distributed ledger, as can be each individual constituent component of the blended material, to the degree that it is desirable to track said constituent components. For example, if pesticides are blended within a tagged container, some or all of the individual EPA-registered active ingredients that are included as constituents of the blended product contained within the container may be tracked, without simultaneously tracking the various inert ingredients that are also constituent components of the blended/mixed contents.

Embodiments of the present invention may establish and maintain an unbroken transaction record as a material-filled container (e.g., the first container 102) moves through the supply chain, such as for the purpose of producing forensic quality records regarding the validity of application or consumption of product or material from the container. Absent an unbroken forensic chain of transactions, it may be impossible to verify the application record that results from application of the contents of the tracked container. For an as-applied record to be created, information regarding the product being applied must be supplied to the application equipment. Historically, that information is supplied by the application equipment operator at the time of application, but as described previously, the potential for operator error is substantial. In embodiments of the present invention, information regarding the applied or consumed product may be delivered to the application equipment from the CDM. Communication of applied product information from the CDM to the application equipment ensures that the information regarding the applied product is consistent with the product information on the CDM, but in order to auto-certify or auto-verify that the product information on the CDM is accurate, an unbroken product/material and container transaction record must be maintained, e.g., by the distributed ledger and/or central database. One benefit of embodiments of the present invention is that they may be used to enable purchasers of carbon credits to be confident that a carbon credit-eligible product was actually applied in conjunction with the as-applied product record that is associated with the creation of the carbon credit which is being purchased.

Embodiments of the present invention may track and store each attribute independently and/or collectively, for the purpose of creating and producing a comprehensive forensic record of who owns or owned a container, in whose possession it is now and in whose possession it has been in the past, and where it is or has been located at any given point in time. It is also possible for the owner of a container to be different from the owner of the container's contents. However, within the combined distributed ledger and/or CDM system, embodiments of the present invention may track ownership of the contents of individual and/or blended constituent content components within the container, even if multiple owners are involved. A container may only be in one place at a time, and it may only be in the possession of one entity at a time, (even if the possessing entity has multiple owners), but for example, Entity A might own the container itself, while Entity B might own Product 1 within the container, and simultaneously, Entity C might own Product 2 within the same container. Products 1 and 2 may maintain their individual constituent integrity within the container as a result of physical separation within the container via walls, bulkheads, compartmentalization, etc., or the quantity of Product 1 and Product 2 may be blended together, with each Entity continuing to own the tracked quantity of that Entity's constituent contribution to the blended product. One benefit of embodiments of the present invention is that they may create a comprehensive, forensic quality distributed ledger record representing essentially all recordable attributes related to each tagged container, for example but not limited to the container itself, the product and/or products within the container, and/or the entity or entities who manufacture, own, fill, possess, use or dispense from, transport, handle, dispose of, etc. the contents of the container or the container itself. This forensic chain of custody may be necessary to be able to validate that, for example, the end-user's/consumer's time-stamped geo-application/dispensing record that is presented in order to earn carbon credits, is accurate and consistent with the product that was actually applied or consumed as the time-stamped geo-application record was created. For removal of all doubt, embodiments of the present invention may be used to provide an auto-generated chain of custody for each container and the product in the container, and to provide an auto-generated transactional record for each transaction associated with the container and product in the container. It is important to understand that while every change of custody may result in generating and storing a corresponding transactional record, some transactions may occur without a change of custody. Embodiments of the present invention provide a means for tracking all transactions so that an unbroken chain of custody may be verified as an element within the larger body of transactional data.

Any of the systems and methods disclosed herein (e.g., the system 100 and method 200) may defer storing data unless and until the external database 108 is accessible over a network. For example, referring to FIG. 5, a diagram is shown of a system 500 for tracking the first product 104 in the first container 102, and for storing data about the first product in the container data module 118 until a network 502 becomes accessible, according to one embodiment of the present invention. FIG. 6 is a flowchart of a method 600 performed by one embodiment of the system 500 of FIG. 5. The system 500 of FIG. 5 includes elements from the system 100 of FIG. 1. Any of the description herein of those elements in connection with FIG. 1 is equally applicable to the system 500 of FIG. 5.

The system 500 includes network 502, which may be any type of communication network, such as a Local Area Network (LAN) and/or a Wide Area Network (e.g., the Internet). The network 502 may include mechanisms for transmitting and receiving data by wire and/or wirelessly. Any of the techniques disclosed herein for using the first storage module 106 to store data in the external database 108 may include the first storage module 106 transmitting such data over the network 502, and the external database 108 may receive such data and store the data in the external database 108. As described elsewhere herein, the external database 108 may or may not be, contain, or be contained within a distributed ledger.

Figure 5:
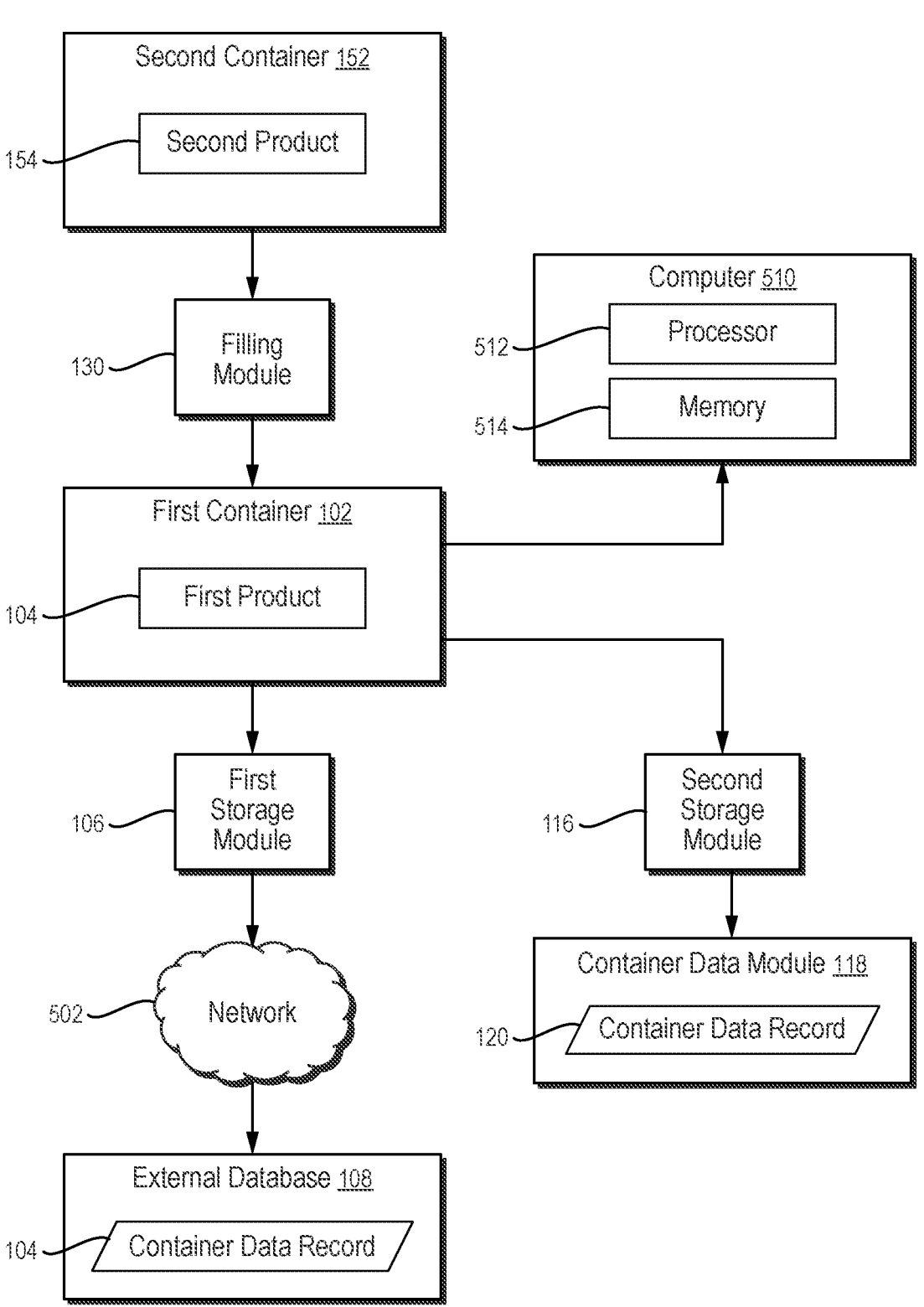
FIG. 5 is a diagram of a system for tracking product in a container, and for storing data about the product locally until a network becomes accessible, according to one embodiment of the present invention.
Figure 6:
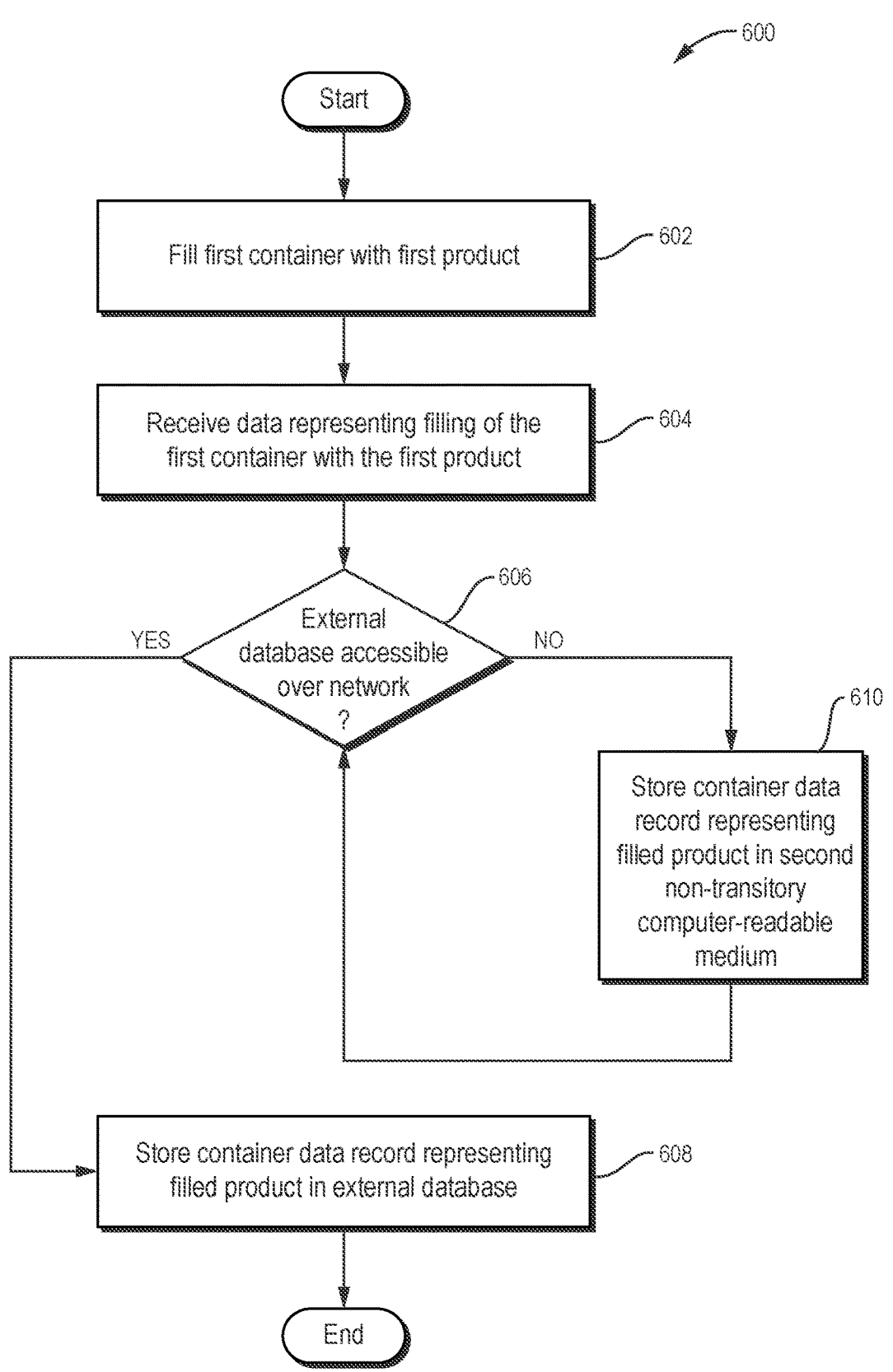
FIG. 6 is a flowchart of a method performed by one embodiment of the system of FIG. 5.

For example, the system 100 may include a computer 510 having at least one computer processor 512 and a first non-transitory computer-readable medium 514 (labeled as "memory" in FIG. 5 for ease of illustration). Computer program instructions may be stored on the first non-transitory computer-readable medium 514. When the computer processor(s) 512 executes the computer program instructions, the computer processor(s) 512 executes a method defined by those computer program instructions, such as some or all of the method 600 of FIG. 6.

The filling module 130 may fill the first container 102 with the first product 104 (FIG. 6, operation 602), such as in any of the ways disclosed herein in connection with operation 202 of method 200 (FIG. 2). The first storage module 106 may receive data representing filling of the first container 102 with the first product 104 (FIG. 6, operation 604). The first storage module 106 may, for example, receive such data in the form of an RFID signal received at an RFID tag on the first container 102.

The first storage module 106 may determine whether the external database 108 is accessible over the network 502 (FIG. 6, operation 606). The first storage module 106 may make this determination in any of a variety of ways, such as by determining whether a network connection exists between the first storage module 106 and the network 502, or by determining whether a network connection exists between the first storage module 106 and the external database 108. If the first storage module 106 determines that the external database 108 is accessible over the network 502, the first storage module 106 may store the received data in the external database 108, such as in any of the ways disclosed above in connection with operation 204 of FIG. 2 (FIG. 6, operation 608).

In response to determining that the external database 108 is not accessible over the network 502, the first storage module 106 may store, in a second non-transitory computer-readable medium (e.g., the non-transitory computer-readable medium 514), without accessing the network 502, the received data, which may include any of the data disclosed herein (e.g., any of the data disclosed herein as being stored in operation 204) (FIG. 6, operation 610). Such storing may be performed, for example, without transmitting the data over the network 502.

The second non-transitory computer-readable medium (e.g., the non-transitory computer-readable medium 514) may, for example, be local to the first container 102 and/or the first storage module 106, meaning that the second non-transitory computer-readable medium may be accessible to the first storage module 106 without accessing the network 502. For example, the second non-transitory computer-readable medium may be on the first container 102. For example, the second non-transitory computer-readable medium may be, may contain, or may be contained within the container data module 118.

As a particular example, the second non-transitory computer-readable medium may be in or on application equipment, such as application equipment that contains or is coupled to the first container 102 and/or the first storage module 106. Such application equipment may contain a computer, which contains or is coupled to the second non-transitory computer-readable medium. As another example, the second non-transitory computer-readable medium may be a container data module in or coupled to the first container.

At some time after storing the received data in the second non-transitory computer-readable medium, the first storage module 106 may determine that the external database 108 is accessible over the network 502, such as by determining that a network connection has been established between the first storage module and the external database 108. In response to determining that the external database 108 is accessible over the network 502, the first storage module 106 may store some or all the data that was previously stored in the second non-transitory computer-readable medium in at least one first record in the external database 108 (e.g., in the container data record 110) (FIG. 6, operation 608). The external database 108 may, for example, be a blockchain, and the at least one first record may be at least one first block in the blockchain.

After determining that the external database 108 is not accessible over the network 502 and storing the received data in the second non-transitory computer-readable medium, the first storage module 106 may again (e.g., after some delay, such as at least 10 seconds, 1 minute, or 10 minutes) determine whether the external database 108 is accessible over the network 502. If the first storage module 106 determines that the external database 108 is accessible over the network 502, then, in response to that determination, the first storage module 106 may store some or all the data that was previously stored in the second non-transitory computer-readable medium in at least one first record in the external database 108 (e.g., in the container data record 110). If, instead, the first storage module 106 does not determine that the external database 108 is accessible over the network 502, the first storage module 106 may again (e.g., after some delay) determine whether the external database 108 is accessible over the network 502. This process of determining whether the external database 108 is accessible over the network and only storing the received data in response to determining that the external database 108 is accessible over the network may repeat any number of times.

The system 500 and method 600 of FIGS. 5 and 6, respectively, address the technical problem of how to store data representing product in a container electronically even when an electronic communications network (such as the network 502) is not accessible. The system 500 and method 600 address this technical problem by providing a technical solution in which the data are stored in a local storage medium while the electronic communications network is unavailable, and then transmitting the data over the electronic communications network for remote storage when the electronic communications network becomes available. Certain embodiments of the system 500 and method 600 include the further technical feature of automatically and repeatedly determining whether the electronic communications network is available, and automatically transmitting the data over the electronic communications network for remote storage in response to determining that the electronic communications network has become available.

The description above describes storing the received data in the second non-transitory computer-readable medium in response to determining that the external database 108 is not accessible over the network 502. Other embodiments of the present invention may store the received data in the second non-transitory computer-readable medium even if the external database 108 is accessible over the network 502. For example, there may be benefits to storing the received data in the second non-transitory computer-readable medium for some period of time even if the external database 108 is accessible over the network 502, and then storing the received data in the external database 108 at a later time, which may not be in response to determining that the external database 108 is accessible over the network 502. For example, embodiments of the present invention may store the received data in the second non-transitory computer-readable medium even while the external database 108 is accessible over the network 502 in order to collect and store some minimum amount of such data before transmitting it over the network 502 for storage in the external database 108, thereby reducing utilization of the network.

Figure 3A:
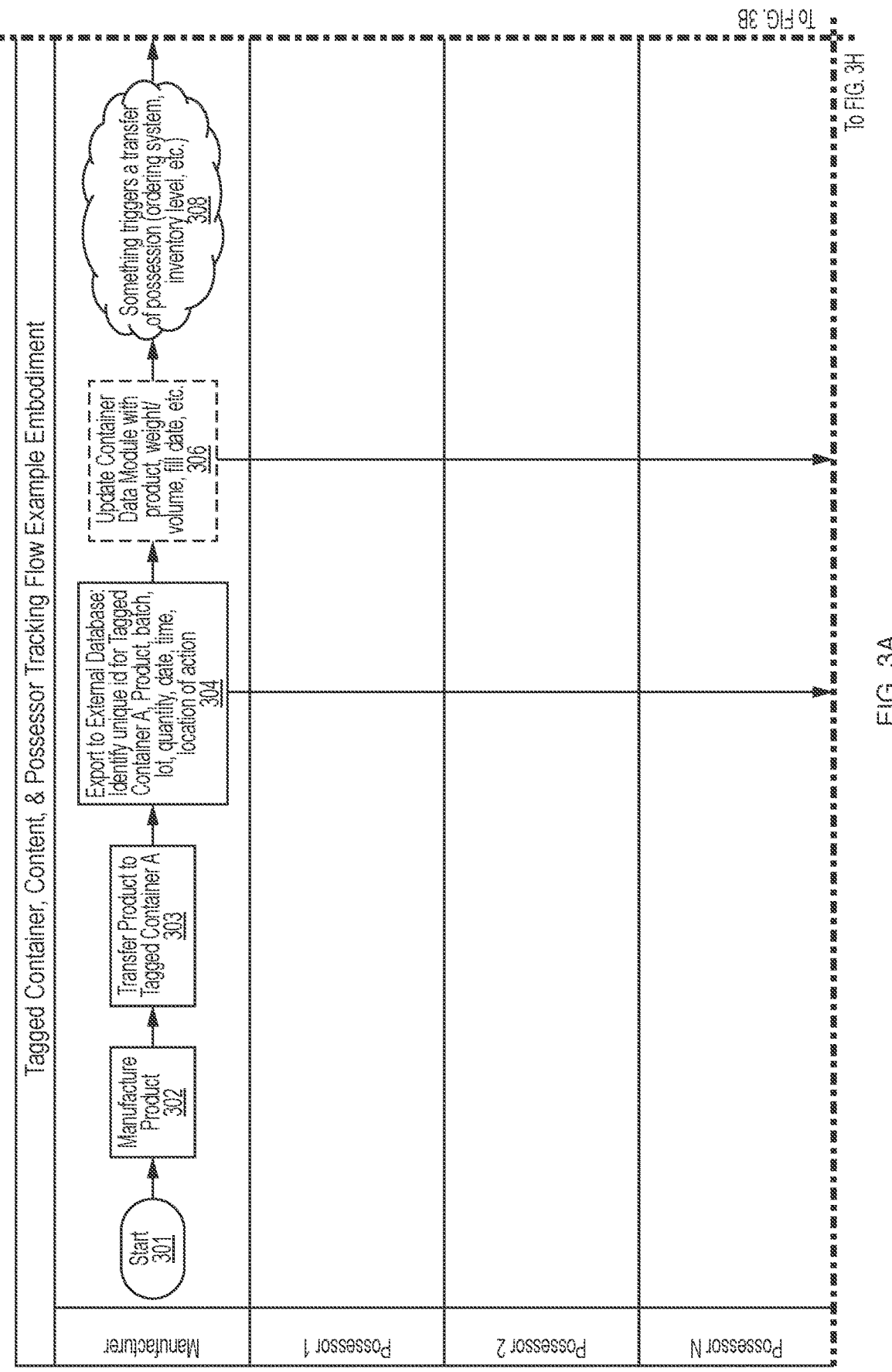
FIGS. 3A-3N and 4A-4P are swim lane diagrams of methods for validating carbon credit-eligible activities according to two embodiments of the present invention.
Figure 3B:
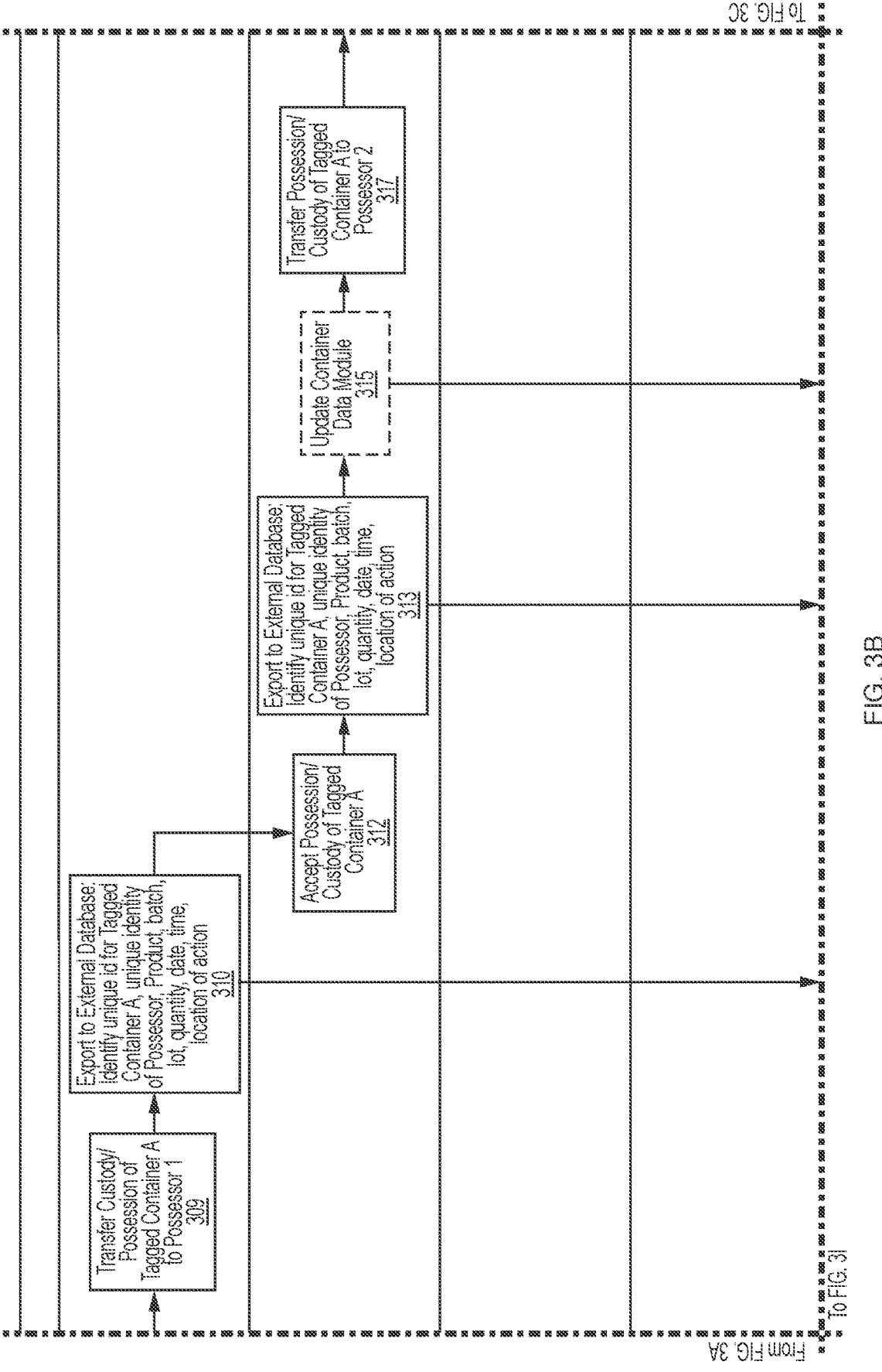
Figure 3C:
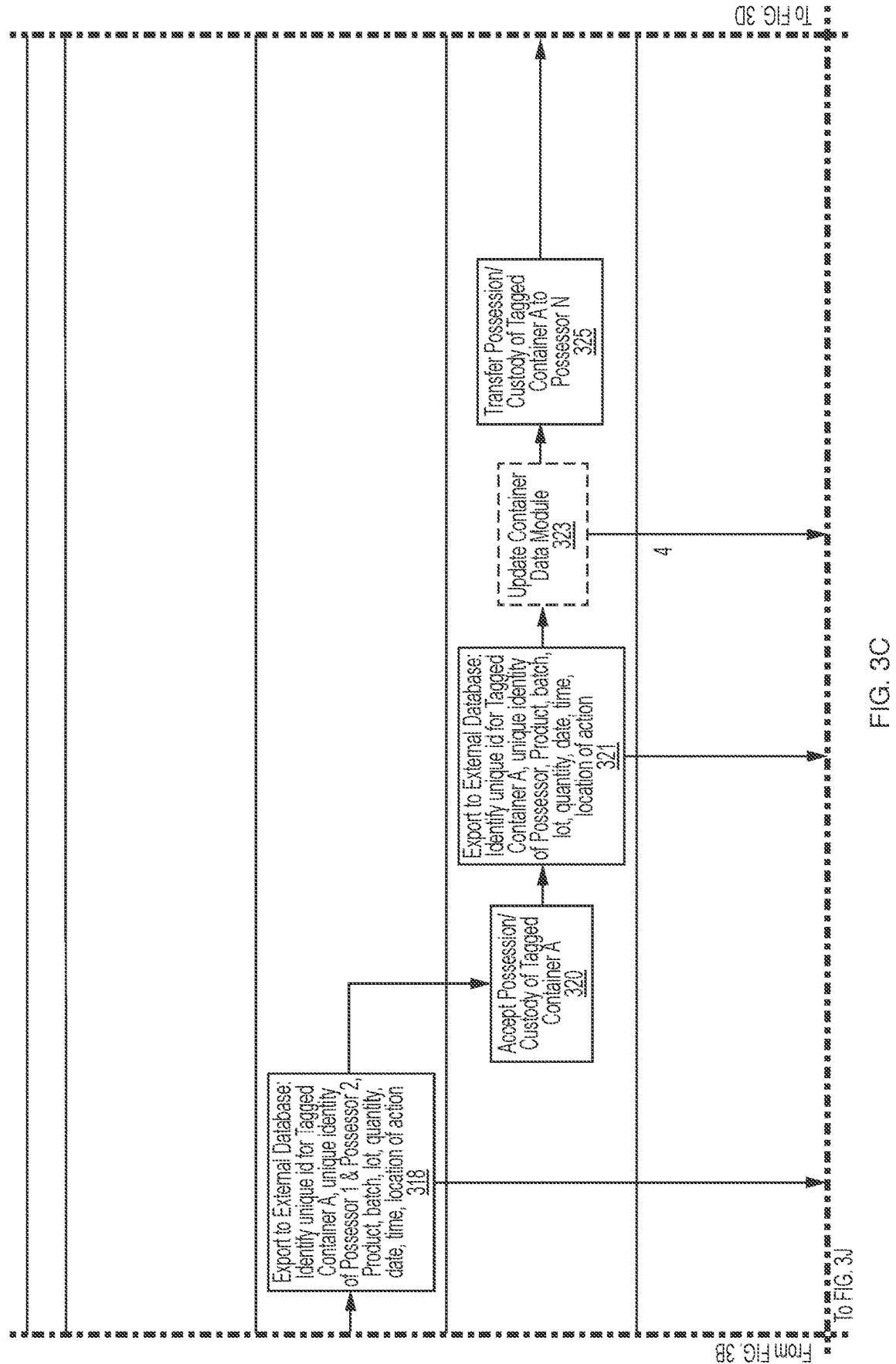
Figure 3D:
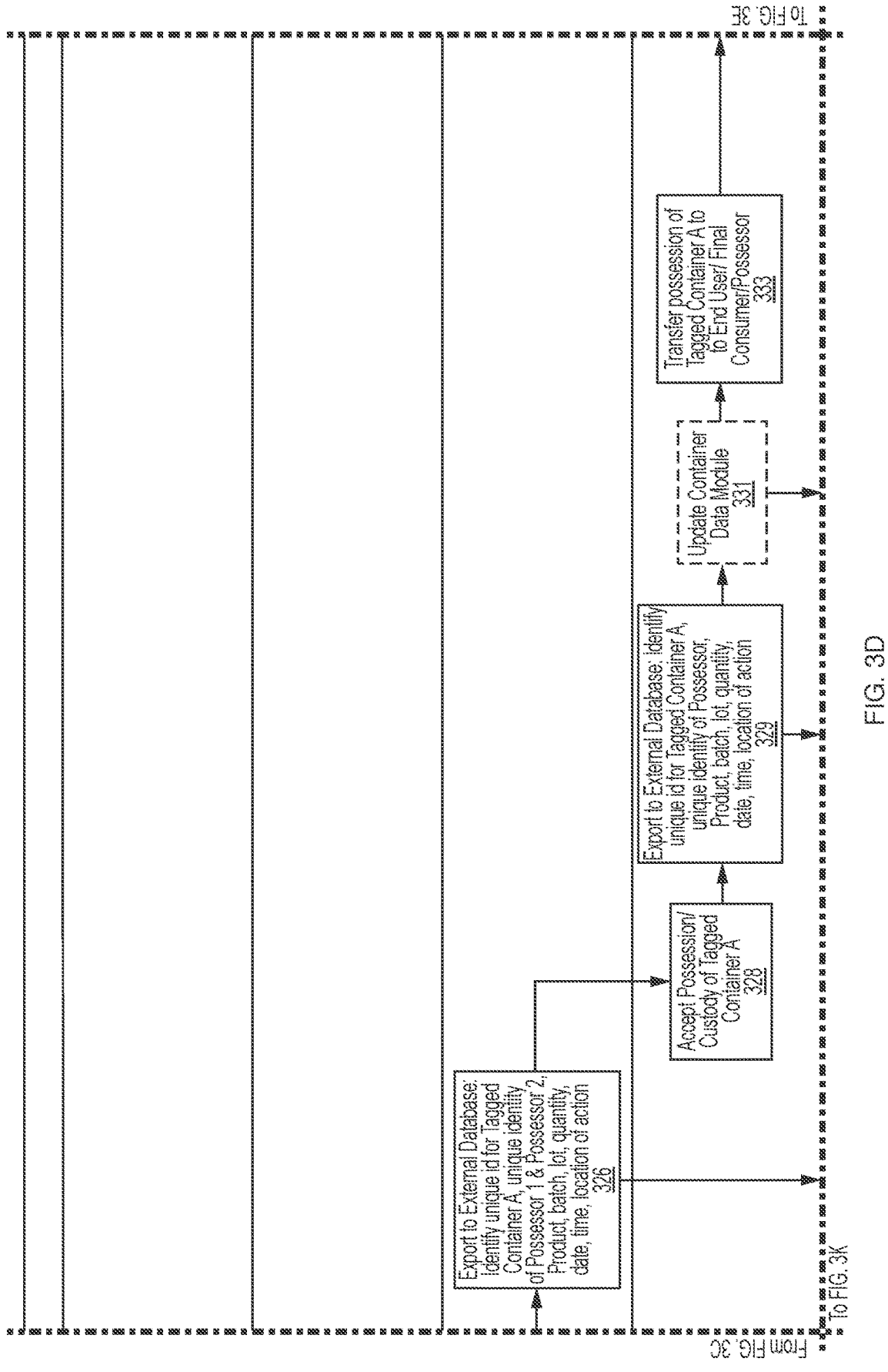
Figure 3E:
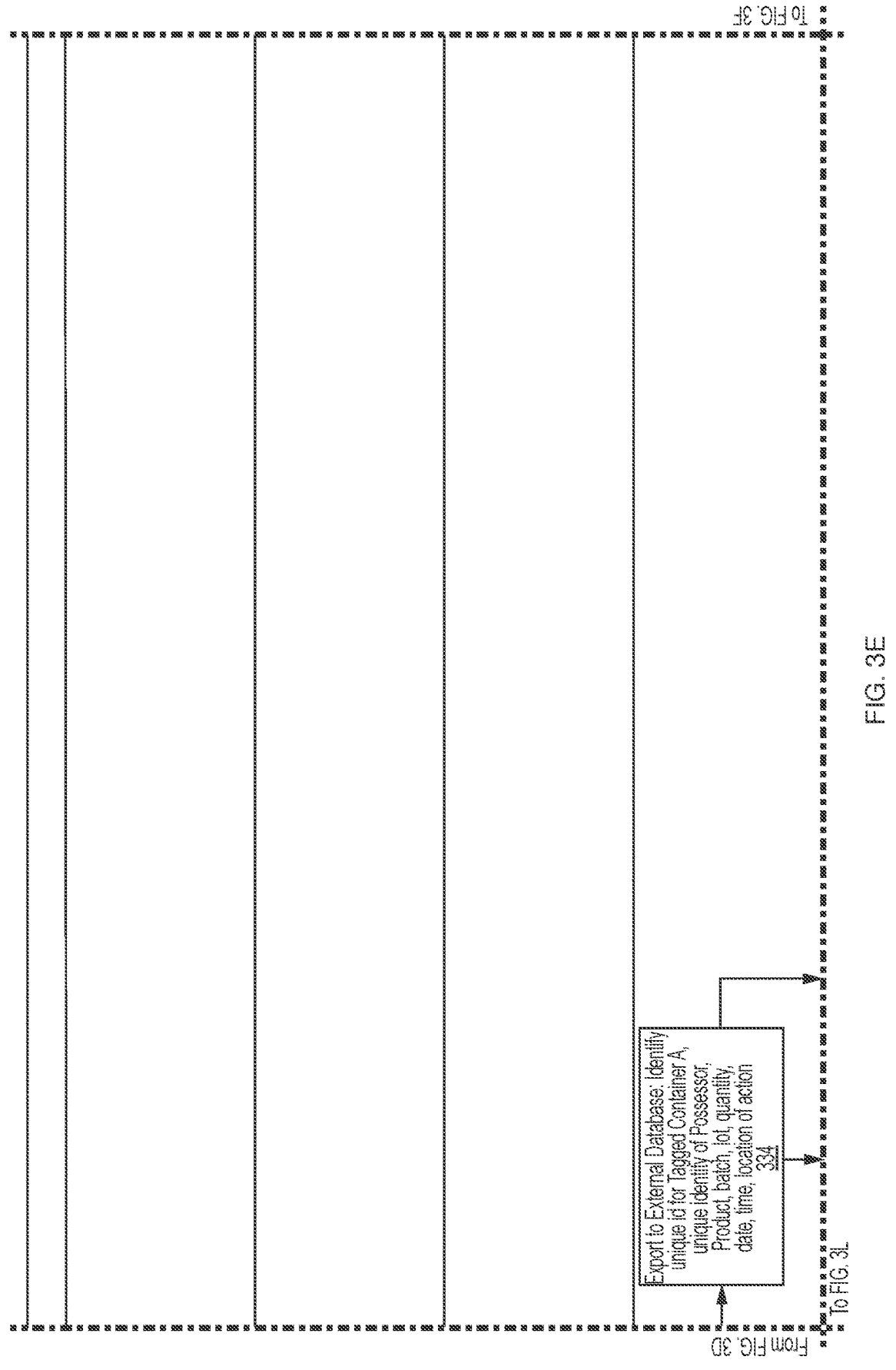
Figure 3F:
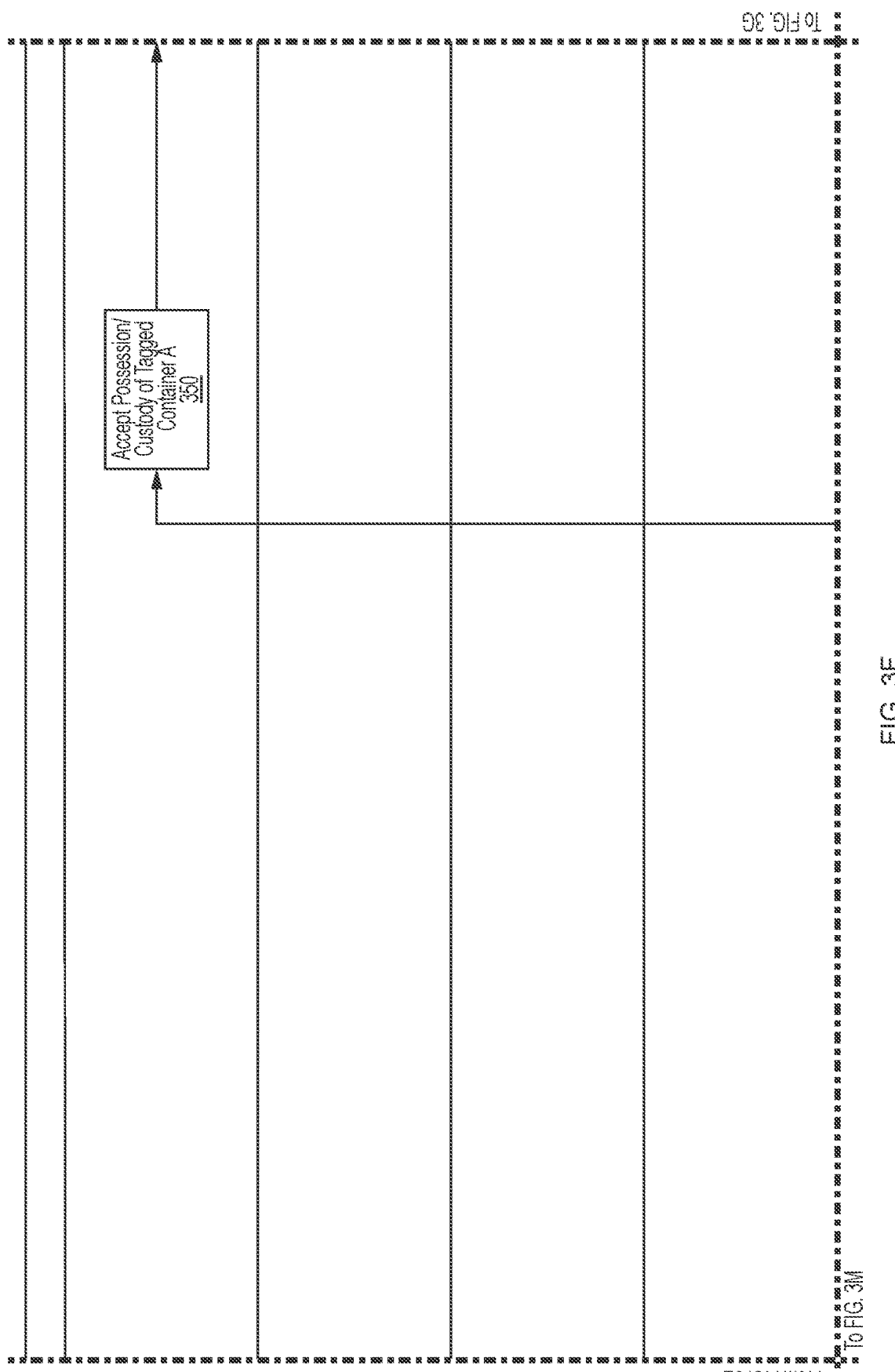
Figure 3G:
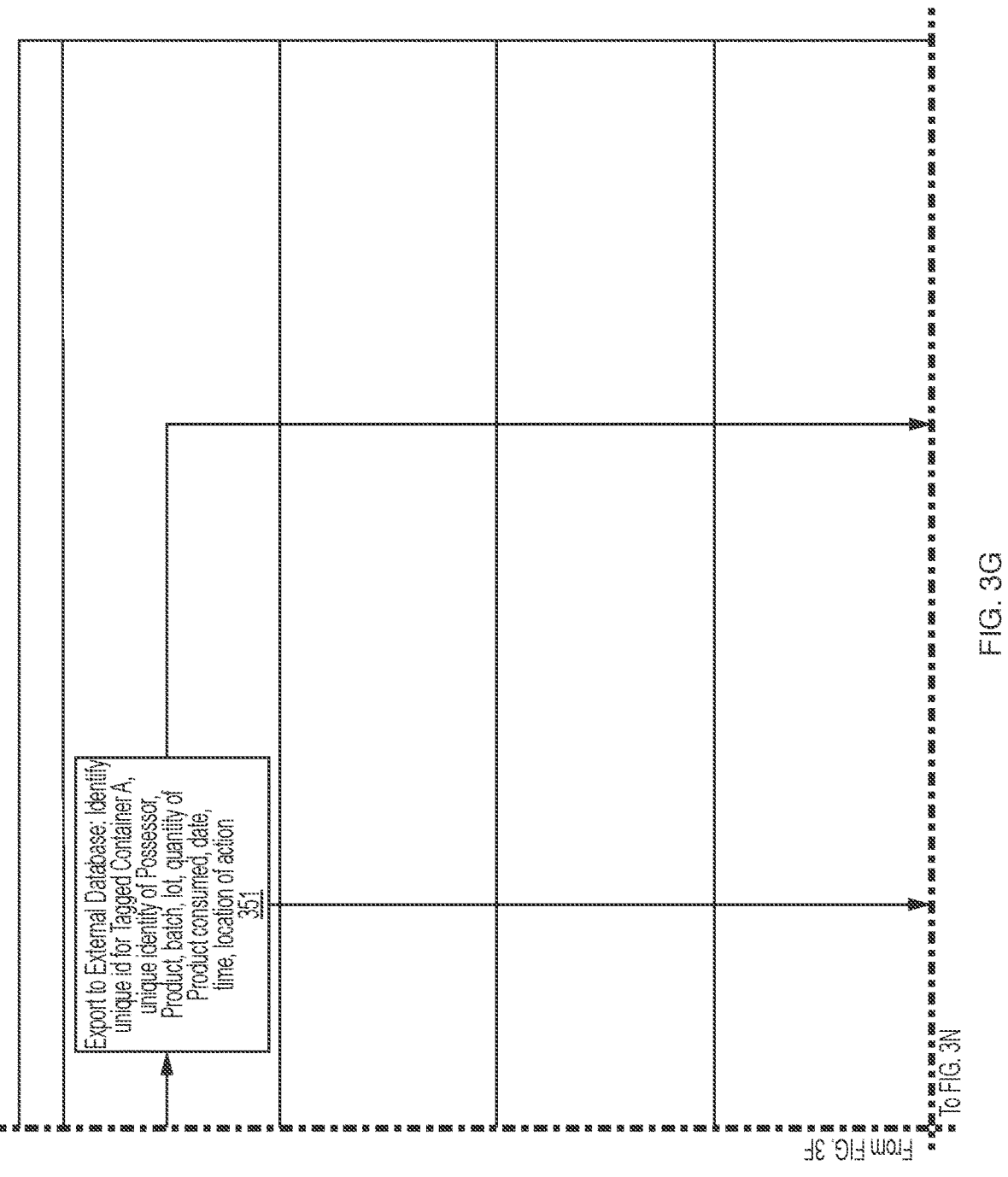
Figure 3H:
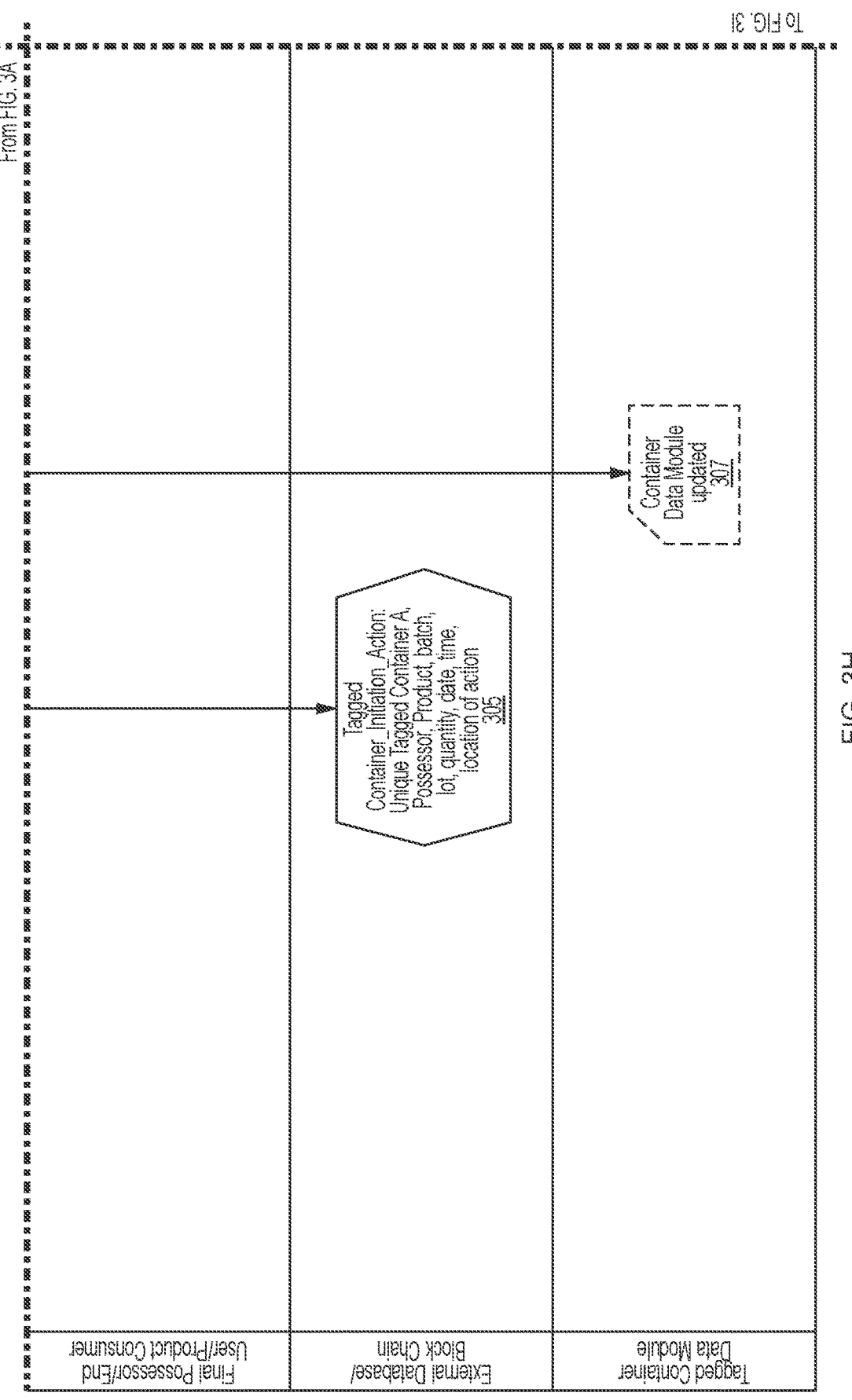
Figure 3I:
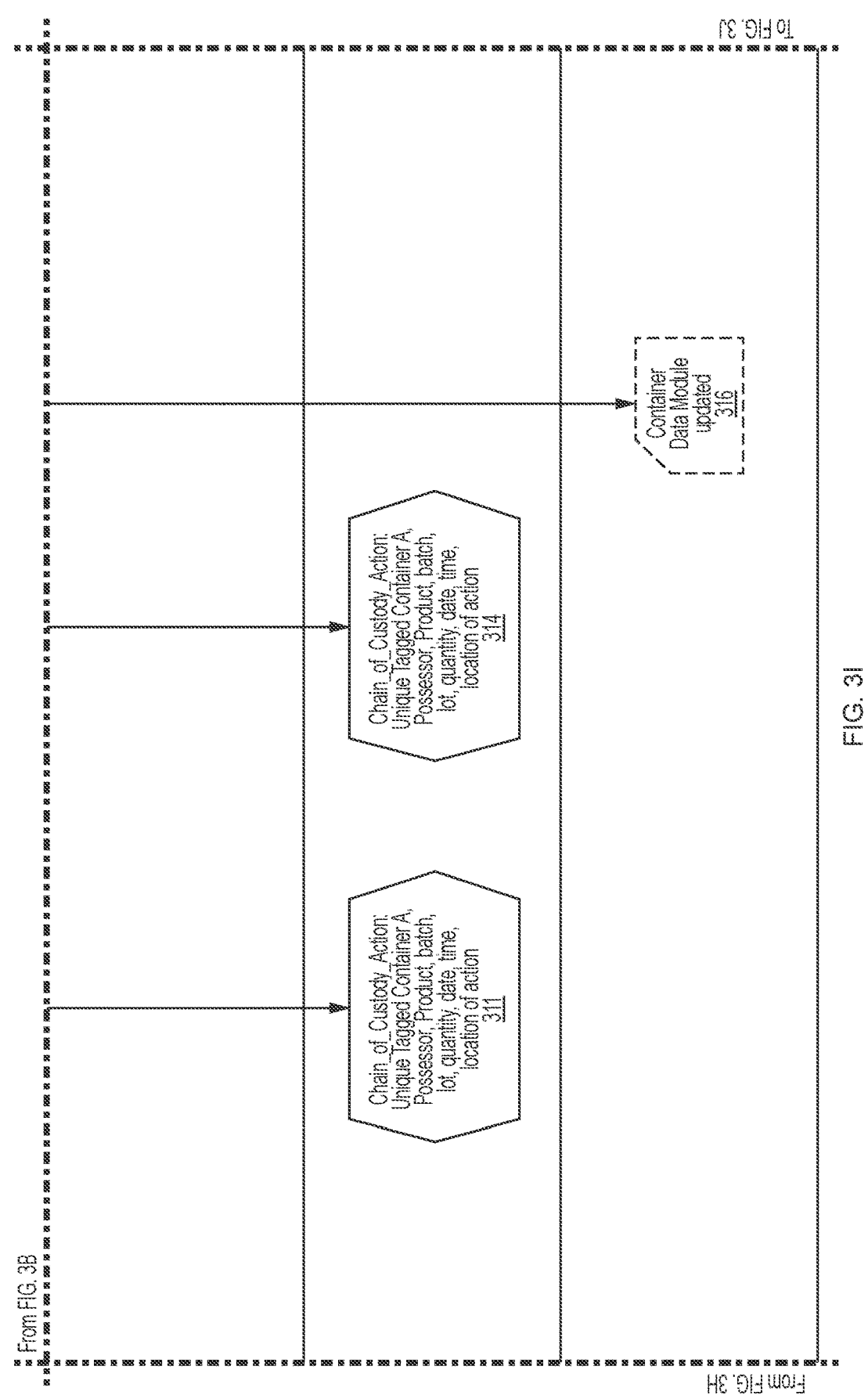
Figure 3J:
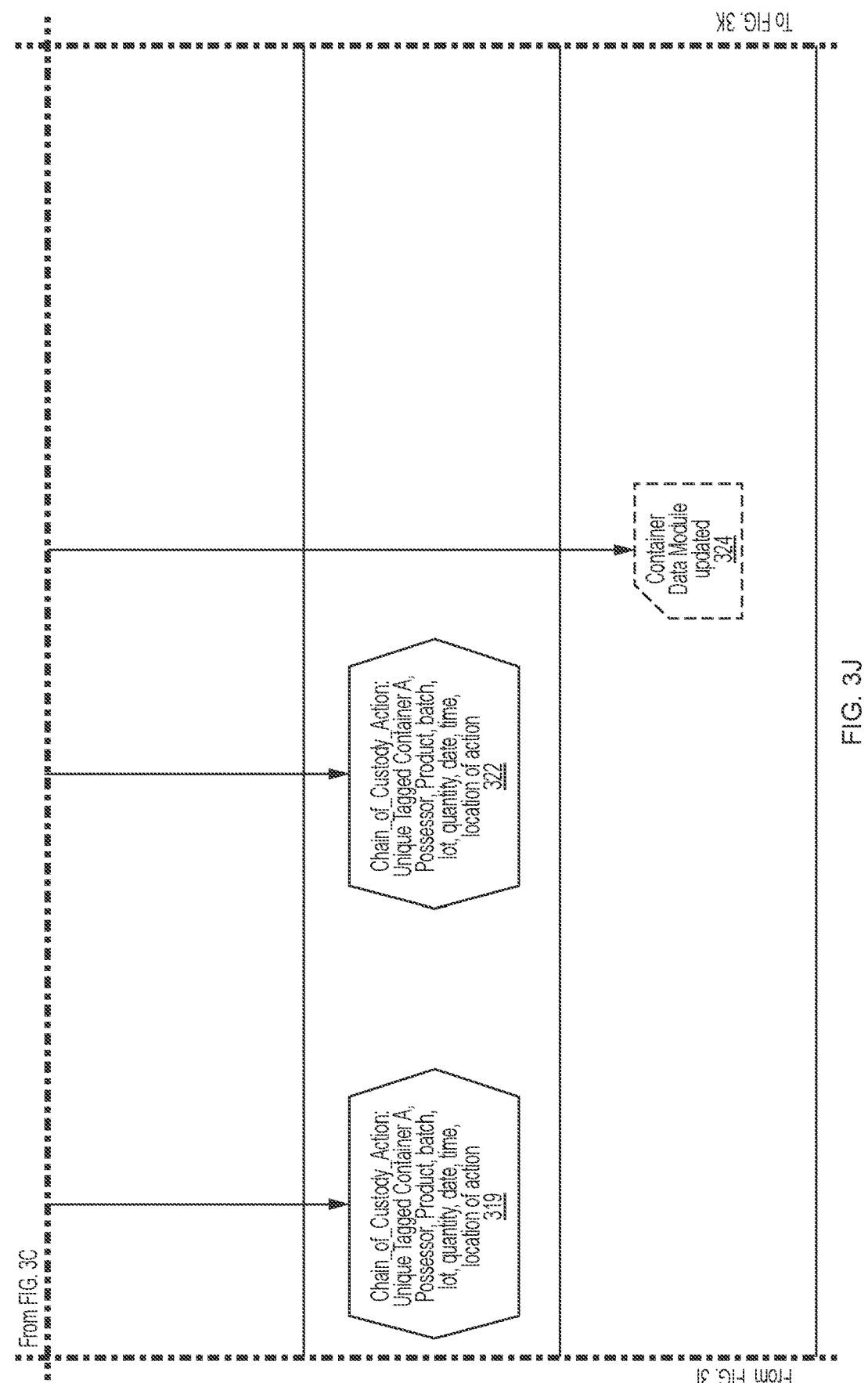
Figure 3K:
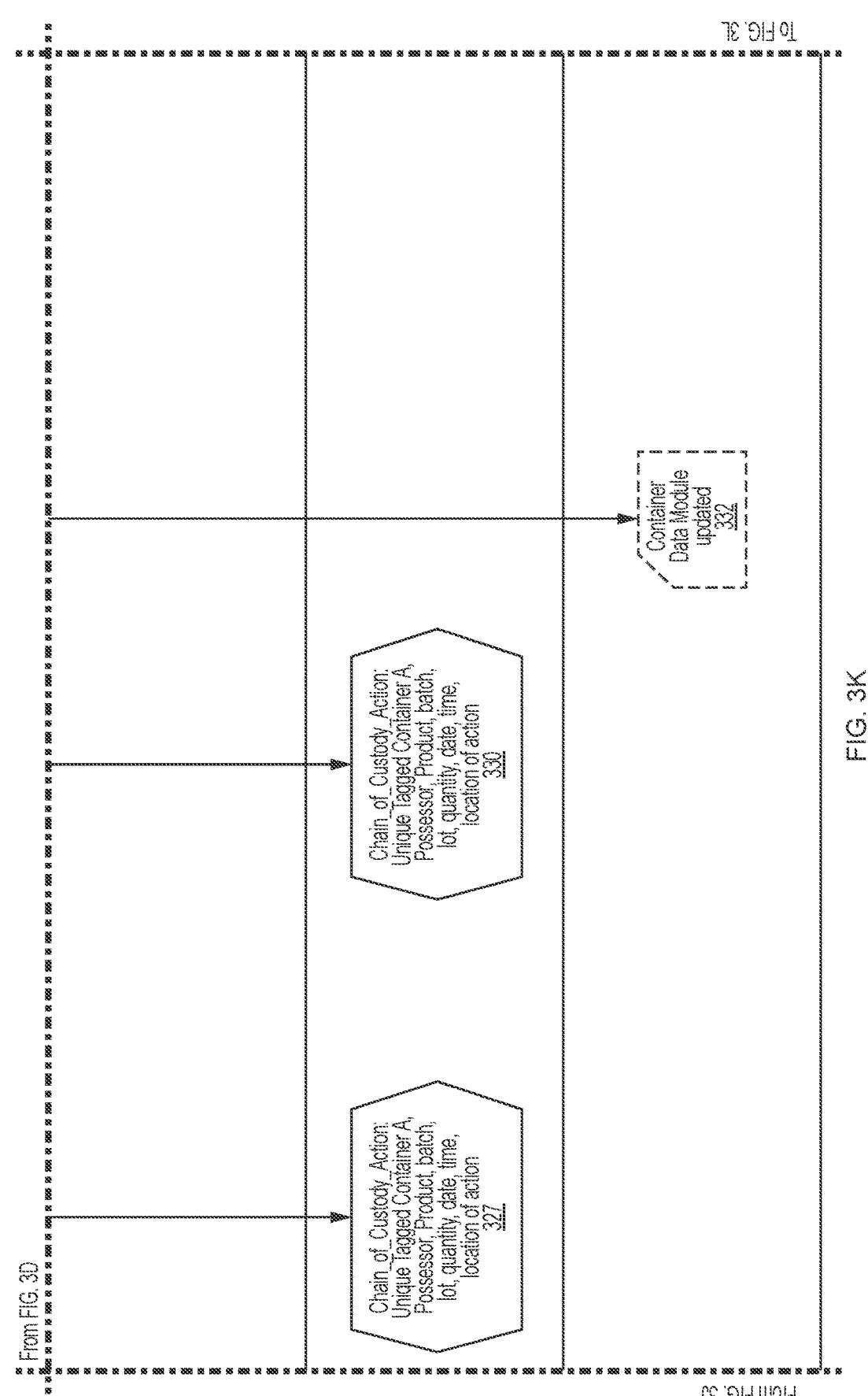
Figure 3L:
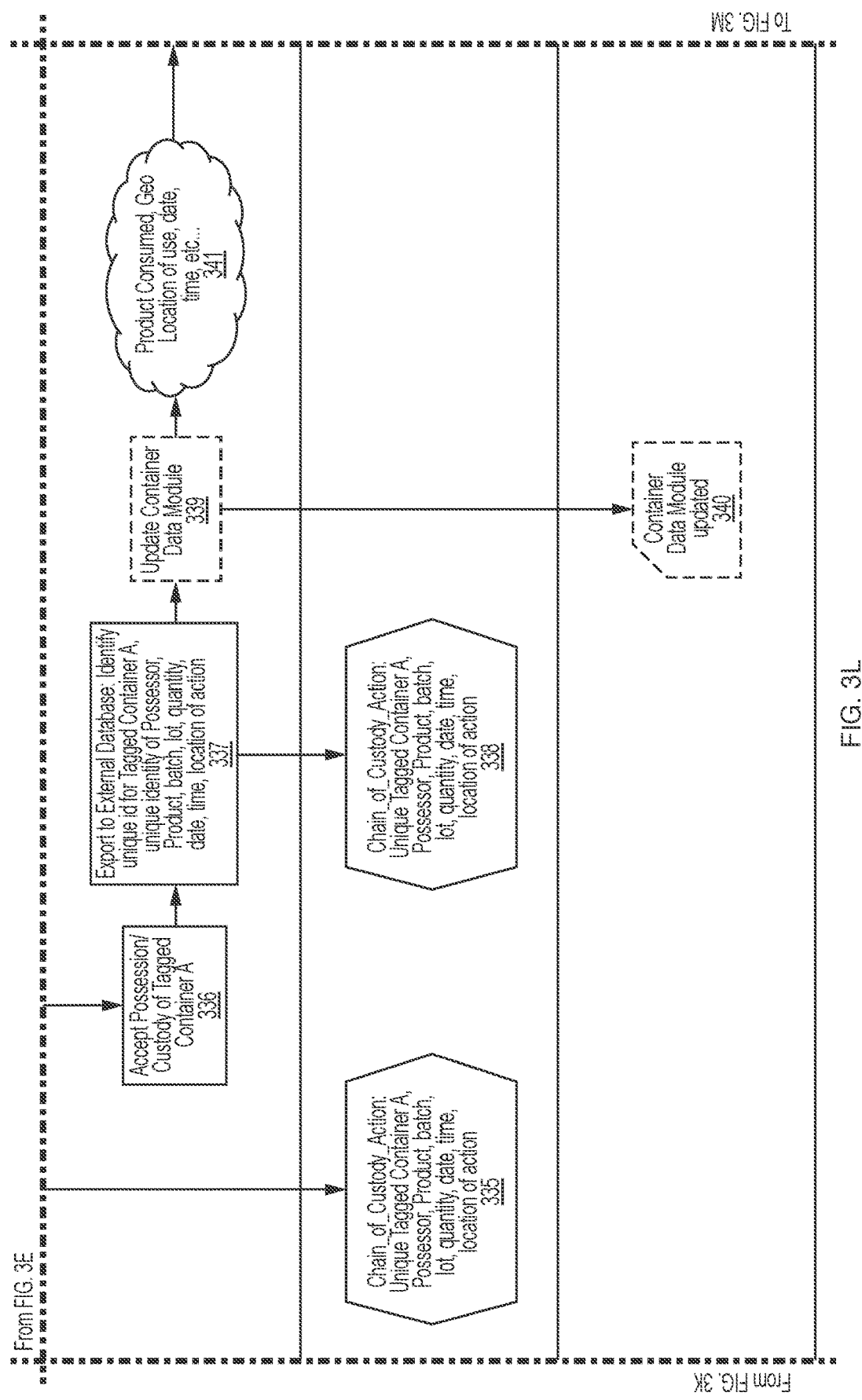
Figure 3M:
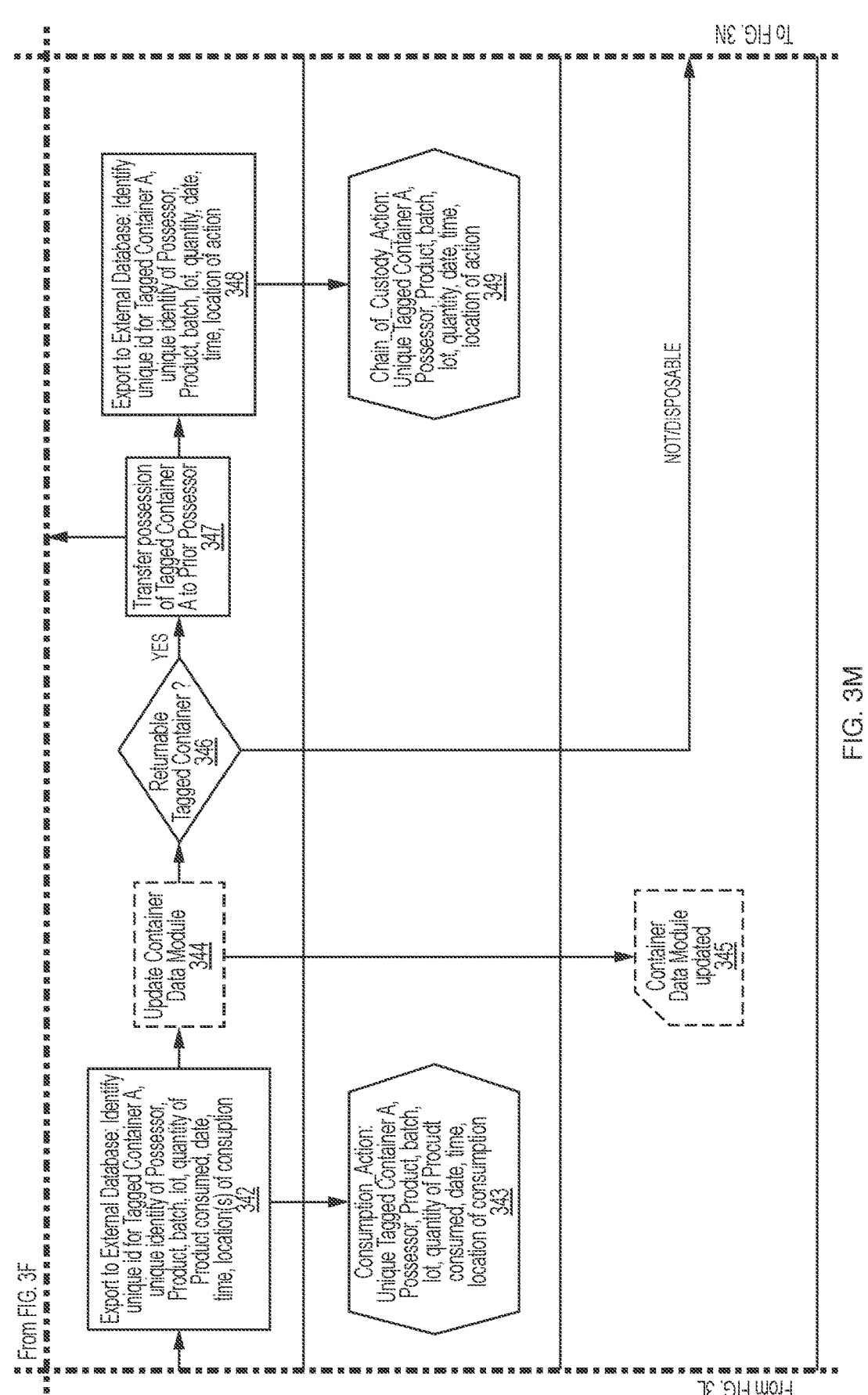
Figure 3N:
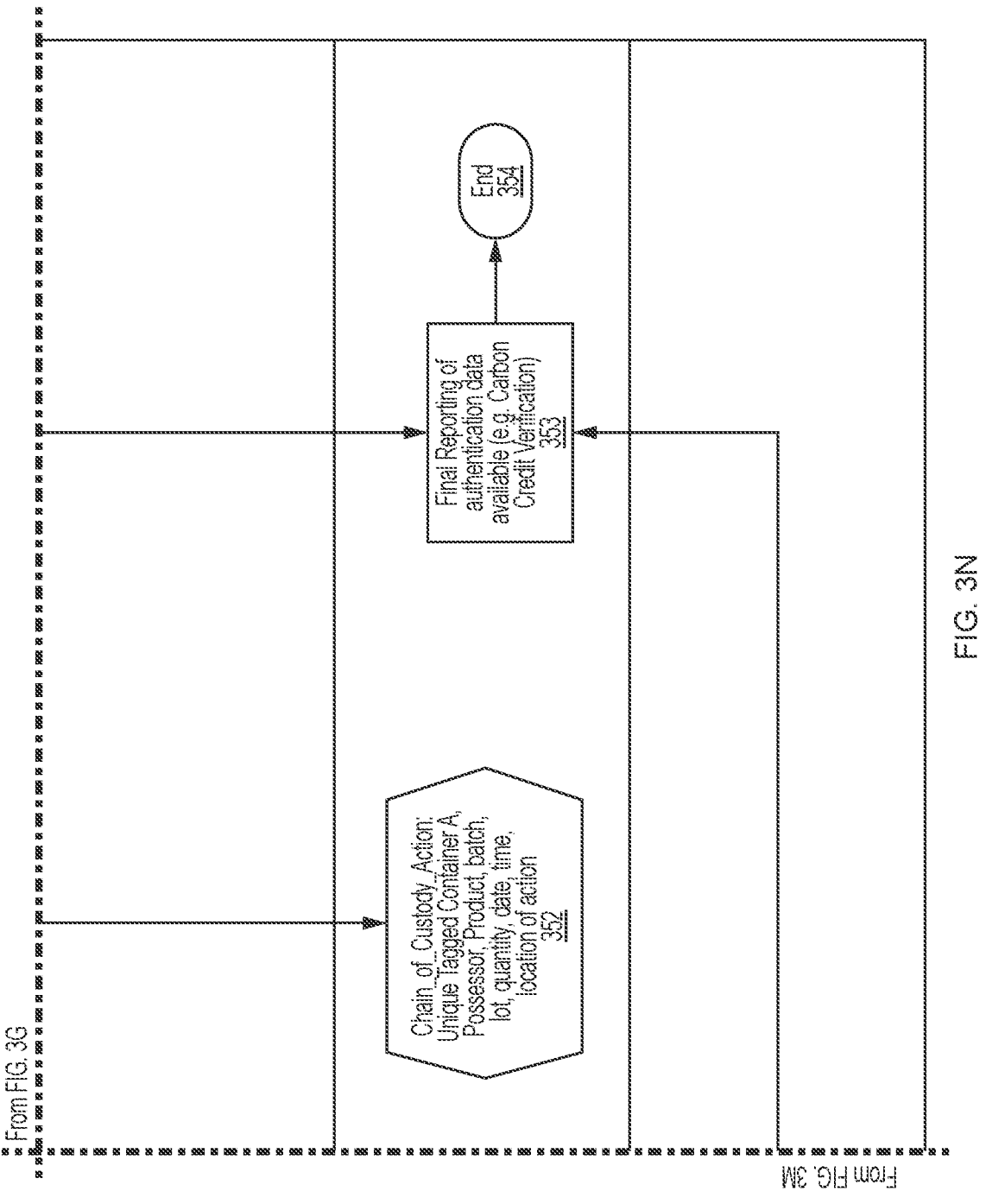

Referring to FIGS. 3A-3N, a swim lane diagram is shown of a method for validating carbon credit-eligible activities according to one embodiment of the present invention. Each of the rows in FIGS. 3A-3N corresponds to a particular actor and shows actions taken by that actor. In particular, the diagram of FIGS. 3A-3N contains rows corresponding to the following actors:

a manufacturer of a product (e.g., synthetic nitrogen fertilizer or nitrogen-fixing crop input);
  a first possessor ("Possessor 1") of a container containing the product;
  a second possessor ("Possessor 2") of the container containing the product;
  an Nth possessor ("Possessor N") of the container containing the product, where is any value greater than or equal zero (e.g., 0, 1, 2, 3, or greater);
  a final possessor (e.g., consumer or end user) ("Final Possessor") of the product;
  an external database (such as a distributed ledger, e.g., a blockchain), including one or more computer systems that can write to and read from the external database; and a Container Data Module (CDM) ("Tagged Container Data Module") associated with the container containing the product.

The method may begin (step 301) and include the following. The manufacturer manufactures a Product A (step 302). The manufacturer transfers some amount of Product A to a tagged Container A (i.e., fills Container A with some amount of Product A) (step 303). Note that the Manufacturer in FIGS. 3A-3N may be a manufacturer of Product A and/or a manufacturer of Container A. Alternatively, the Manufacturer in FIGS. 3A-3N may not be a manufacturer of either Product A or Container A, but may instead be any party who performs the functions shown in the swim lane labeled "Manufacturer" in FIGS. 3A-3N.

One or more records 5 containing data representing information about the storage of Product A into Container A are stored in the external database (step 304). The storing in step 304 may be performed by any of a variety of parties in any of a variety of ways. The following description of examples of ways in which step 304 may be performed is equally applicable to other steps in the method of FIGS. 3A-3N for storing data in the distributed ledger (i.e., steps 310, 313, 318, 321, 326, 329, 334, 337, 340, 348, and 351).

The particular data disclosed herein as being stored in external database record 305 (and the other external database records disclosed herein) are merely examples of such data and are not limitations of the present invention. The record 305 may include data in addition to the data disclosed herein as being stored in the record 305. The record 305 need not include all of the data disclosed herein as being stored in the record 305.

The storing in step 304 may, for example, be performed by the manufacturer, e.g., using one or more computing devices to communicate with the external database (e.g., over a network, such as the Internet) and thereby cause the record 305 to be stored in the external database. The computing device(s) used by the manufacturer to store the record 305 in the external database may, for example, be distinct from the computing device(s) used by the other actors shown in FIGS. 3A-3N to store records 311, 314, 319, 322, 327, 330, 335, 338, 343, and 349 in the external database.

As another example, the manufacturer may use one or more computing devices to transmit (over a network, such as the Internet) some or all of the information to be stored in the record 305 to another actor (such as one of the other actors shown in FIGS. 3A-3N, or an actor not shown in FIGS. 3A-3N), referred to herein for the sake of simplicity as an external database intermediary. Said external database intermediary may then communicate with the external database (e.g., over a network, such as the Internet) and thereby cause the record 305 to be stored in the external database. Such use of an intermediary prevents the necessity of developing a computer application that allows each actor's computing device(s) to communicate with and effect transactions directly with the external database. One or more of the other actors shown in FIGS. 3A-3N may similarly use one or more computing devices to transmit (over a network, such as the Internet) some or all of the information to be stored in some or all of the records 314, 319, 322, 327, 330, 335, 338, 343, and 349 to the same external database intermediary, which may then communicate with the external database (e.g., over a network, such as the Internet) and thereby cause those records to be stored in the external database. In other words, the external database intermediary may act as a centralized mechanism, for use by some or all of the actors in FIGS. 3A-3N, for storing records in the external database. Some of the actors in FIGS. 3A-3N may communicate directly (i.e., without using the external database intermediary) with the external database to cause records to be stored in the external database, while other actors in FIGS. 3A-3N may communicate indirectly with the external database, through the external database intermediary, to cause records to be stored in the external database.

The record 305 may contain any of a variety of data, such as data representing any one or more of the following, in any combination:

A type of the action represented by the external database entry, e.g., "container initiation action."

A unique ID of Container A.

A unique ID of a possessor of Container A at the time of the filling in step 303 (e.g., a unique ID of the Manufacturer).

A unique ID of Product A.

The batch, lot, quantity, date, time, and location at which Product A was transferred to Container A in step 303.

Some or all of the information stored in the external database record 305 may be stored in Container A's CDM, such as in a record 307 in the CDM or by otherwise updating the CDM (step 306). The Manufacturer may, for example, use a computing device to update Container A's CDM in step 306. Anything disclosed herein in connection with step 306 is equally applicable to other CDM updates in FIGS. 3A-3N, i.e., steps 315, 323, 331, and 344.

Step 306 is optional and may be omitted from the method of FIGS. 3A-3N. For example, Container A's CDM may store data in the form of a bar code, QR code, or other non-updateable (static) data. Data representing information about Container A may, for example, be stored in Container A's CDM before step 306 (and even before the start 301 of the method of FIGS. 3A-3N), such as the unique container ID of Container A. Embodiments of the present invention may, at any of a variety of times, read the container ID from Container A's CDM and correlate that container ID with the container ID stored elsewhere, such as in the external database. For example, in addition to or instead of step 306, the Manufacturer may store some or all of the information contained in the external database record 305 in a data store other than the external database and Container A's CDM, such as a database that is local to or remote from the Manufacturer. Other updates to the external database shown in FIGS. 3A-3N may also be stored in such another data store, and may contain Container A's unique ID. At any time, the manufacturer may read Container A's container ID from Container A's CDM, correlate that container ID with the container ID stored in one or more records in the other data store, and thereby retrieve information about Container A that is not stored in Container A's CDM.

Some event triggers a transfer of possession of Container A (step 308). The Manufacturer transfers possession of Container A to Possessor 1 (step 309). Possessor 1 may, for example, be a retailer of Product A, but more generally may be any party who performs the functions shown in the swim lane labeled "Possessor 1" in FIGS. 3A-3N.

One or more records 311 containing data representing information about the transfer of possession of Container A from the Manufacturer to Possessor 1 are stored in the external database (step 310). The storing in step 310 may be performed by the Manufacturer, or any other party, in any of the ways disclosed above in connection with step 304.

The record 311 may contain any of a variety of data, such as data representing any one or more of the following, in any combination:

A type of the action represented by the external database entry, e.g., "chain of custody action."

A unique ID of Container A.

A unique ID of Possessor 1.

A unique ID of Product A.

The batch, lot, quantity, date, time, and location at which Container A was transferred from the Manufacturer to Possessor 1.

Possessor 1 accepts possession of Container A (step 312). One or more records 314 containing data representing information about the acceptance of possession of Container A by Possessor 1 are stored in the distributed ledger (step 313). The storing in step 313 may be performed by Possessor 1, or any other party, in any of the ways disclosed above in connection with step 304.

The record 314 may contain any of a variety of data, such as data representing any one or more of the following, in any combination:

A type of the action represented by the external database entry, e.g., "chain of custody action."

A unique ID of Container A.

A unique ID of Possessor 1.

A unique ID of Product A.

The batch, lot, quantity, date, time, and location at which Possessor 1 accepted custody of Container A.

Some or all of the information stored in the external database record 314 may be stored in Container A's CDM, such as in a record 316 in the CDM or by otherwise updating the CDM (step 315). Possessor 1 may, for example, perform step 315 in any of the ways disclosed above in connection with step 306. Step 315 is optional and may be omitted from the method of FIGS. 3A-3N, as described above in connection with the optional nature of step 306.

Possessor 1 transfers possession of Container A to Possessor 2 (step 317). Possessor 2 may, for example, be a farmer who uses Product A, but more generally may be any party who performs the functions shown in the swim lane labeled "Possessor 2" in FIGS. 3A-3N. In practice, there may not be any Possessor 2. As a result, step 317, and the other steps shown in the swim lane labeled "Possessor 2" in FIGS. 3A-3N, are optional and may be omitted from the method of FIGS. 3A-3N.

One or more records 319 containing data representing information about the transfer of possession of Container A from Possessor 1 to Possessor 2 are stored in the distributed ledger (step 318). The storing in step 318 may be performed by the Manufacturer, or any other party, in any of the ways disclosed above in connection with step 310.

The record 319 may contain any of a variety of data, such as any of the data disclosed in connection with record 311, except that the data in record 319 may represent data representing the transfer of possession from Possessor 1 to Possessor 2, rather than the transfer of possession from the Manufacturer to Possessor 1.

Possessor 2 accepts possession of Container A (step 320). One or more records 322 containing data representing information about the acceptance of possession of Container A by Possessor 2 are stored in the distributed ledger (step 321). The storing in step 321 may be performed by Possessor 1, or any other party, in any of the ways disclosed above in connection with step 313.

The record 322 may contain any of a variety of data, such as any of the data disclosed in connection with record 314, except that the data in record 322 may represent data representing the acceptance of possession by Possessor 2 rather than Possessor 1.

Some or all of the information stored in the external database record 322 may be stored in Container A's CDM, such as in a record 324 in the CDM or by otherwise updating the CDM (step 323). Possessor 2 may, for example, perform step 323 in any of the ways disclosed above in connection with step 315. Step 323 is optional and may be omitted from the method of FIGS. 3A-3N, as described above in connection with the optional nature of step 306.

Possessor 2 transfers possession of Container A to Possessor N (step 325). In practice, there may not be any Possessor N. As a result, step 325, and the other steps shown in the swim lane labeled "Possessor N" in FIGS. 3A-3N, are optional and may be omitted from the method of FIGS. 3A-3N. In practice, there may be more than one Possessor N. As a result, step 325, and the other steps shown in the swim lane labeled "Possessor N" in FIGS. 3A-3N, may be performed multiple times, once for each of a plurality of possessors. More generally, the intent of the swim lanes labeled "Possessor 1," "Possessor 2," and "Possessor N" in FIGS. 3A-3N is to illustrate that possession may be transferred from the Manufacturer to any number (i.e., one or more) other parties in sequence, and that the steps shown in each of the "Possessor" swim lanes in FIGS. 3A-3N may be performed for each such possessor.

One or more records 327 containing data representing information about the transfer of possession of Container A from Possessor 2 to Possessor N are stored in the external database (step 326). The storing in step 326 may be performed by Possessor N, or any other party, in any of the ways disclosed above in connection with step 310.

The record 327 may contain any of a variety of data, such as any of the data disclosed in connection with record 311, except that the data in record 327 may represent data representing the transfer of possession from Possessor 2 to Possessor N, rather than the transfer of possession from the Manufacturer to Possessor 1. For example, a wholesale possessor may transfer possession of the container to a retail possessor, or a wholesale possessor may transfer possession to another wholesale possessor.

Possessor N accepts possession of Container A (step 328). One or more records 330 containing data representing information about the acceptance of possession of Container A by Possessor N are stored in the external database (step 329). The storing in step 329 may be performed by Possessor N, or any other party, in any of the ways disclosed above in connection with step 313.

The record 330 may contain any of a variety of data, such as any of the data disclosed in connection with record 314, except that the data in record 330 may represent data representing the acceptance of possession by Possessor N rather than Possessor 1.

Some or all of the information stored in the external database record 30 may be stored in Container A's CDM, such as in a record 332 in the CDM or by otherwise updating the CDM (step 331). Possessor N may, for example, perform step 331 in any of the ways disclosed above in connection with step 315. Step 331 is optional and may be omitted from the method of FIGS. 3A-3N, as described above in connection with the optional nature of step 306.

Possessor N transfers possession of Container A to a Customer or other end user, such as a consumer or applier of the container (step 333). (For ease of explanation, the term "Customer" is used herein to refer to whichever party receives possession of Container A and applies Product A from Container A.) If Possessor N was omitted from the method of FIGS. 3A-3N, then the transfer in step 333 is from the most recent possessor (e.g., Possessor 1 or Possessor 2) of Container A to the Customer.

One or more records 35 containing data representing information about the transfer of possession of Container A from Possessor N to the Customer are stored in the distributed ledger (step 334). The storing in step 334 may be performed by the Customer, or any other party, in any of the ways disclosed above in connection with step 310.

The record 335 may contain any of a variety of data, such as any of the data disclosed in connection with record 311, except that the data in record 335 may represent data representing the transfer of possession from Possessor N (or other most recent possessor of Container A) to the Customer, rather than the transfer of possession from the Manufacturer to Possessor 1.

The Customer accepts possession of Container A (step 336). One or more records 338 containing data representing information about the acceptance of possession of Container A by the Customer are stored in the external database (step 337). The storing in step 337 may be performed by the Customer, or any other party, in any of the ways disclosed above in connection with step 313.

The record 338 may contain any of a variety of data, such as any of the data disclosed in connection with record 314, except that the data in record 338 may represent data representing the acceptance of possession by the Customer rather than Possessor 1.

Some or all of the information stored in the external database record 338 may be stored in Container A's CDM, such as in a record 340 in the CDM or by otherwise updating the CDM (step 339). The Customer may, for example, perform step 339 in any of the ways disclosed above in connection with step 315. Step 339 is optional and may be omitted from the method of FIGS. 3A-3N, as described above in connection with the optional nature of step 306.

The Customer consumes some or all of Product A from Container A, such as by dispensing some or all of Product A from Container A onto a field (step 341) when the invention is used in conjunction with soil-applied or plant-applied products, or simply by operating an internal combustion engine when the invention is used to track end-user fuel consumption. One or more records 343 containing data representing information about the consumption of Product A from Container A by the Customer are stored in the distributed ledger (step 342). The storing in step 342 may be performed by the Customer, or any other party, in any of the ways disclosed above in connection with step 304.

The record 343 may contain any of a variety of data, such as data representing any one or more of the following, in any combination:

A type of the action represented by the external database entry, e.g., "consumption action."

A unique ID of Container A.

A unique ID of a possessor of Container A at the time of the consumption in step 341 (e.g., a unique ID of the Customer).

A unique ID of Product A.

The batch, lot, quantity/quantities, date(s), time(s), and location(s) at which Product A was consumed in step 341. This data may include, for example, data representing a plurality of consumptions (e.g., dispensings) of Product A from Container A at a plurality of locations, e.g., in the form of an as-applied map, or a geo-tagged consumption record, as disclosed elsewhere herein.

Some or all of the information stored in the external database record 343 may be stored in Container A's CDM, such as in a record 345 in the CDM or by otherwise updating the CDM (step 344). The Customer may, for example, perform step 344 in any of the ways disclosed above in connection with step 315. Step 344 is optional and may be omitted from the method of FIGS. 3A-3N, as described above in connection with the optional nature of step 306.

If Container A is a returnable container (step 346), then the method of FIGS. 3A-3N may include and perform steps 347-351. If Container A is not a returnable container, then the method of FIGS. 3A-3N may not include or perform steps 347-351.

If Container A is a returnable container, then the Customer transfers possession of Container A to a prior possessor of Container A, such as the Manufacturer, Possessor 1, Possessor 2, or Possessor N (step 347). For ease of illustration and explanation, FIGS. 3A-3N shows the Customer transferring possession to the Manufacturer. More generally, however, the Customer may return Container A by transferring possession of Container A to any of the parties shown in FIGS. 3A-3N, such as Possessor 1 or Possessor 2.

One or more records 349 containing data representing information about the transfer of possession of Container A from the Customer to the prior possessor (e.g., Manufacturer) are stored in the distributed ledger (step 348). The storing in step 348 may be performed by the prior possessor, or any other party, in any of the ways disclosed above in connection with step 310.

The record 349 may contain any of a variety of data, such as any of the data disclosed in connection with record 311, except that the data in record 349 may represent data representing the transfer of possession from the Customer to the prior possessor (e.g., Manufacturer), rather than the transfer of possession from the Manufacturer to Possessor 1.

The prior possessor (e.g., Manufacturer) accepts possession of Container A (step 350). One or more records 352 containing data representing information about the acceptance of possession of Container A by the prior possessor are stored in the distributed ledger (step 351). The storing in step 351 may be performed by the prior possessor, or any other party, in any of the ways disclosed above in connection with step 313.

The record 352 may contain any of a variety of data, such as any of the data disclosed in connection with record 314, except that the data in record 352 may represent data representing the acceptance of possession by the Customer rather than Possessor 1.

Whether or not Container A was returnable (i.e., whether or not the method of FIGS. 3A-3N performed steps 347-351), the method of FIGS. 3A-3N generates a final report of authenticated data available in the external database in connection with Container A, such as for the purpose of carbon credit validation. The final report may include a variety of information, such as any one or more of the following, in any combination:

An indication and/or confirmation that the possessors of Container A at each stage in the chain of custody of Container A align. For example, if the external database indicates that possession of Container A was transferred from Possessor 1 to Possessor 2, and then from Possessor 2 to Possessor N, then the report will indicate that the possessors align, whereas if the external database indicates that possession of Container A was transferred from the Manufacturer to Possessor 1, and then from Possessor 2 to Possessor N, then the report will indicate that the possessors do not align.

An indication and/or confirmation that the type of product stored in Container A aligns throughout the history of Container A. For example, if the external database indicates that Container A is filled with Product A and then indicates that, at a later time, Container A contains Product B without any record indicating that Container A was filled with Product B, then the report will indicate that the type of product stored in Container A does not align.

An indication and/or confirmation that the amount of Product A applied as reported by the application equipment matches the Agronomist's prescription (see FIGS. 4A-4P, below).

An indication and/or confirmation that the geolocation of application as reported by the application equipment matches the geo-boundaries of the Agronomist's prescription (see FIGS. 4A-4P, below).

The method of FIGS. 3A-3N may be used to validate carbon credit practices in any of a variety of ways. For example, if, during or after the method of FIGS. 3A-3N, any of the conditions below fail to be satisfied, then the satisfaction of conditions for a carbon credit cannot be confirmed:

The verified Product used must equal the ledger entry from the Manufacturer.

The amount used must be less than or equal to, not greater than the amount the Chain of custody verified.

The application equipment can not apply more than the Product originally held and identified by the Manufacturer & Possessors.

The geolocation of use of the Product must match the prescription's geo boundary of the location of application.

Embodiments of the present invention may use computer-implemented methods and/or systems to determine whether such conditions are satisfied automatically, and thereby to validate carbon credit practices, in whole or in part. For example, a computer-implemented method and/or system may determine, based on the contents of the external database, whether one or more of the conditions above are satisfied. If it is determined that one or more of the above conditions are not satisfied, the method and/or system may conclude that a carbon credit is not warranted. As a particular additional example, the method and/or system may:

Identify a plurality of records, in the external database, indicating operations of filling the container with a particular product, and calculate a sum of the amounts of product filled in such filling operations, to produce a first measure of the current amount of the particular product currently in the container.

Identify a second measure of the current amount of the particular product in the container, such as by identifying a record, in the external database, indicating the current amount of the particular product in the container, or by measuring the current amount of the particular product in the container independently of the contents of the external database (e.g., by weighing the container).

Determine whether the first measure of the current amount of the particular product currently in the container is sufficiently similar to the second measure of the current amount of the particular product currently in the container. As one example, the first and second measures may be considered to be sufficiently similar to each other if they are equal to each other, or if they differ from each other by no more than some predetermined amount or some predetermined percentage.

If the first and second measures are determined not to be sufficiently similar to each other, then concluding that a carbon credit is not warranted.

Figure 4A:
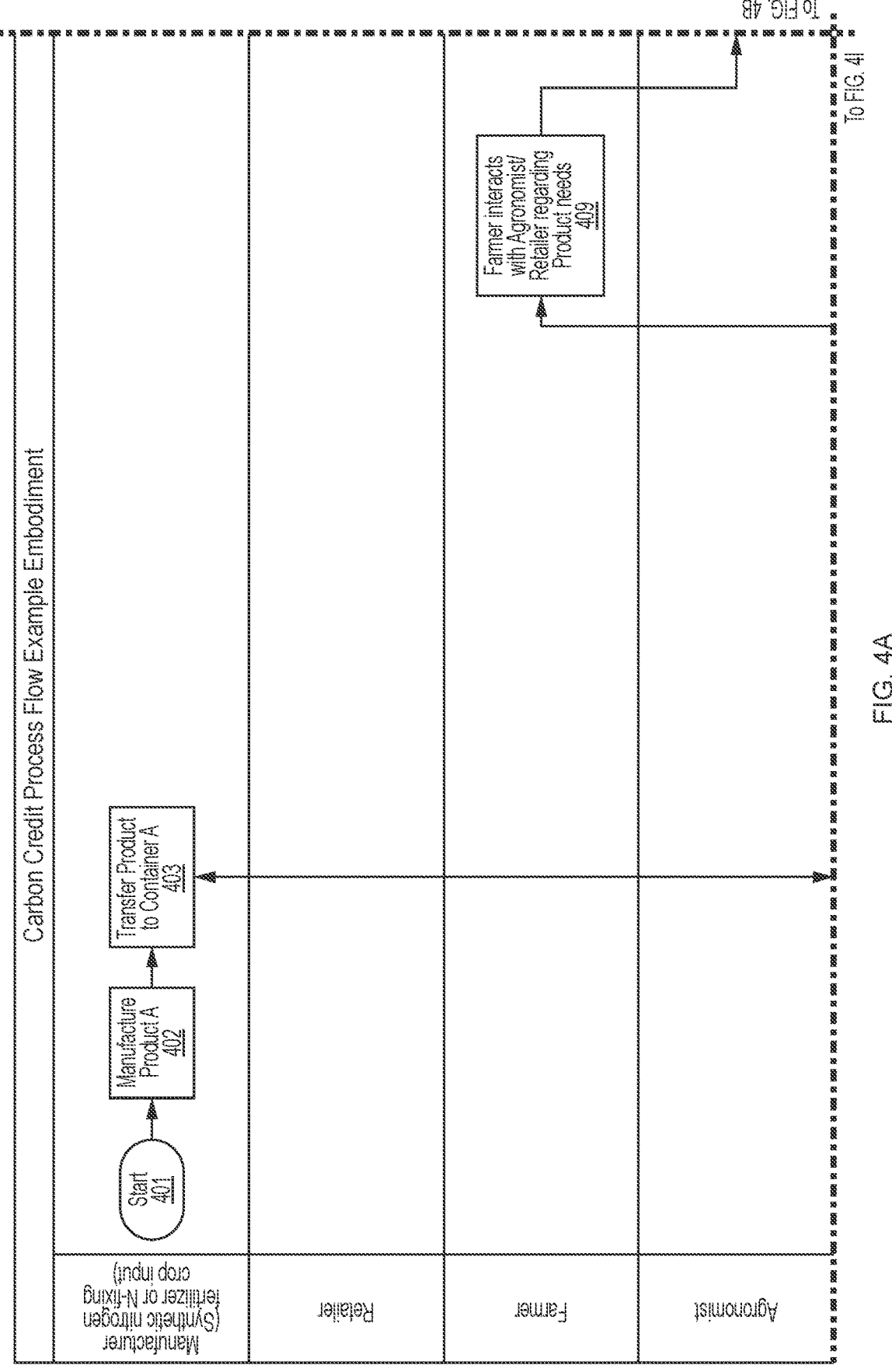
Figure 4B:
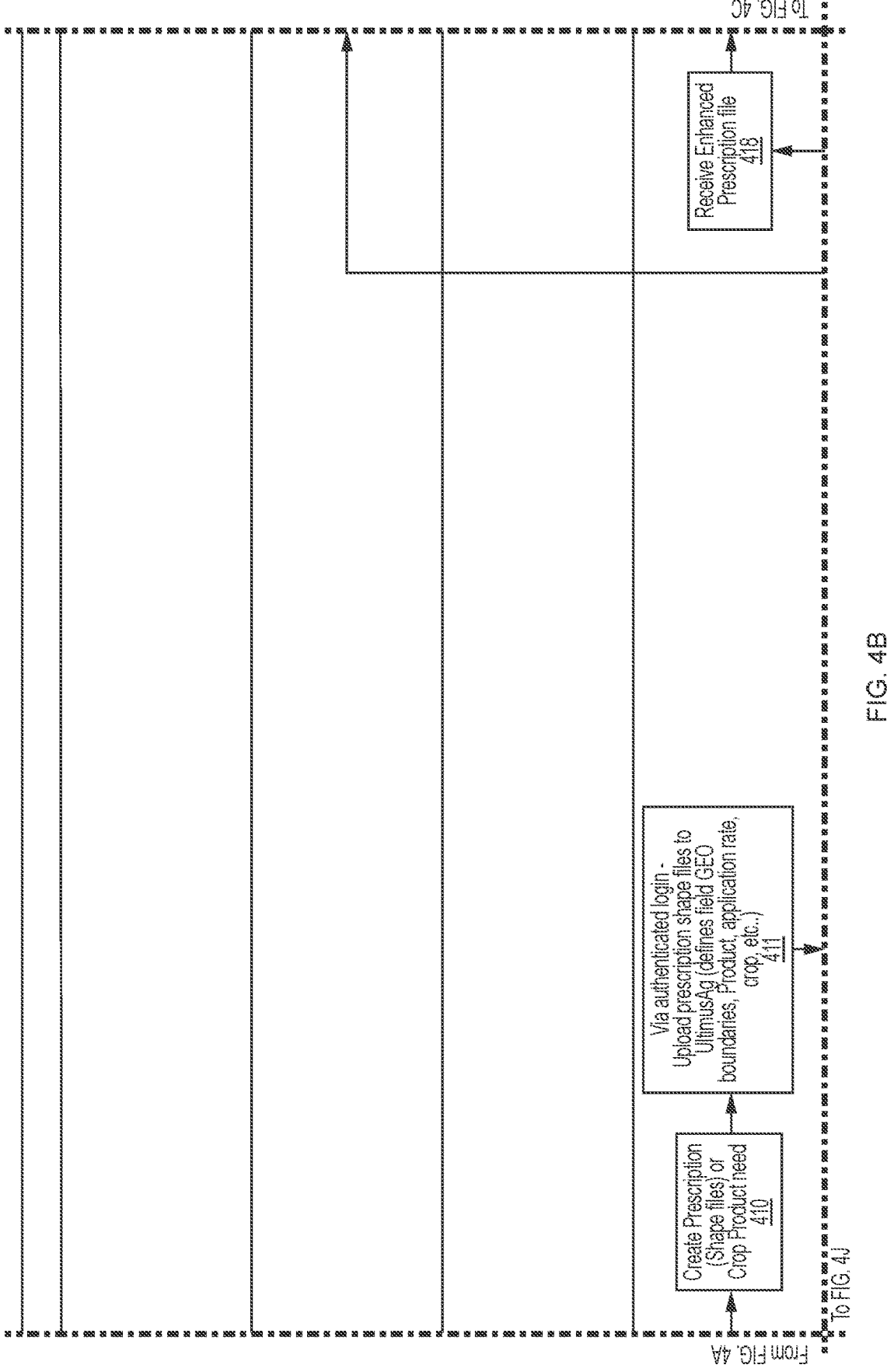
Figure 4C:
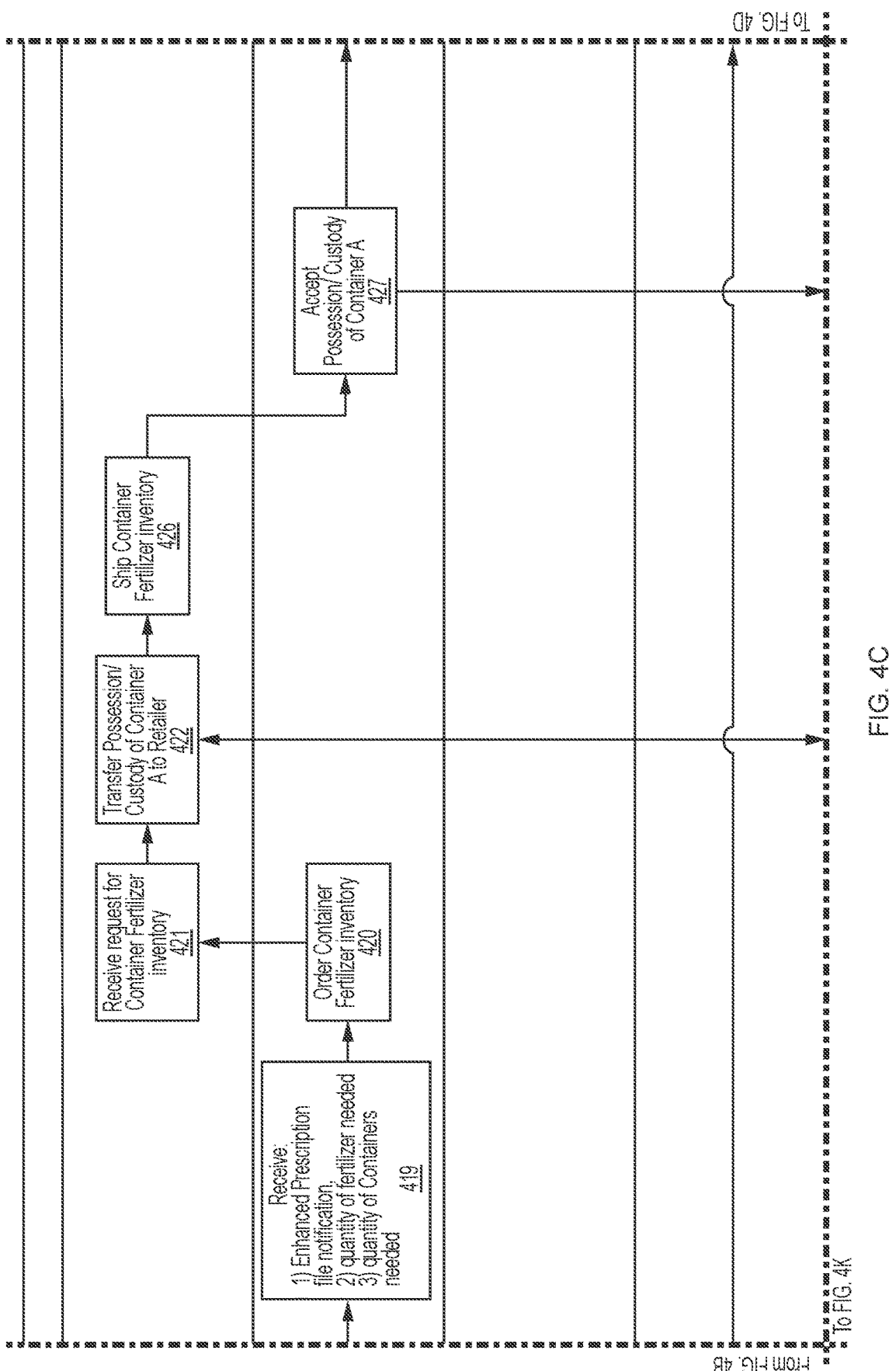
Figure 4D:
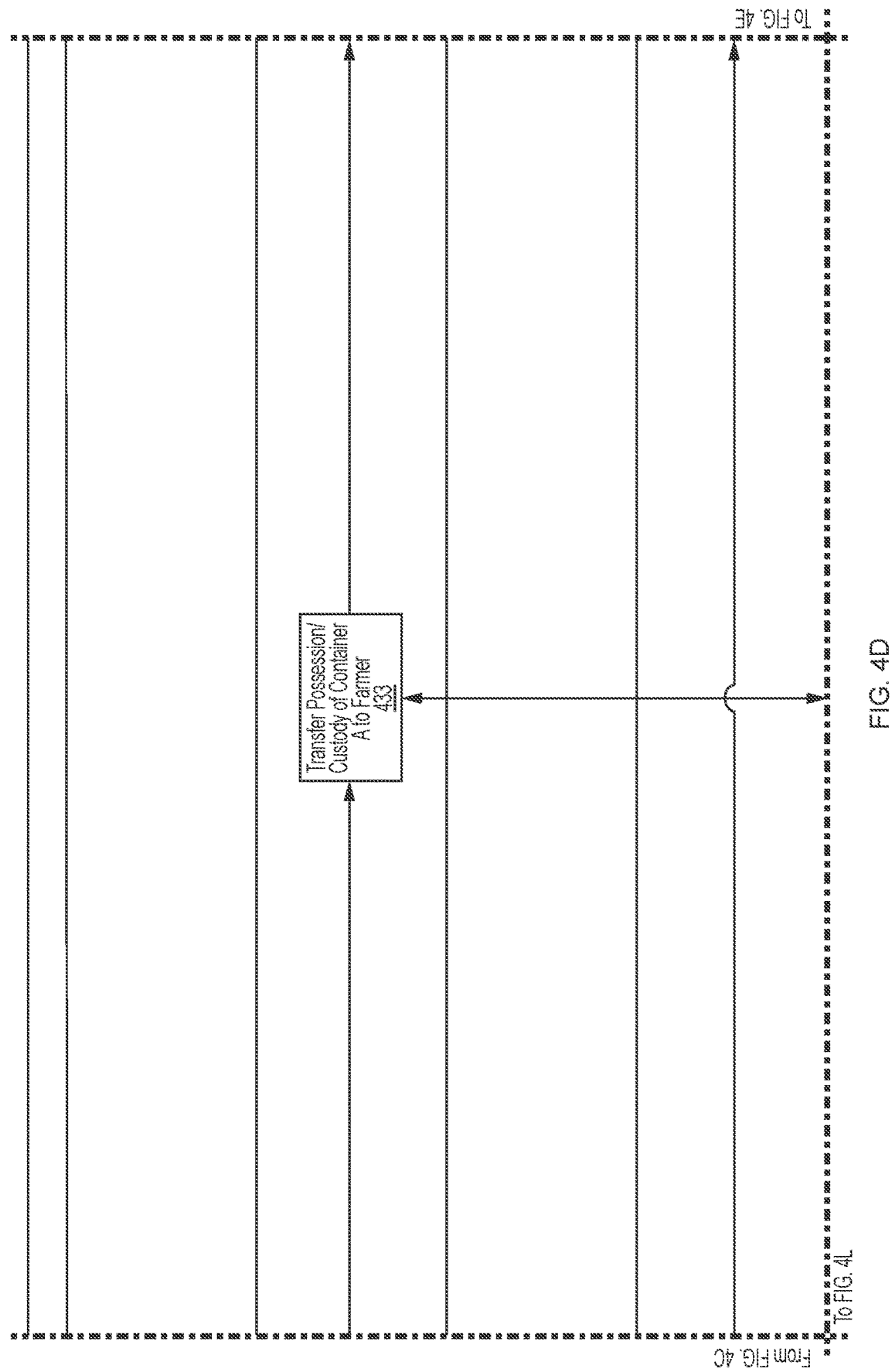
Figure 4E:
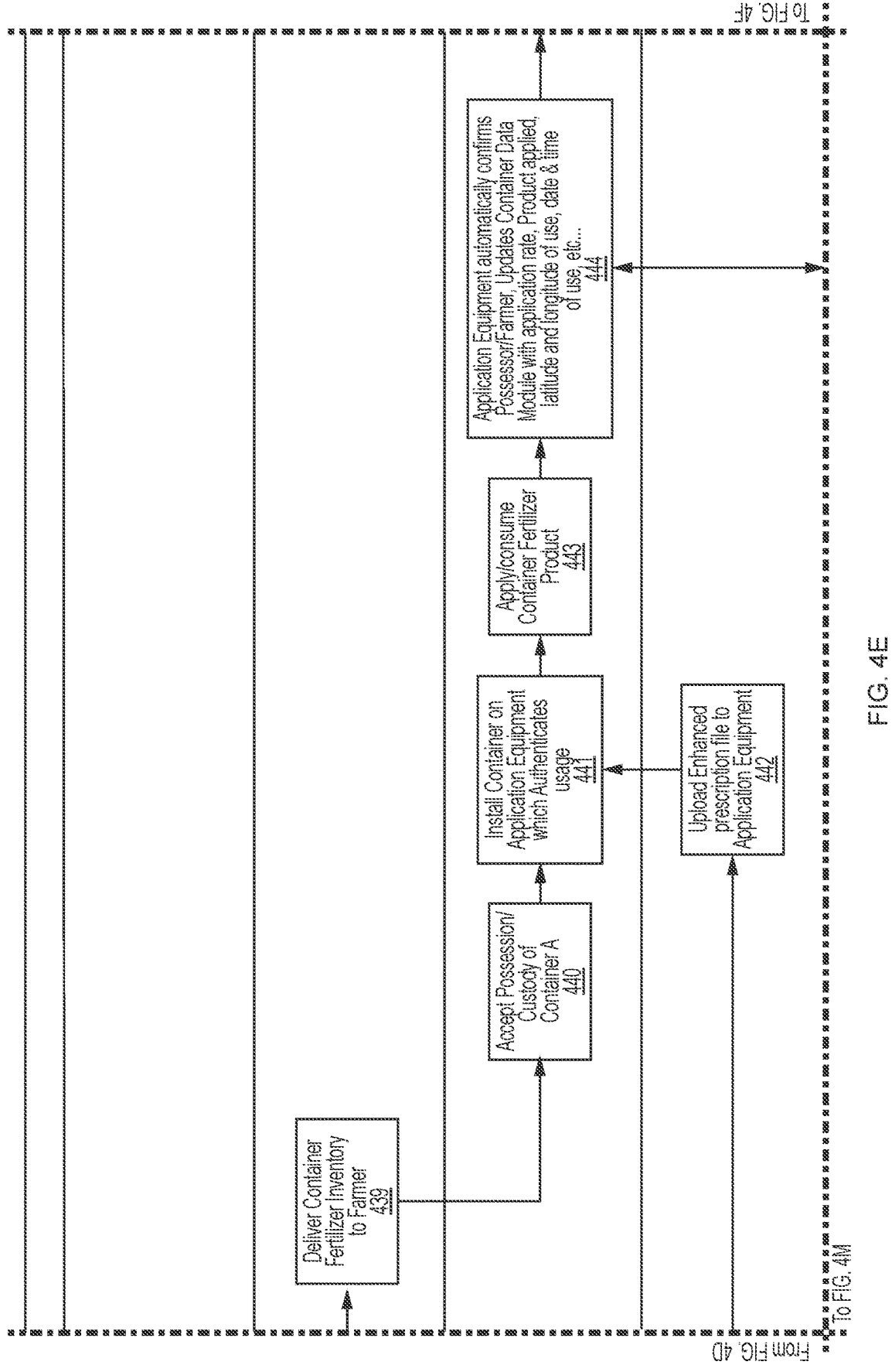
Figure 4F:
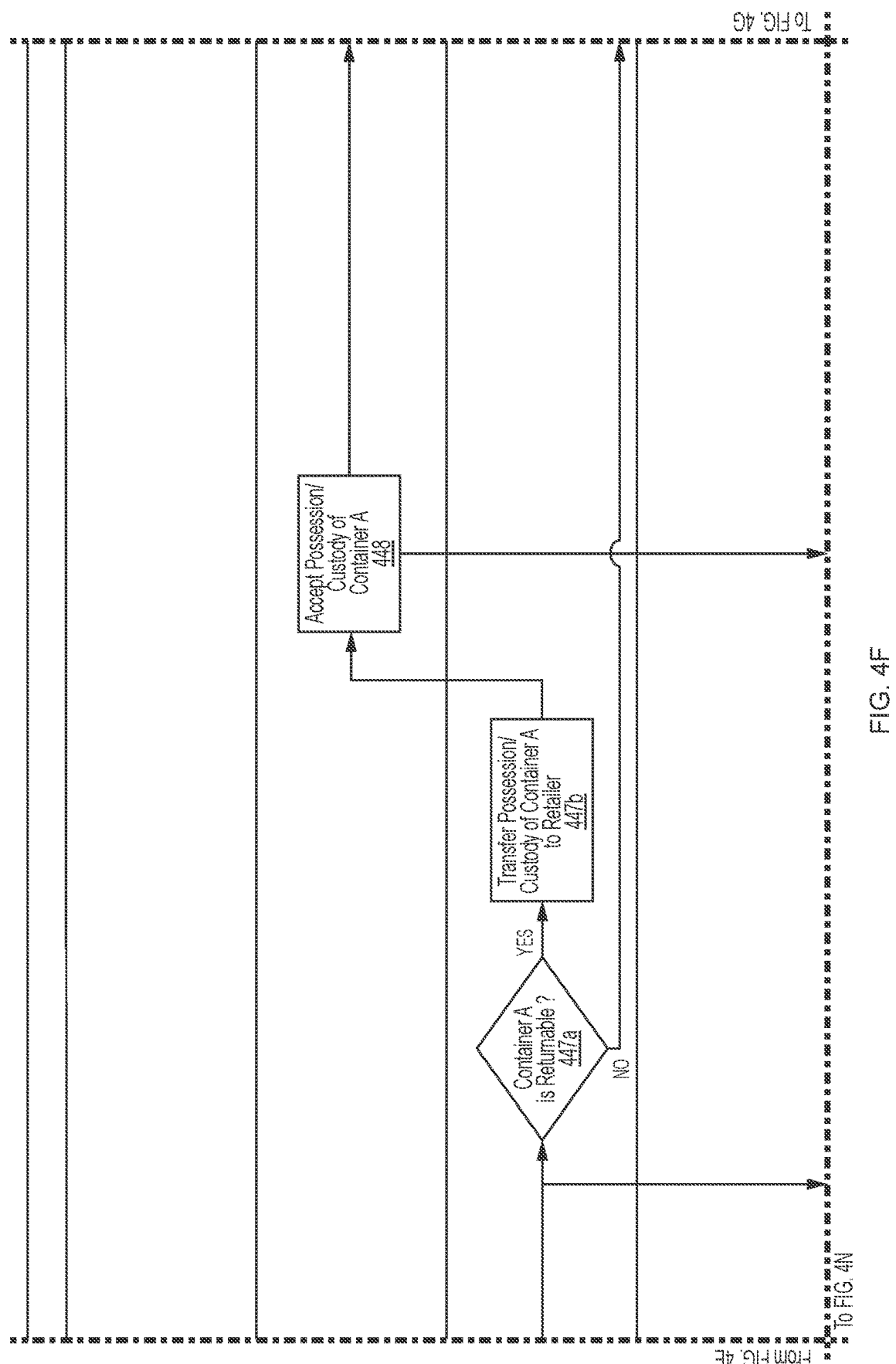
Figure 4G:
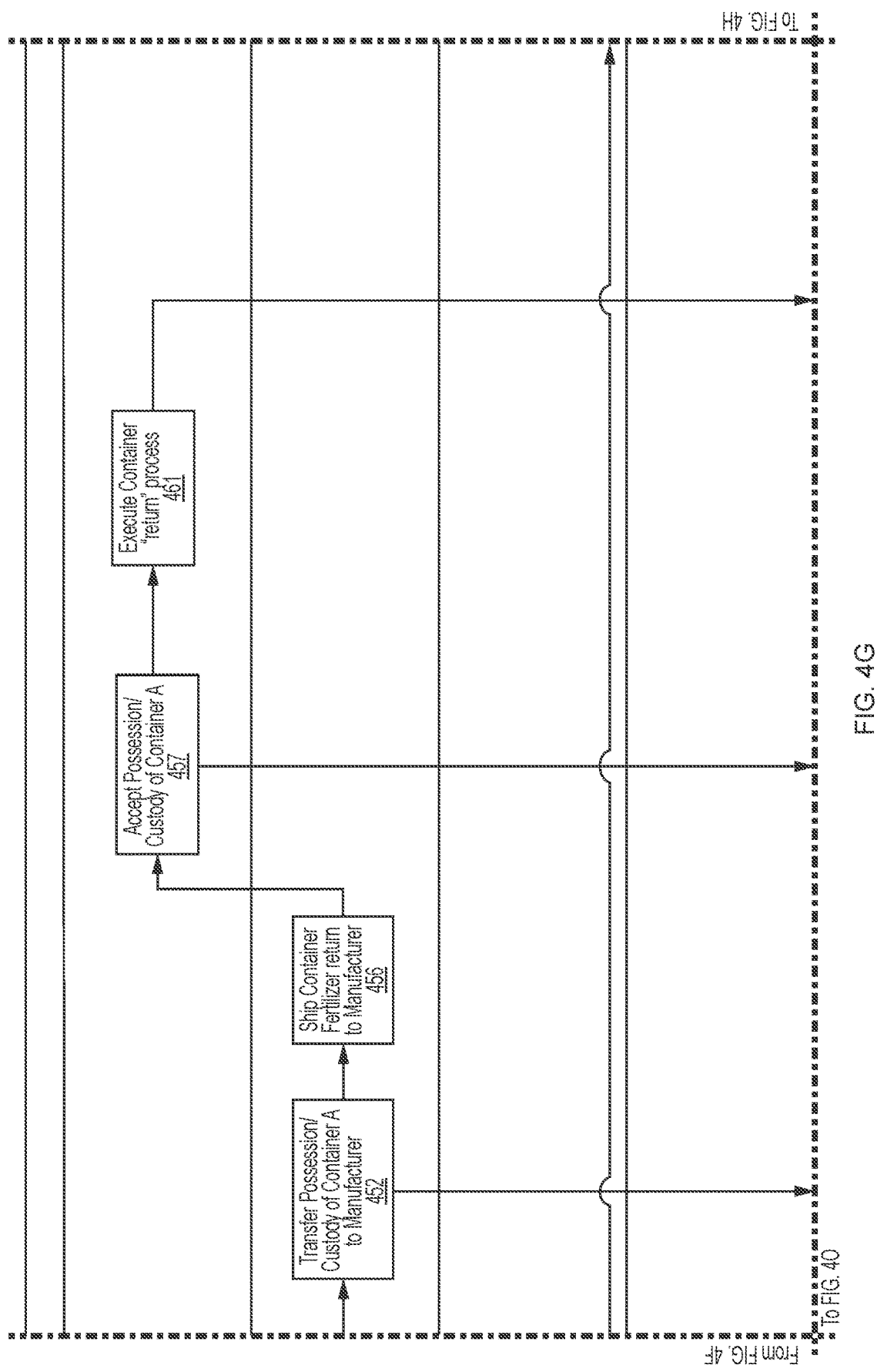
Figure 4H:
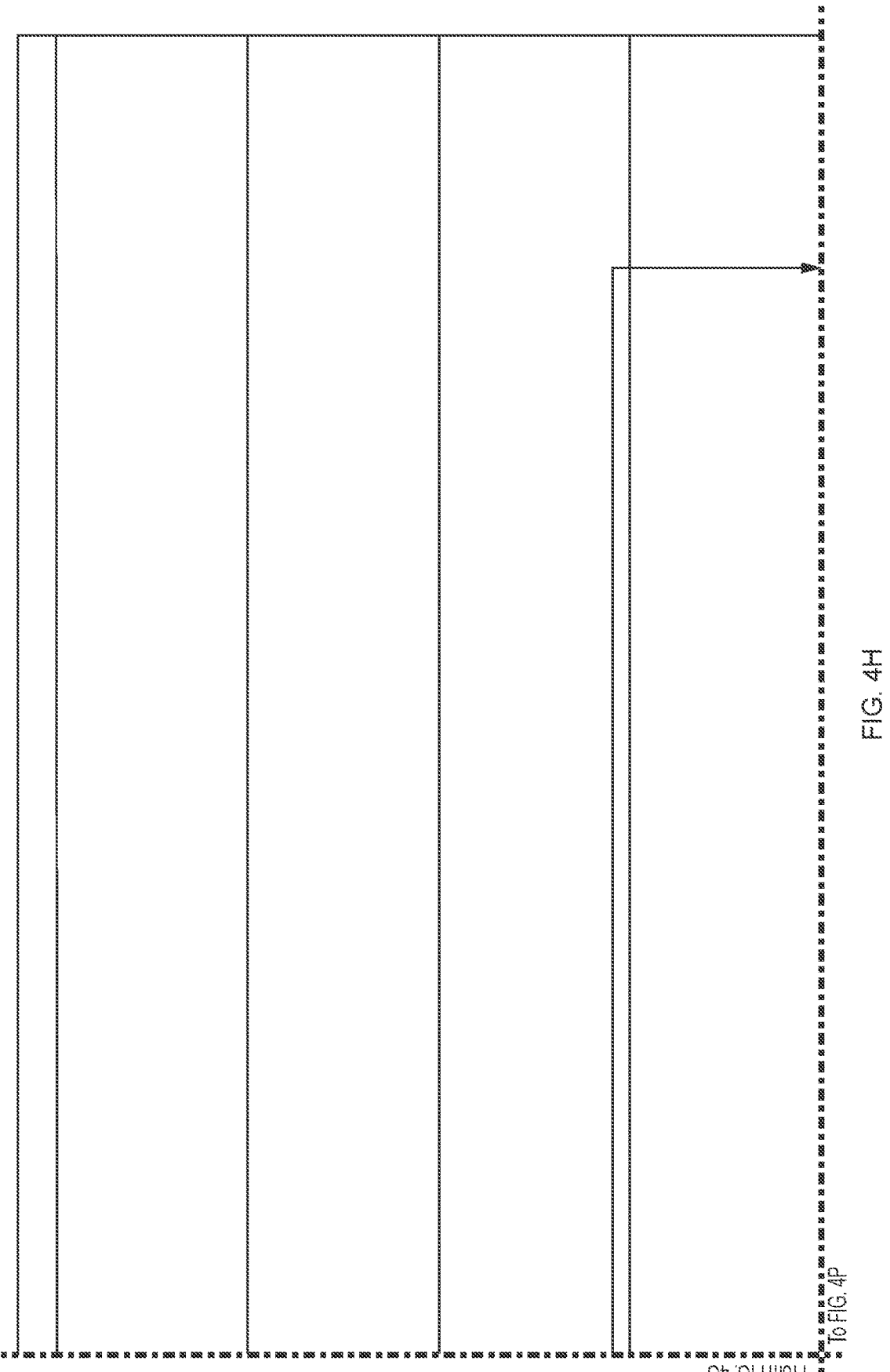
Figure 4I:
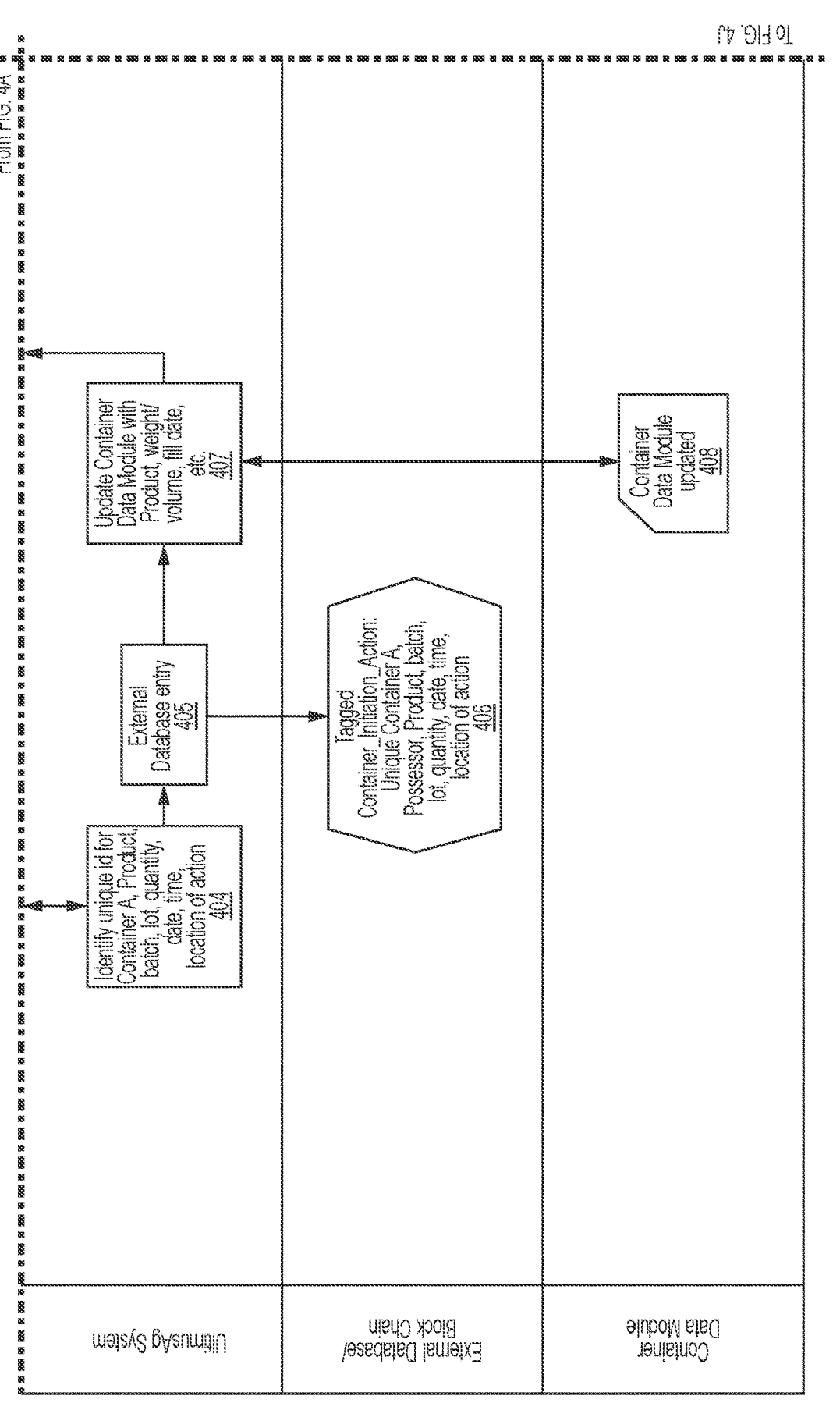
Figure 4J:
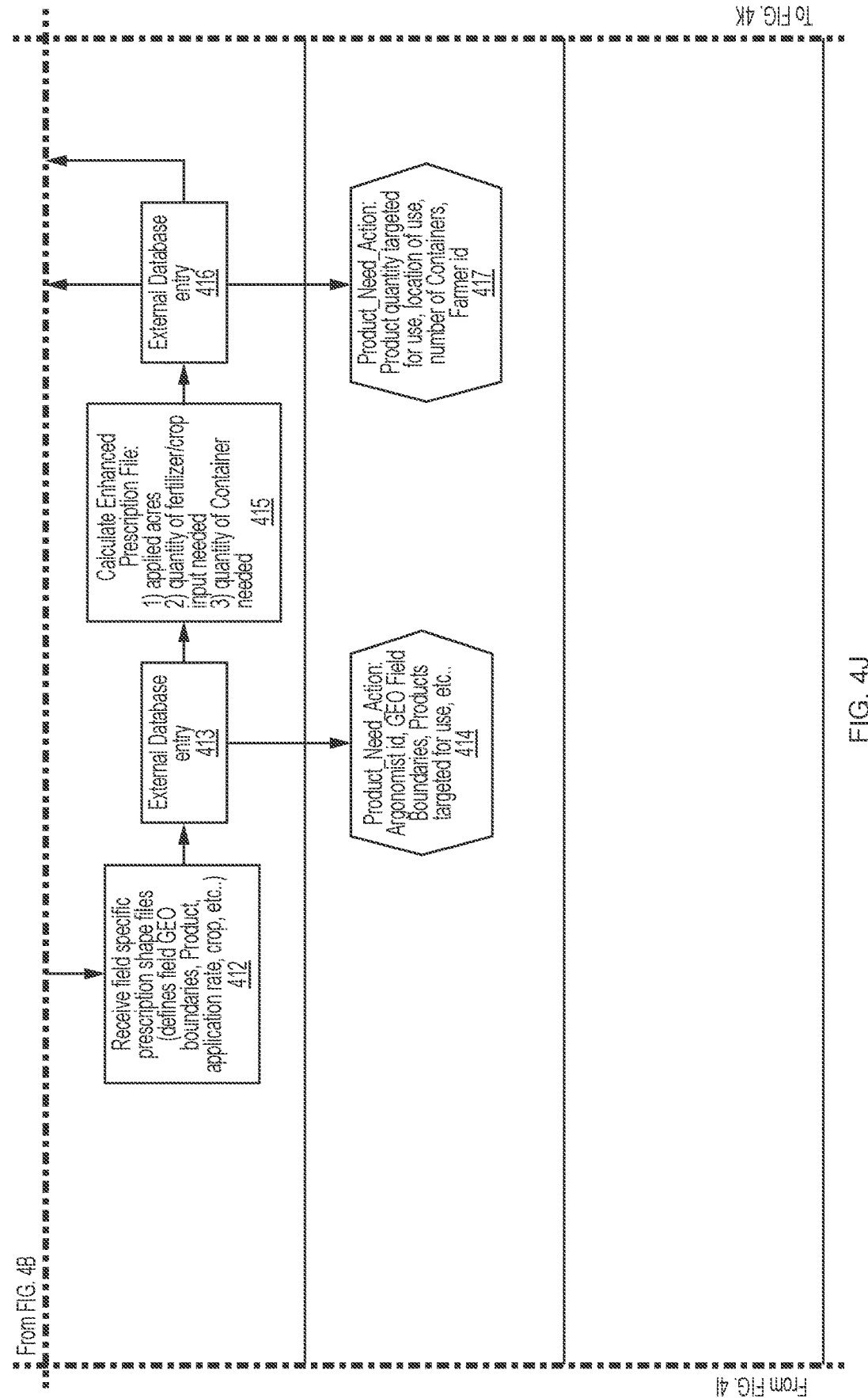
Figure 4K:
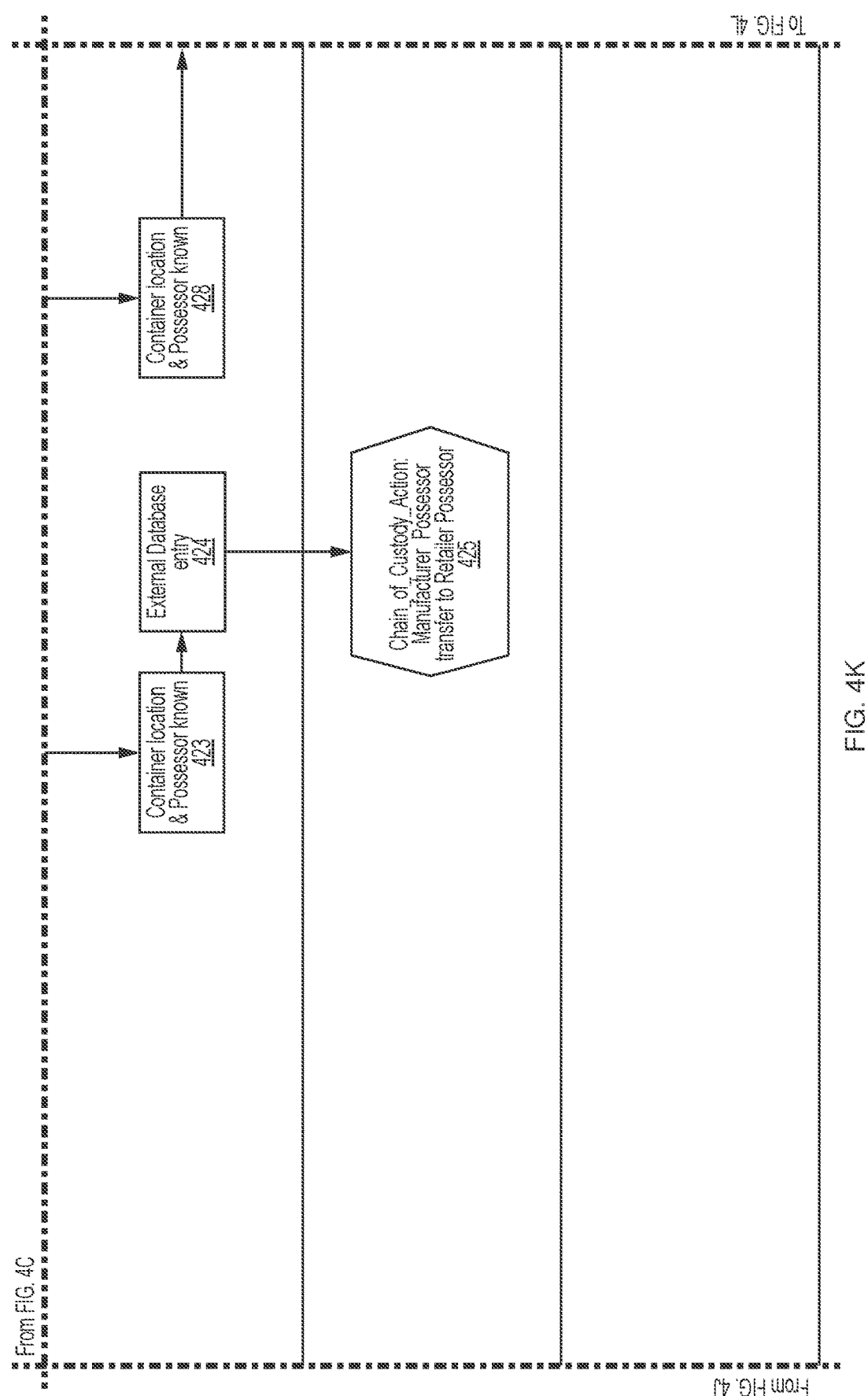
Figure 4L:
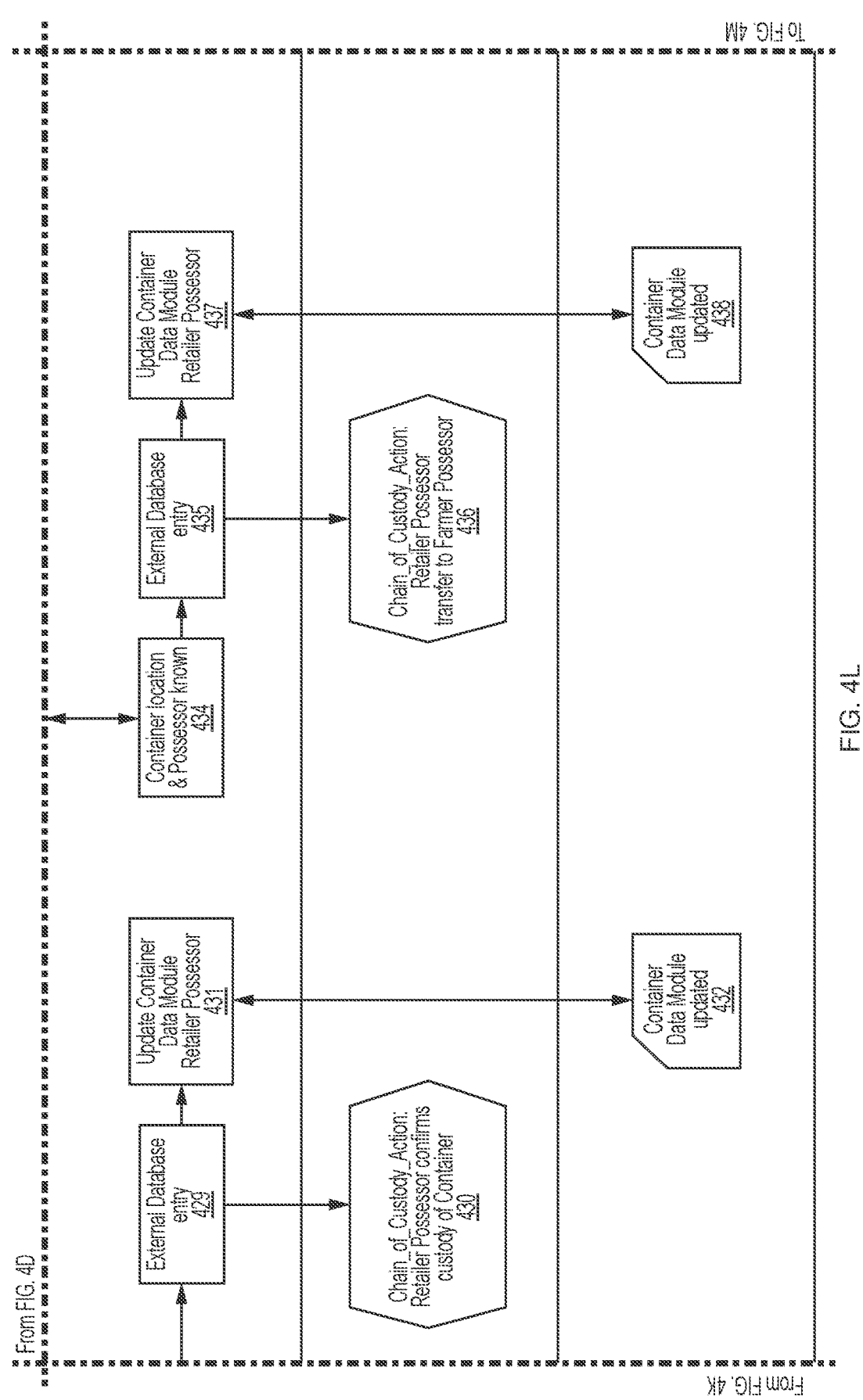
Figure 4M:
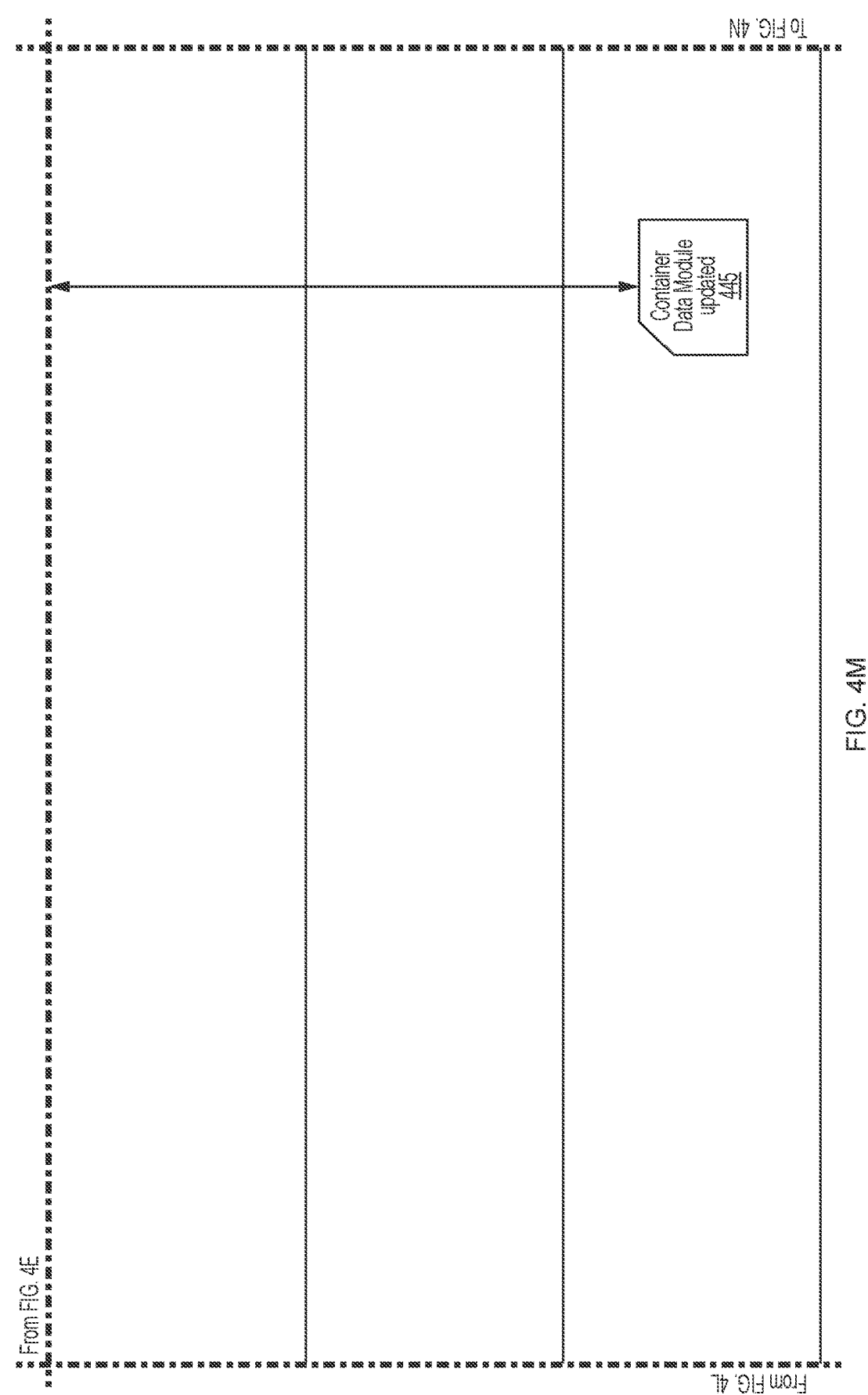
Figure 4N:
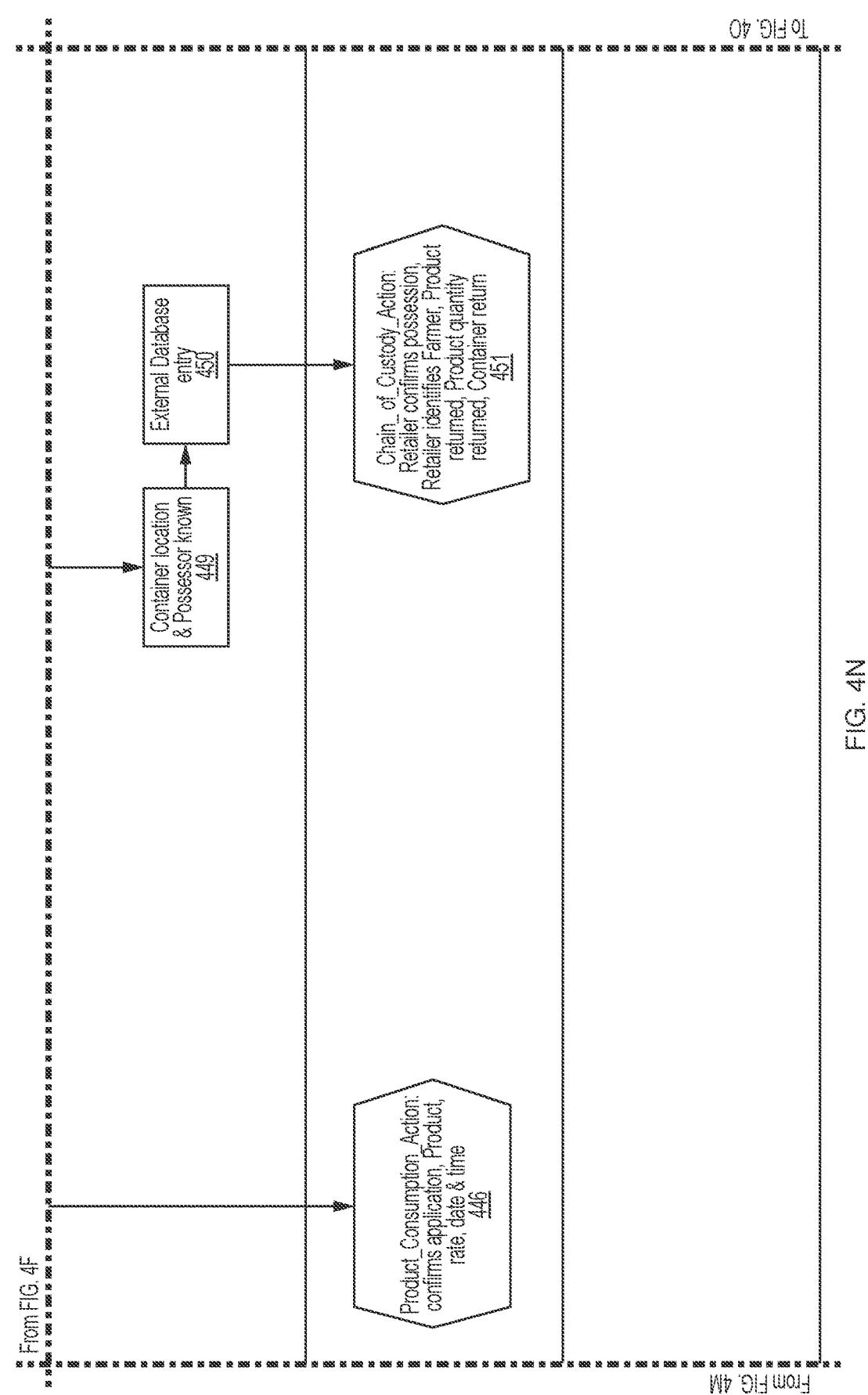
Figure 4O:
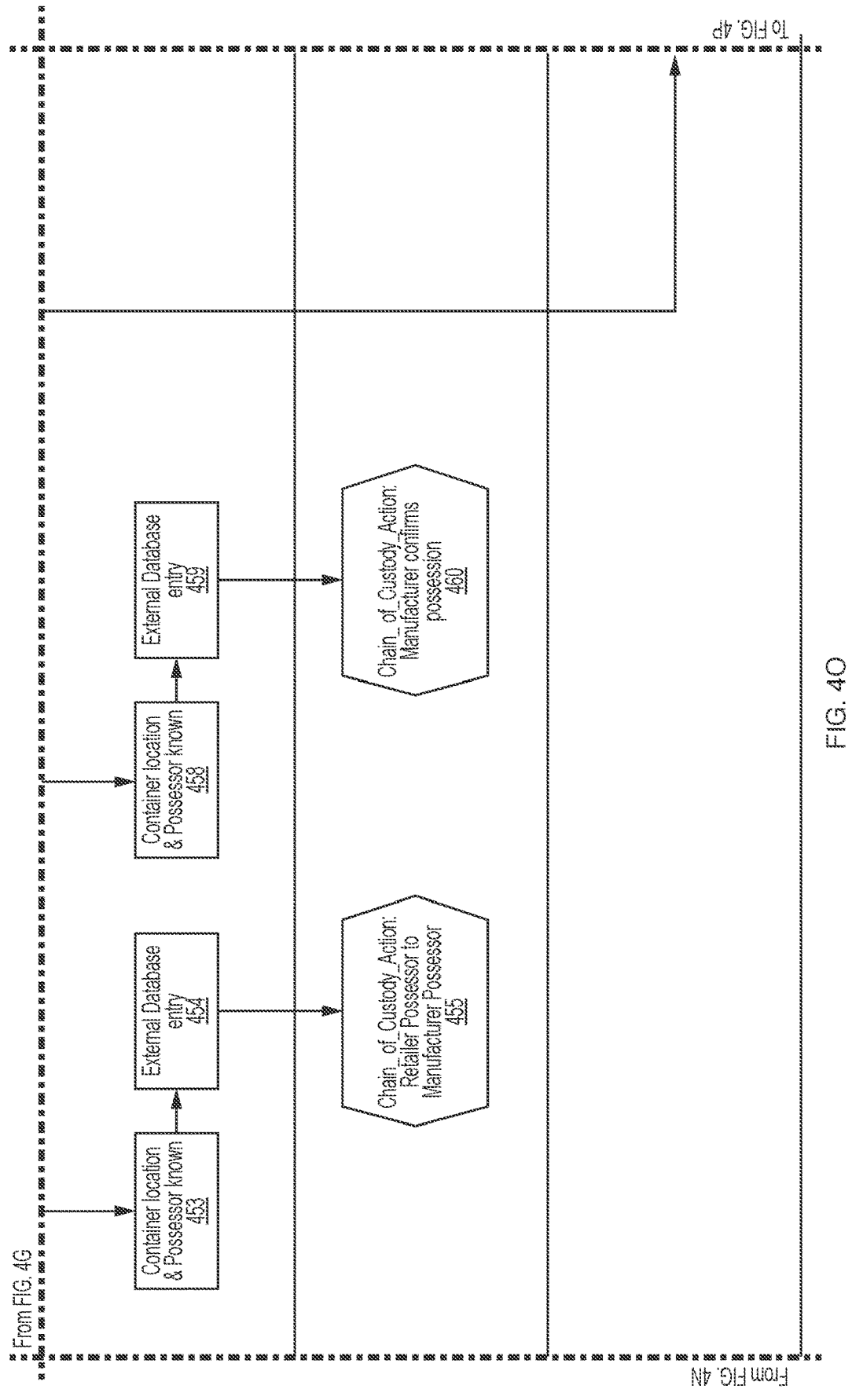
Figure 4P:
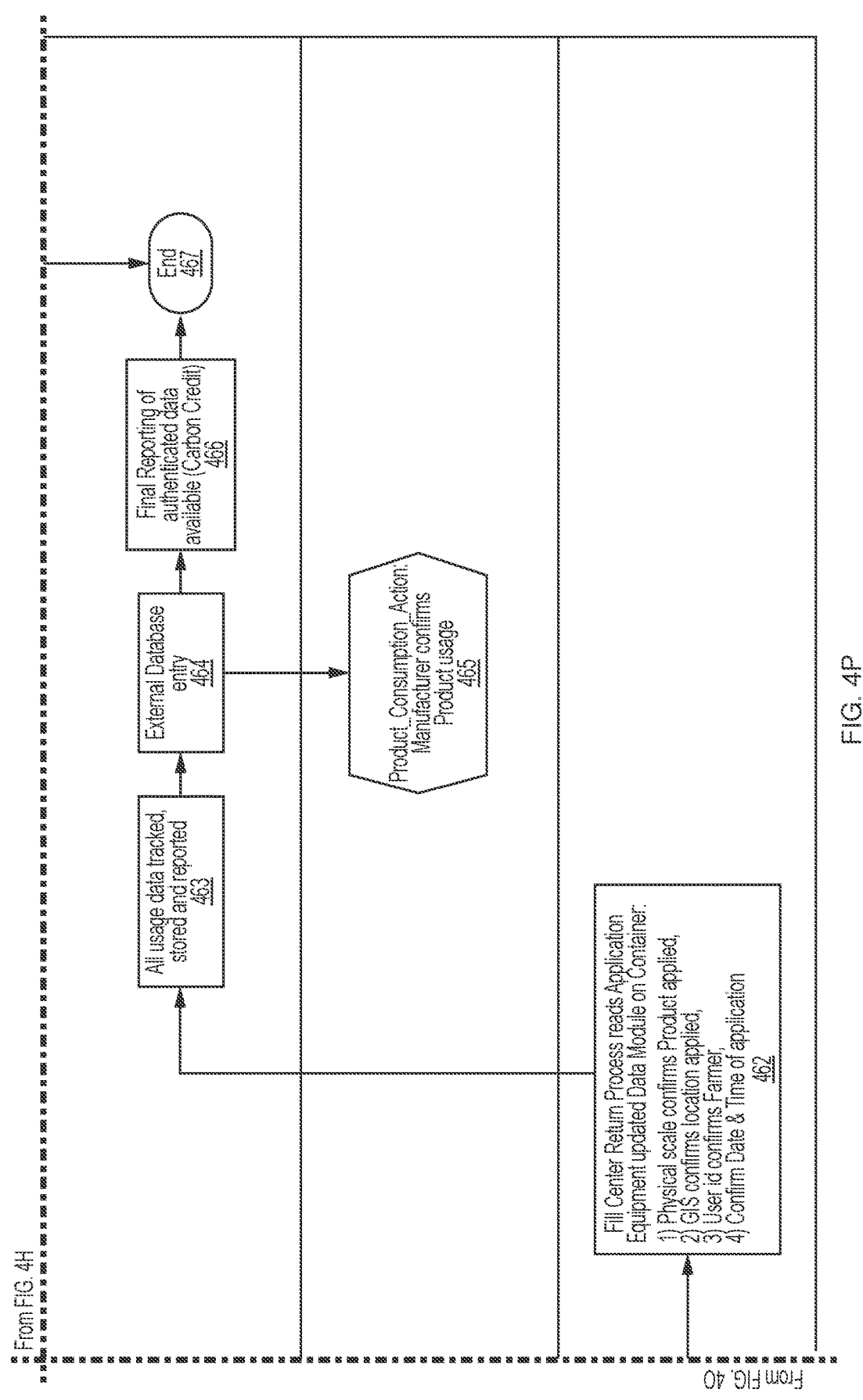

*Referring to FIGS. 4A-4P, a swim lane diagram is shown of a method for validating carbon credit eligible activities according to another embodiment of the present invention. The method of FIGS. 4A-4P is an example use case of the method of FIGS. 3A-3N and is presented solely as an example to aid in understanding and not a limitation of the present invention. Each of the rows in FIGS. 4A-4P corresponds to a particular actor and shows actions taken by that actor. In particular, the diagram of FIGS. 4A-4P contains rows corresponding to the following actors:

a manufacturer of a product (e.g., synthetic nitrogen fertilizer or nitrogen-fixing crop input);

a retailer of the product;

a farmer (or other consumer) of the product;

an agronomist who creates a prescription for use of the product;

a product usage data tracking system (such as an Ultimus System, available from AMVAC Chemical Corporation) for tracking data relating to one or more containers, such as the type and amount of product filled into and dispensed from the containers;

an external database (such as a distributed ledger, e.g., a blockchain), including one or more computer systems that can write to and read from the external database; and the container's Container Data Module (CDM) (e.g., RFID tag).

The product usage data tracking system may be implemented in any of a variety of ways. For example, it may include a software system that is accessible over one or more networks (e.g., as a Software as a Service (SaaS) product) from one or more computing devices. Data about containers and/or products that are filled into and/or applied from the containers may be stored by the product usage data tracking system at one or more locations that are remote from the containers, such as on one or more servers that are remote from the containers. The product usage tracking system may include one or more computers and other devices that are local to a container containing a product, such as a computer on application equipment that applies the product, and which is capable of reading data from and writing data to an container data module (CDM) (e.g., RFID tag) associated with (e.g., contained within or coupled to) the container. Each such computer may include suitable client software to enable the computer to act as a client in communication over a network with one or more servers of the product usage data tracking system. As a particular example, RFID scanning software may be executable on a handheld computing device, which may read data from a CDM (e.g., RFID tag) associated with a container, and transmit that data over a network to a server of the product usage data tracking system, which may store that data remotely from the container.

The method may begin (step 401) and include the following:

The manufacturer manufactures a Product A (step 402).

The manufacturer transfers some amount of Product A to a Container A (i.e., fills Container A with some amount of Product A) (step 403).

The product usage data tracking system identifies data, such as any one or more of the following, in any combination: a unique ID of Container A, a unique ID of Product A, a batch ID of Product A, a lot ID of product A, a quantity of Product A that was transferred to Container A in step 403, a date on which Product A was transferred to Container A in step 403, a time at which Product A was transferred to Container A in step 403, and a location at which Product A was transferred to Container A in step 403 (step 404).

The product usage data tracking system generates an external database entry 406 containing data representing the filling of Container A with Product A (step 405) and causes the external database entry 406 to be stored in the external database. The external database entry may, for example, contain data representing any one or more of the following, in any combination:

A type of the action represented by the external database, e.g., "container initiation action."

A unique ID of Container A.

A unique ID of a possessor of Container A at the time of the filling in step 403.

A unique ID of Product A.

The batch, lot, quantity, date, time, and location data described above.

The product usage data tracking system may store, in Container A's CDM, a record 408 containing some or all of the data stored in the external database entry in step 405 (step 407).

The farmer interacts with the agronomist and/or retailer regarding the farmer's needs for Product A (step 409). The agronomist creates an electronic prescription (also referred to as a product-need file) that defines where and at what rate a specific product should be applied within the boundaries of a particular agricultural field (e.g., shape files) or documentation of need for Product A (step 410). The agronomist uploads (e.g., via an authenticated login) the prescription to the product usage data tracking system (step 411). The prescription may include, for example, any one or more of the following, in any combination: a definition of geographic boundaries of a field; a unique product ID (e.g., the product ID of Product A) for each of one or more products specified by the prescription; an application rate; and an ID of a crop.

The product usage data tracking system receives the prescription (step 412), creates an external database entry 414 containing some or all of the information contained therein (plus an indication of the type of the action represented by the external database entry, e.g., "product need action") (step 413), and stores the external database entry 14 in the external database. The product usage data tracking system calculates an enhanced prescription file container one or more of the following, in any combination (step 415):

number of acres in which Product A is to be applied;

the amount of product needed; and the number of containers needed to store Product A.

The product usage data tracking system creates an external database entry 417 containing some or all of the data in the enhanced prescription file (plus an indication of the type of the action represented by the external database entry, e.g., "product need action") (step 416), and stores the external database entry 417 in the external database.

The agronomist receives the enhanced prescription file from the product usage data tracking system (step 418). The retailer receives, from the product usage data tracking system: a notification of the enhanced prescription file; a quantity of fertilizer needed; and a quantity of containers needed to store the specified quantity of fertilizer (step 419). The retailer orders the number of tagged containers, pre-filled with Product A, from the manufacturer (step 420). The manufacturer receives the retailer's request for tagged containers (step 421) and, in response, transfers possession/ custody of tagged Container A to the retailer (step 422) and ships the tagged Container A to the retailer (step 426). The retailer accepts possession/custody of the tagged Container A (step 427).

Once the product usage data tracking system knows the location and possessor of Container A after transfer of possession/custody of Container A to the retailer (step 423) (such as by using a device (handheld or mounted, for example, to a doorway or in any number of locations on or within, for example, a building or vehicle) that is capable of reading from, writing to, or in general communicating with the CDM of Container A), the product usage data tracking system creates an external database entry 425 containing information about the chain of custody of Container A, such as data indicating that possession of Container A was transferred from the manufacturer to the retailer, and an indication of the action represented by the distributed ledger entry 425, e.g., "chain of custody action" (step 424). The product usage data tracking system may also update Container A's CDM with some or all of the information contained in the external database entry 425, thereby creating a record in Container A's CDM.

The retailer accepts possession/custody of Container A (step 427). Once the product usage data tracking system knows the location and possessor of Container A after the retailer accepts possession/custody of Container A (step 428), the product usage data tracking system creates an external database entry 430 containing information about the chain of custody of Container A, such as data indicating that the retailer has confirmed custody of Container A, and an indication of the action represented by the external database entry 430, e.g., "chain of custody action" (step 429).

The retailer transfers possession/custody of Container A to the farmer (step 433). Once the product usage data tracking system knows the location and possessor of Container A after the farmer accepts possession/custody of Container A (step 434), the product usage data tracking system creates an external database entry 436 containing information about the chain of custody of Container A, such as data indicating that the retailer has transferred possession/custody of Container A to the farmer, and an indication of the action represented by the external database entry 436, e.g., "chain of custody action" (step 435). The product usage data tracking system may also update Container A's CDM with some or all of the information in the external database entry 436, thereby creating record 38 in Container A's CDM (step 437).

The retailer delivers Container A to the farmer (step 439). The farmer accepts possession/custody of Container A (step 440). The farmer installs Container A on application equipment and authenticates Container A (step 441). The agronomist or farmer uploads the enhanced prescription file to the application equipment (step 442).

The farmer applies or consumes Product A in Container A (step 443). The farmer's application equipment (e.g., planter) automatically updates Container A's CDM with information about the application/consumption of Product A in step 443, such as by storing any one or more of the following in Container A's CDM, in any combination, thereby creating a record 445 in Container A's CDM: application rate, product applied, latitude and longitude, date, and time. The farmer's application equipment stores some or all of the data in record 445 (and an indication of the action represented by that data, e.g., "product consumption action") in an entry 446 in the external database.

If Container A is returnable (step 447a), then the method of FIGS. 4A-4P proceeds to step 447b, in which the farmer transfers possession/custody of Container A to the retailer (step 447b); otherwise, the method ends (step 467).

If Container A is returnable, then the retailer accepts possession/custody of Container A (step 448). Once the product usage data tracking system knows the location and possessor of Container A after the retailer accepts possession/custody (step 449), the product usage data tracking system creates an external database entry 451 containing information about the chain of custody of Container A, such as data indicating that the retailer has confirmed possession of Container A, a unique ID of the farmer, data indicating that the farmer has returned Container A to the retailer, a unique ID of Product ID, an amount of Product A returned in Container A, and an indication of the action represented by the external database entry 451, e.g., "chain of custody action" (step 450).

The retailer transfers possession/custody of Container A to the manufacturer (step 456). The manufacturer accepts possession/custody of Container A (step 457). Once the product usage data tracking system knows the location and possessor of Container A after the retailer transfers possession/custody of Container A to the manufacturer (step 458), the product usage data tracking system creates an external database entry 460 containing information about the chain of custody of Container A, such as data indicating that the retailer has transferred possession/custody of Container A to the manufacturer, and an indication of the action represented by the distributed ledger entry 460, e.g., "chain of custody action" (step 459).

The manufacturer performs a container return process, (step 461), which may include any one or more of the following steps, in any combination (step 462):

A reader reads Container A's CDM, and the amount of product applied is confirmed (e.g., by using a physical scale to weigh Container A and comparing the resulting weight to a weight indicated by data in Container A's CDM).

A Global Information System (GIS) (e.g., on the application equipment) establishes and confirms the location (s) (e.g., latitude and longitude) at which Product A was applied from Container A based on data in Container A's CDM.

The location at which Product A was applied from Container A (based on the data in Container A's CDM) is compared to the intended field's GEO location as identified in the prescription.

The farmer who used Container A is confirmed using the farmer ID in Container A's CDM.

The date and time of application of Product A from Container A is confirmed based on data in Container A's CDM.

The product usage data tracking system tracks, stores, and reports all usage data (step 463). For example, data from Container A's CDM may be captured locally to Container A (e.g., using a handheld RFID scanner) and then transmitted over a network (in addition to other data, such as a reading of Container A's weight from a scale) to a remote server, which stores that data remotely from Container A.

The product usage data tracking system creates an external database entry 65 that contains data indicating that the manufacturer has confirmed product usage (step 464).

The product usage data tracking system generates a final report, which indicates that authenticated data are available (step 466). The method ends (step 467).

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention may read and write data to electronic memory devices (such as RFID tags) and/or to distributed ledgers (such as a blockchain), which are functions that cannot be performed mentally or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

What is claimed is:

1. A method performed by at least one computer processor executing computer program instructions stored on at least one first non-transitory computer-readable medium, the method comprising:

(A) a first storage module receiving data representing a filling of a first container with a first product;

(B) the first storage module determining whether a network connection exists between the first storage module and an external database to determine that the external database is not accessible over a network;

(C) in response to determining that the external database is not accessible over the network, the first storage module storing, in a second non-transitory computer-readable medium, without accessing the network, data representing:

a product type of the first product;

an amount of the first product filled into the first container;

a unique identity of the first container; and a unique identity of a first user of the first container at the time of filling the first container with the first product;

(D) after (B) and (C), the first storage module determining whether a network connection exists between the first storage module and an external database to determine that the external database is accessible over the network;

(E) in response to determining that the external database is accessible over the network, the first storage module storing the data in (C) in at least one first record in the external database; and (F) dispensing at least some of the first product from the first container, and storing, in at least one second record in the external database, data representing the dispensing;

wherein the dispensing comprises consuming at least some of the first product at each of a plurality of locations L, and wherein (F) comprises:

for each of the plurality of locations L, storing, in the data representing the dispensing:

(1) data representing an amount of the first product consumed from the first container at location L; and (2) data representing the location L, wherein the external database comprises a distributed ledger.

2. The method of claim 1, further comprising:

(G) based on the data stored in (C), establishing the provenance of the first product.

3. The method of claim 2, wherein (G) comprises establishing the provenance of the first product based on the data stored in the external database in (C).

4. The method of claim 1, wherein (E) further comprises:

storing, in the at least one first record in the external database, data representing a unique identity of a first owner of the first container at the time of filling the first container with the first product.

5. The method of claim 1, wherein (E) further comprises:

storing, in the at least one first record in the external database, data representing a first location of the first container at the time of filling the first container with the first product.

6. The method of claim 1, wherein (E) further comprises:

storing, in the at least one first record in the external database, data representing a first time of filling of the first container with the first product.

7. The method of claim 1, wherein (E) further comprises:

storing, in the at least one first record in the external database, data representing a unique identity of a first possessor of the first container at the time of filling the first container with the first product.

8. The method of claim 7, further comprising:

(G) storing, in at least one third record in the external database, data representing a third possessor of the first container, wherein the first possessor differs from the third possessor.

9. The method of claim 1, further comprising:

(G) in response to filling the first container with the first product, storing, in an electronic memory on the container, at least one of:

the product type of the first product;

the amount of the first product filled into the first container;

the unique identity of the first container; and the unique identity of the first user of the first container at the time of filling the first container with the first product.

10. The method of claim 9, wherein the container data module comprises the electronic memory.

11. The method of claim 9, further comprising:

(H) before (G), wirelessly receiving, at an RFID tag on the first container, a signal representing the data stored in (C).

12. The method of claim 5, further comprising:

(G) storing, in at least one third record in the external database, data representing a second location of the first container, wherein the first location differs from the second location.

13. The method of claim 1, wherein the data representing the dispensing comprises data representing an amount of the first product dispensed from the first container.

14. The method of claim 1, wherein the data representing the dispensing comprises data representing an amount of the first product remaining in the first container after the dispensing.

15. The method of claim 1, wherein the data representing the dispensing comprises data representing a type of the first product dispensed from the first container.

16. The method of claim 1, wherein the data representing the dispensing comprises data representing a unique identity of a possessor of the first container at the time of the dispensing.

17. The method of claim 1, wherein the data representing the dispensing comprises data representing a unique identity of an owner of the first container at the time of the dispensing.

18. The method of claim 5, wherein the data representing the dispensing comprises data representing a second location of the first container at the time of the dispensing, wherein the second location differs from the first location.

19. The method of claim 1, wherein the data representing the dispensing comprises data representing a rate at which the first product was dispensed from the first container.

20. The method of claim 1, further comprising:

(G) determining, based on the at least one first record in the external database and the at least one second record in the external database, whether a criterion for a carbon credit has been satisfied; and (H) generating output indicating whether the criterion for the carbon credit has been satisfied.

21. The method of claim 1, further comprising:

(G) before (A), filling the first container with the first product in a tamper-evident manner.

22. The method of claim 1, further comprising:

(G) after transferring at least some of the first product from the first container to a second container, storing, in at least one third record in the external database, data representing the transfer.

23. The method of claim 1, wherein (E) comprises storing the data in the external database in an encrypted form.

24. The method of claim 1, wherein the first product comprises a fertilizer.

25. The method of claim 1, wherein the first product comprises a pesticide.

26. The method of claim 1, wherein the first product comprises nitrogen-fixing microbes.

27. The method of claim 1, wherein the first product comprises seed.

28. The method of claim 1, wherein the first product comprises petroleum-based fuel.

29. The method of claim 1, wherein the first product comprises an agricultural crop input product.

30. The method of claim 1, wherein the distributed ledger comprises a blockchain, and wherein the at least one first record comprises at least one first block in the blockchain.

31. A system comprising at least one first non-transitory computer-readable medium having computer program instructions stored thereon, the computer program instructions being executable by at least one computer processor to perform a method, the method comprising:

(A) a first storage module receiving data representing a filling of a first container with a first product;

(B) the first storage module determining whether a network connection exists between the first storage module and an external database to determine that the external database is not accessible over a network;

(C) in response to determining that the external database is not accessible over the network, the first storage module storing, in a second non-transitory computer-readable medium, without accessing the network, data representing:

a product type of the first product;

an amount of the first product filled into the first container;

a unique identity of the first container; and a unique identity of a first user of the first container at the time of filling the first container with the first product;

(D) after (B) and (C), the first storage module determining whether a network connection exists between the first storage module and an external database to determine that the external database is accessible over the network;

(E) in response to determining that the external database is accessible over the network, the first storage module storing the data in (C) in at least one first record in the external database; and (F) dispensing at least some of the first product from the first container, and storing, in at least one second record in the external database, data representing the dispensing;

wherein the dispensing comprises consuming at least some of the first product at each of a plurality of locations L, and wherein (F) comprises:

for each of the plurality of locations L, storing, in the data representing the dispensing:

(1) data representing an amount of the first product consumed from the first container at location L; and (2) data representing the location L, wherein the external database comprises a distributed ledger.

* * * * *